(12) United States Patent
Vandike et al.

(10) Patent No.: US 12,457,929 B2
(45) Date of Patent: Nov. 4, 2025

(54) SYSTEMS AND METHODS FOR PREDICTIVE HARVESTING LOGISTICS

(71) Applicant: Deere & Company, Moline, IL (US)

(72) Inventors: Nathan R. Vandike, Geneseo, IL (US); Bhanu Kiran Reddy Palla, Bettendorf, IA (US); Federico Pardina-Malbran, Fort Collins, CO (US); Nathan Greuel, Le Claire, IA (US); Andrew Wesley Keenan, Bettendorf, IA (US)

(73) Assignee: Deere & Company, Moline, IL (US)

( * ) Notice: Subject to any disclaimer, the term of this patent is extended or adjusted under 35 U.S.C. 154(b) by 321 days.

(21) Appl. No.: 18/171,544

(22) Filed: Feb. 20, 2023

(65) Prior Publication Data

US 2024/0049634 A1 Feb. 15, 2024

Related U.S. Application Data

(63) Continuation of application No. PCT/US2022/040061, filed on Aug. 11, 2022.

(51) Int. Cl.
*A01D 41/127* (2006.01)
*A01D 90/10* (2006.01)
*G01C 21/00* (2006.01)

(52) U.S. Cl.
CPC ........... *A01D 41/127* (2013.01); *A01D 90/10* (2013.01); *G01C 21/3811* (2020.08)

(58) Field of Classification Search
CPC .............. A01D 41/127; A01D 41/1278; A01D 41/1277; A01D 90/10; A01D 90/105;
(Continued)

(56) References Cited

U.S. PATENT DOCUMENTS 6,037,901 A 3/2000 Devier et al.
6,128,574 A 10/2000 Diekhans
(Continued)

FOREIGN PATENT DOCUMENTS

CA 3081383 A1 5/2019
CN 103181263 A 7/2013
(Continued)

OTHER PUBLICATIONS

Coe et al., "Global production networks: mapping recent conceptual developments." Journal of economic geography 19.4 (2019): 775-801. Retrieved on Nov. 11, 2022 (Nov. 11, 2022) from ,https://academic.oup.com/joeg/article/19/4/775/5529924> entire document.

(Continued)

*Primary Examiner* — Dalena Tran
(74) *Attorney, Agent, or Firm* — Kelly, Holt & Christenson; Joseph R. Kelly

(57) ABSTRACT

An agricultural harvesting system obtains a yield map that maps yield values to different geographic locations in a worksite and a speed map that maps agricultural harvester speed values to different geographic locations in the worksite. The agricultural harvesting system identifies a geographic location in the worksite at which the agricultural harvester will be full, at least to a threshold level, based on the yield map; identifies a geographic location in the worksite at which a material transfer operation is to start based on the geographic location at which the agricultural harvester will be full, at least to the threshold level; and identifies a time at which the agricultural harvester will arrive at the material transfer location, based on the speed map. The agricultural harvesting system can control one or more of the agricultural harvester and a receiving machine.

20 Claims, 14 Drawing Sheets

(58) Field of Classification Search
CPC ............ G01C 21/3811; G05D 1/0219; G05D 1/0274; G05D 1/0287
See application file for complete search history.

(56) References Cited

U.S. PATENT DOCUMENTS

| | | |
|---|---|---|
| 6,216,071 B1 | 4/2001 | Motz |
| 6,327,569 B1 | 12/2001 | Reep |
| 6,360,179 B1 | 3/2002 | Reep |
| 6,587,772 B2 | 7/2003 | Behnke |
| 6,687,616 B1 | 2/2004 | Peterson et al. |
| 7,155,888 B2 | 1/2007 | Diekhans |
| 7,261,632 B2 | 8/2007 | Pirro et al. |
| 7,555,283 B2 | 6/2009 | Fitzner et al. |
| 7,562,167 B2 | 7/2009 | Anderson |
| 7,725,233 B2 | 5/2010 | Hendrickson et al. |
| 7,756,624 B2 | 7/2010 | Diekhans et al. |
| 8,060,283 B2 | 11/2011 | Molt et al. |
| 8,145,393 B2 | 3/2012 | Foster et al. |
| 8,254,351 B2 | 8/2012 | Fitzner et al. |
| 8,280,595 B2 | 10/2012 | Foster et al. |
| 8,437,901 B2 | 5/2013 | Anderson |
| 8,606,454 B2 | 12/2013 | Wang et al. |
| 8,626,406 B2 | 1/2014 | Schleicher et al. |
| 8,639,408 B2 | 1/2014 | Anderson |
| 8,738,238 B2 | 5/2014 | Rekow |
| 8,781,692 B2 | 7/2014 | Kormann |
| 8,868,304 B2 | 10/2014 | Bonefas |
| 8,942,860 B2 | 1/2015 | Morselli |
| 9,014,901 B2 | 4/2015 | Wang et al. |
| 9,188,986 B2 | 11/2015 | Baumann |
| 9,326,444 B2 | 5/2016 | Bonefas |
| 9,392,746 B2 | 7/2016 | Darr et al. |
| 9,523,180 B2 | 12/2016 | Deines |
| 9,529,364 B2 | 12/2016 | Foster et al. |
| 9,605,583 B2 | 3/2017 | Goering et al. |
| 9,642,305 B2 | 5/2017 | Nykamp et al. |
| 9,675,008 B1 | 6/2017 | Rusciolelli et al. |
| 9,772,625 B2 | 9/2017 | Gilmore et al. |
| 9,973,710 B2 * | 5/2018 | Boydens ............... H04N 23/90 |
| 9,992,931 B2 | 6/2018 | Bonefas et al. |
| 9,992,932 B2 | 6/2018 | Bonefas et al. |
| 10,015,928 B2 | 7/2018 | Nykamp et al. |
| 10,064,335 B2 | 9/2018 | Byttebier et al. |
| 10,126,282 B2 | 11/2018 | Anderson et al. |
| 10,129,528 B2 | 11/2018 | Bonefas et al. |
| 10,317,272 B2 | 6/2019 | Bhavsar et al. |
| 10,398,084 B2 | 9/2019 | Ray et al. |
| 10,537,061 B2 | 1/2020 | Farley et al. |
| 10,677,637 B1 | 6/2020 | Von Muenster |
| 10,760,946 B2 | 9/2020 | Meier et al. |
| 10,809,118 B1 | 10/2020 | Von Muenster |
| 10,830,634 B2 | 11/2020 | Blank et al. |
| 10,890,922 B2 | 1/2021 | Ramm et al. |
| 10,966,071 B2 | 3/2021 | Suleman et al. |
| 11,008,177 B2 | 5/2021 | Banthia et al. |
| 11,112,262 B2 | 9/2021 | Anderson |
| 11,889,778 B2 * | 2/2024 | Viaene ............... A01B 63/008 |
| 12,016,257 B2 * | 6/2024 | Rupp ............... G08B 21/182 |
| 2002/0083695 A1 | 7/2002 | Behnke et al. |
| 2004/0116169 A1 | 6/2004 | Isfort et al. |
| 2005/0279070 A1 | 12/2005 | Pirro et al. |
| 2005/0284119 A1 | 12/2005 | Brunnert |
| 2006/0047418 A1 | 3/2006 | Metzler et al. |
| 2006/0094487 A1 | 5/2006 | Huster et al. |
| 2007/0037621 A1 | 2/2007 | Isfort |
| 2007/0089390 A1 | 4/2007 | Hendrickson et al. |
| 2008/0245042 A1 | 10/2008 | Brunnert et al. |
| 2009/0044505 A1 | 2/2009 | Huster et al. |
| 2009/0306835 A1 | 12/2009 | Ellermann et al. |
| 2010/0070145 A1 | 3/2010 | Foster et al. |
| 2010/0332051 A1 | 12/2010 | Kormann |
| 2011/0022273 A1 | 1/2011 | Peters et al. |
| 2011/0061762 A1 | 3/2011 | Madsen et al. |
| 2011/0066337 A1 | 3/2011 | Kormann |
| 2011/0160961 A1 | 6/2011 | Wollenhaupt et al. |
| 2011/0205084 A1 | 8/2011 | Morselli |
| 2011/0224873 A1 | 9/2011 | Reeve et al. |
| 2012/0029732 A1 | 2/2012 | Meyer |
| 2012/0085458 A1 | 4/2012 | Wenzel |
| 2012/0087771 A1 | 4/2012 | Wenzel |
| 2012/0215394 A1 | 8/2012 | Wang et al. |
| 2012/0215409 A1 | 8/2012 | Wang et al. |
| 2012/0263560 A1 | 10/2012 | Diekhans et al. |
| 2012/0265412 A1 | 10/2012 | Diekhans et al. |
| 2012/0302299 A1 | 11/2012 | Behnke et al. |
| 2013/0019580 A1 | 1/2013 | Anderson et al. |
| 2013/0022430 A1 | 1/2013 | Anderson et al. |
| 2013/0211675 A1 | 8/2013 | Bonefas |
| 2013/0213518 A1 | 8/2013 | Bonefas |
| 2013/0227922 A1 | 9/2013 | Zametzer et al. |
| 2014/0083556 A1 | 3/2014 | Darr et al. |
| 2014/0121882 A1 | 5/2014 | Gilmore et al. |
| 2014/0224377 A1 | 8/2014 | Bonefas |
| 2014/0236381 A1 | 8/2014 | Anderson et al. |
| 2014/0311113 A1 | 10/2014 | Bonefas |
| 2014/0324272 A1 | 10/2014 | Madsen et al. |
| 2015/0094944 A1 | 4/2015 | Baumann |
| 2015/0189832 A1 | 7/2015 | Krause et al. |
| 2015/0327425 A1 | 11/2015 | Dillon |
| 2015/0327440 A1 | 11/2015 | Dybro et al. |
| 2016/0061643 A1 | 3/2016 | Wilson et al. |
| 2016/0183463 A1 | 6/2016 | Herman et al. |
| 2016/0252384 A1 | 9/2016 | Wilson et al. |
| 2016/0270294 A1 | 9/2016 | Viaene et al. |
| 2017/0042088 A1 | 2/2017 | Nykamp et al. |
| 2017/0049053 A1 | 2/2017 | Bonefas et al. |
| 2017/0055446 A1 | 3/2017 | Nykamp et al. |
| 2017/0086378 A1 | 3/2017 | Lisouski et al. |
| 2017/0206645 A1 | 7/2017 | Bonefas et al. |
| 2017/0227969 A1 | 8/2017 | Murray et al. |
| 2017/0245435 A1 | 8/2017 | Rusciolelli et al. |
| 2017/0276534 A1 | 9/2017 | Vermue et al. |
| 2018/0022559 A1 | 1/2018 | Knutson |
| 2018/0037424 A1 | 2/2018 | Green et al. |
| 2019/0261560 A1 | 8/2019 | Jelenkovic |
| 2019/0351765 A1 | 11/2019 | Rabusic |
| 2019/0364734 A1 | 12/2019 | Kriebel et al. |
| 2020/0064144 A1 | 2/2020 | Tomita et al. |
| 2020/0064863 A1 | 2/2020 | Tomita et al. |
| 2020/0090094 A1 | 3/2020 | Blank |
| 2020/0128734 A1 | 4/2020 | Brammeier et al. |
| 2020/0128737 A1 | 4/2020 | Anderson et al. |
| 2020/0128738 A1 | 4/2020 | Suleman et al. |
| 2020/0128740 A1 | 4/2020 | Suleman |
| 2020/0133262 A1 | 4/2020 | Suleman et al. |
| 2020/0137957 A1 | 5/2020 | Friesen |
| 2020/0187409 A1 | 6/2020 | Meyer zu Helligen |
| 2020/0196526 A1 | 6/2020 | Koch et al. |
| 2020/0317114 A1 | 10/2020 | Hoff |
| 2020/0319632 A1 | 10/2020 | Desai et al. |
| 2020/0319655 A1 | 10/2020 | Desai et al. |
| 2020/0352099 A1 | 11/2020 | Meier et al. |
| 2020/0359547 A1 | 11/2020 | Sakaguchi et al. |
| 2020/0359549 A1 | 11/2020 | Sakaguchi et al. |
| 2020/0375083 A1 | 12/2020 | Anderson et al. |
| 2020/0375084 A1 | 12/2020 | Sakaguchi et al. |
| 2020/0378088 A1 | 12/2020 | Anderson |
| 2020/0404842 A1 | 12/2020 | Dugas et al. |
| 2021/0015041 A1 | 1/2021 | Bormann et al. |
| 2021/0026362 A1 | 1/2021 | Wilson et al. |
| 2021/0029877 A1 | 2/2021 | Vandike et al. |
| 2021/0099522 A1 | 4/2021 | Chiocco et al. |
| 2021/0294337 A1 | 9/2021 | Van Mill et al. |
| 2021/0333802 A1 | 10/2021 | Singh et al. |
| 2021/0337729 A1 | 11/2021 | O'Connor et al. |
| 2021/0339729 A1 | 11/2021 | O'Connor et al. |
| 2022/0015288 A1 | 1/2022 | Christiansen et al. |
| 2022/0019238 A1 | 1/2022 | Christiansen et al. |
| 2022/0019239 A1 | 1/2022 | Christiansen et al. |
| 2022/0019240 A1 | 1/2022 | Christiansen et al. |
| 2022/0019241 A1 | 1/2022 | Christiansen et al. |
| 2022/0039318 A1 | 2/2022 | Raste et al. |
| 2022/0095539 A1 | 3/2022 | Faust et al. |

(56) References Cited

U.S. PATENT DOCUMENTS

| | | | |
|---|---|---|---|
| 2022/0110238 A1 | 4/2022 | Vandike et al. | |
| 2022/0110246 A1 | 4/2022 | Vandike et al. | |
| 2022/0110253 A1 | 4/2022 | Anderson et al. | |
| 2022/0110255 A1* | 4/2022 | Vandike | A01D 41/1274 |
| 2022/0110262 A1 | 4/2022 | Vandike et al. | |
| 2022/0113727 A1 | 4/2022 | Vandike | |
| 2022/0117143 A1 | 4/2022 | Kraus et al. | |
| 2022/0122197 A1 | 4/2022 | Hanrieder | |
| 2022/0132736 A1 | 5/2022 | Meyers et al. | |
| 2022/0132737 A1 | 5/2022 | Anderson et al. | |
| 2022/0176818 A1 | 6/2022 | Piscopo et al. | |
| 2022/0197302 A1 | 6/2022 | McClelland et al. | |
| 2022/0204051 A1 | 6/2022 | Rands et al. | |
| 2022/0204052 A1 | 6/2022 | Creaby et al. | |
| 2022/0206512 A1 | 6/2022 | Rands et al. | |
| 2022/0207862 A1 | 6/2022 | Sharma et al. | |
| 2022/0225568 A1 | 7/2022 | Töniges et al. | |
| 2022/0232763 A1 | 7/2022 | Palla et al. | |
| 2022/0232770 A1 | 7/2022 | Yanke et al. | |
| 2022/0256770 A1 | 8/2022 | Faust et al. | |
| 2022/0304227 A1 | 9/2022 | Hill et al. | |
| 2022/0304231 A1 | 9/2022 | Faust et al. | |
| 2022/0374026 A1 | 11/2022 | Vougioukas et al. | |
| 2022/0382277 A1 | 12/2022 | Nishii et al. | |
| 2022/0408645 A1 | 12/2022 | O'Connor et al. | |
| 2022/0410704 A1 | 12/2022 | O'Connor et al. | |
| 2023/0027697 A1* | 1/2023 | Rush | A01D 43/073 |
| 2023/0031013 A1 | 2/2023 | Faust et al. | |
| 2023/0035890 A1 | 2/2023 | McKinney et al. | |
| 2023/0041667 A1 | 2/2023 | Kormann | |

FOREIGN PATENT DOCUMENTS

| | | |
|---|---|---|
| CN | 111201879 A | 5/2020 |
| CN | 111406505 A | 7/2020 |
| CN | 114846991 A | 8/2022 |
| CN | 114915637 A | 8/2022 |
| CN | 115067061 A | 9/2022 |
| CN | 115280960 A | 11/2022 |
| CN | 115643895 A | 1/2023 |
| DE | 102009041646 A1 | 3/2011 |
| DE | 102010004648 A1 | 7/2011 |
| DE | 202012103730 U1 | 10/2012 |
| DE | 102012211001 A1 | 1/2014 |
| DE | 102013012027 A1 | 1/2015 |
| DE | 102011005400 B4 | 5/2015 |
| DE | 102015109799 A1 | 12/2016 |
| DE | 102017204511 A1 | 9/2018 |
| DE | 102011052688 B4 | 2/2021 |
| DE | 102020124508 A1 | 3/2022 |
| EP | 1219153 A2 | 7/2002 |
| EP | 1219159 A1 | 7/2002 |
| EP | 1674324 A1 | 6/2006 |
| EP | 1609349 B1 | 5/2008 |
| EP | 2057884 A1 | 5/2009 |
| EP | 1731983 B1 | 9/2009 |
| EP | 2174537 A1 | 4/2010 |
| EP | 2186389 A1 | 5/2010 |
| EP | 2301318 B1 | 11/2011 |
| EP | 2146307 81 | 5/2012 |
| EP | 2146307 A2 | 5/2012 |
| EP | 2146307 B1 | 5/2012 |
| EP | 2508057 A1 | 10/2012 |
| EP | 2621258 A1 | 8/2013 |
| EP | 2786325 A1 | 10/2014 |
| EP | 2829171 A2 | 1/2016 |
| EP | 2452551 B1 | 5/2017 |
| EP | 2995191 B1 | 10/2017 |
| EP | 3315006 A1 | 5/2018 |
| EP | 3315007 A1 | 5/2018 |
| EP | 3316218 A1 | 5/2018 |
| EP | 3289853 B1 | 3/2019 |
| EP | 3289852 B1 | 6/2019 |
| EP | 3000307 B1 | 12/2019 |
| EP | 3593620 A1 | 1/2020 |
| EP | 3243374 B1 | 3/2020 |
| EP | 2812267 B1 | 2/2021 |
| EP | 3847878 A1 | 7/2021 |
| EP | 3706544 B1 | 12/2021 |
| EP | 3970471 A1 | 3/2022 |
| EP | 3315005 B1 | 4/2022 |
| GB | 2517049 A | 2/2015 |
| IN | 202241032643 A | 6/2022 |
| JP | 2002186348 A | 7/2002 |
| JP | 2015084667 | 5/2015 |
| JP | 2018068284 A | 5/2018 |
| JP | 2019004796 A | 1/2019 |
| JP | 2019216744 A | 12/2019 |
| JP | 2020127405 A | 8/2020 |
| JP | 2021069341 A | 5/2021 |
| JP | 2022141070 A | 9/2022 |
| RU | 2529905 C2 | 10/2014 |
| UA | 90246 C2 | 4/2010 |
| WO | 2012110544 A1 | 8/2012 |
| WO | 2013086351 A1 | 6/2013 |
| WO | WO2013087275 A1 | 6/2013 |
| WO | 2013120079 A1 | 8/2013 |
| WO | 2013141975 | 9/2013 |
| WO | 2013151619 A2 | 10/2013 |
| WO | 2013162673 | 10/2013 |
| WO | 2013184177 A2 | 12/2013 |
| WO | 2013184178 A2 | 12/2013 |
| WO | 2014046685 A1 | 3/2014 |
| WO | 2014116819 A1 | 7/2014 |
| WO | WO2018043336 A1 | 3/2018 |
| WO | WO2018112615 A1 | 6/2018 |
| WO | WO2018116772 A1 | 6/2018 |
| WO | 2018142768 A1 | 8/2018 |
| WO | 2018185522 A1 | 10/2018 |
| WO | 2018226139 A1 | 12/2018 |
| WO | WO2019124174 A1 | 6/2019 |
| WO | WO2019124217 A1 | 6/2019 |
| WO | WO2019124225 A1 | 6/2019 |
| WO | WO2019124273 A1 | 6/2019 |
| WO | 2019215185 A1 | 11/2019 |
| WO | WO2020026578 A1 | 2/2020 |
| WO | WO2020026650 A1 | 2/2020 |
| WO | WO2020026651 A1 | 2/2020 |
| WO | WO2020031473 A1 | 2/2020 |
| WO | WO2020038810 A1 | 2/2020 |
| WO | WO2020039671 A1 | 2/2020 |
| WO | WO2020044726 A1 | 3/2020 |
| WO | WO202082182 A1 | 4/2020 |
| WO | WO2020100810 A1 | 5/2020 |
| WO | WO2020110920 | 6/2020 |
| WO | 2020206941 A1 | 10/2020 |
| WO | WO2020206942 A1 | 10/2020 |
| WO | WO21049098 A1 | 3/2021 |
| WO | WO21246384 A1 | 12/2021 |
| WO | 2022118572 A1 | 6/2022 |
| WO | WO22130038 A1 | 6/2022 |
| WO | WO22130039 A1 | 6/2022 |
| WO | WO22268779 A2 | 12/2022 |

OTHER PUBLICATIONS

International Search Report and Written Opinion PCT/US2022/040061, dated Aug. 11, 2022, 11 pages.

Bochtis et al., Field Operations Planning for Agricultural Vehicles: A Hierarchical Modeling Framework, Agricultural Engineering International: the CIGR Ejournal. Manuscript PM 06 021, vol. IX, Feb. 2007, pp. 1-11.

* cited by examiner

SYSTEMS AND METHODS FOR PREDICTIVE HARVESTING LOGISTICS

CROSS-REFERENCE TO RELATED APPLICATION

The present application is a U.S. Bypass Continuation of and claims priority of PCT/US2022/040061, filed Aug. 11, 2022, the content of which is hereby incorporated by reference in its entirety.

FIELD OF THE DESCRIPTION

The present description relates to agriculture. More specifically, the present description relates to agricultural harvesting.

BACKGROUND

There are a wide variety of different types of agricultural machines. Some agricultural machines include harvesters, such as combine harvesters, sugarcane harvesters, cotton harvesters, forage harvesters, and windrowers. Some harvesters can also be fitted with different types of headers to harvest different types of crops. Some agricultural machines include receiving machines which may include towing and towed machines, such as tractors and grain carts and trucks and trailers. The receiving machines receive and transport material harvested by harvesters.

The discussion above is merely provided for general background information and is not intended to be used as an aid in determining the scope of the claimed subject matter.

SUMMARY

An agricultural harvesting system obtains a yield map that maps yield values to different geographic locations in a worksite and a speed map that maps agricultural harvester speed values to different geographic locations in the worksite. The agricultural harvesting system identifies a geographic location in the worksite at which the agricultural harvester will be full, at least to a threshold level, based on the yield map; identifies a geographic location in the worksite at which a material transfer operation is to start based on the geographic location at which the agricultural harvester will be full, at least to the threshold level; and identifies a time at which the agricultural harvester will arrive at the material transfer location, based on the speed map. The agricultural harvesting system can control one or more of the agricultural harvester and a receiving machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
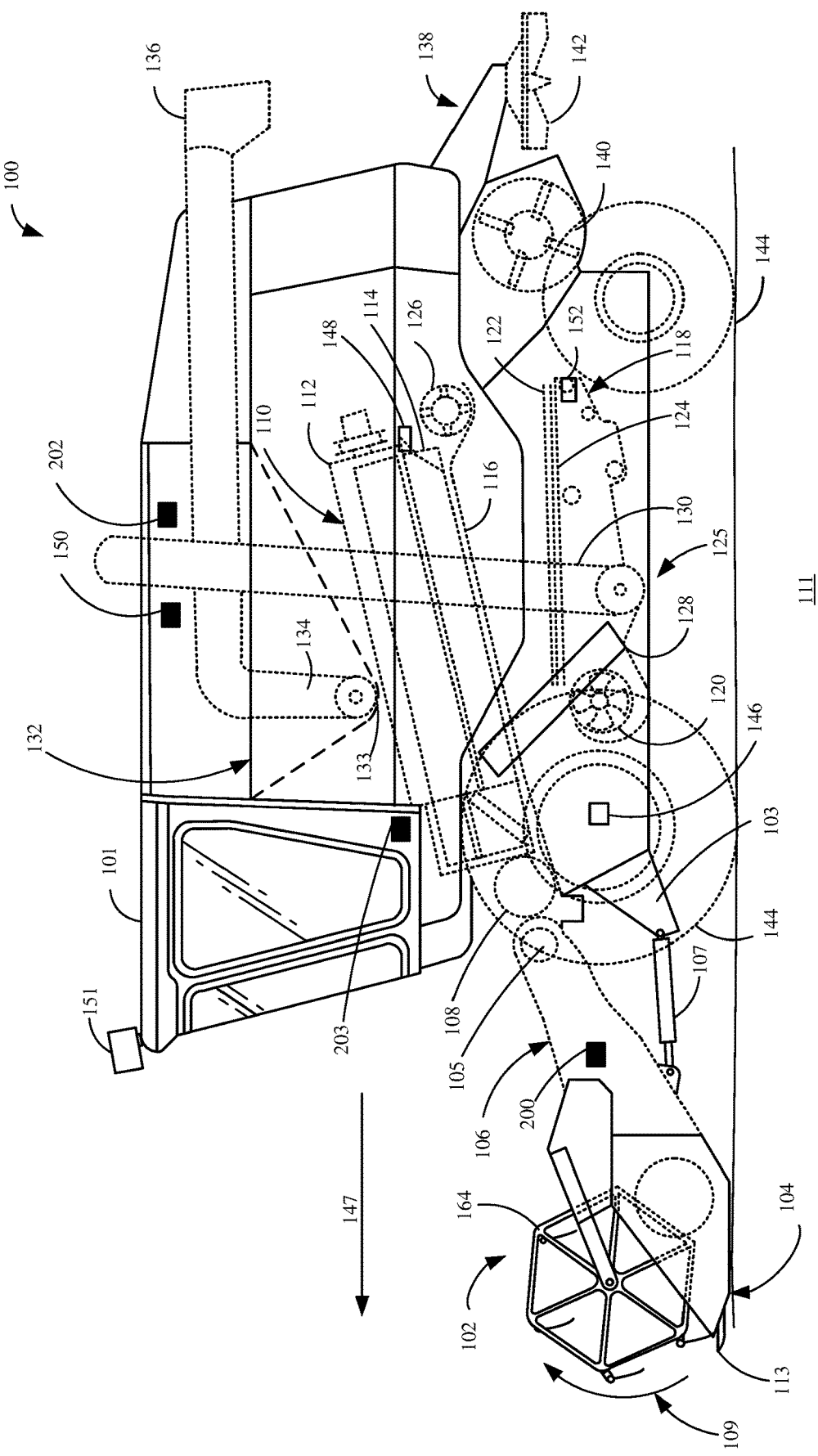
FIG. 1 is a partial pictorial, partial schematic illustration of a self-propelled agricultural harvester.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In some examples, the present description relates to using in-situ data taken concurrently with an operation, such as an agricultural harvesting operation, in combination with prior or predicted data, such as prior or predicted data represented in a map, to generate a predictive model and a predictive map. In some examples, the predictive map can be used to control a mobile machine, such as an agricultural harvester or a receiving machine, or both.

During an agricultural harvesting operation an agricultural harvester engages crop plants at a worksite (e.g., field) and harvests the crop. The harvested crop material (e.g., grain, etc.), is transferred from the agricultural harvester to material receptacle of a receiving machine, such as a grain cart towed by a tractor, or a trailer towed by a truck. In this way, the harvested crop material can be transported, by the receiving machine, from the field to another location, such as a storage location (e.g., storage bin, storage bunk, silo, barn, etc.) or to a purchasing facility (e.g., a mill, etc.). In some examples, the crop material can be transferred from one receiving machine to another receiving machine. For instance, the crop material may initially be transferred from the harvester to a towed grain cart. The towed grain cart may include a material transfer subsystem that can be used to transfer material from the grain cart to another receiving machine, such as a trailer towed by a truck.

The receiving machines often transport the crop material to a location remote from the field at which the harvesting is occurring, such as a storage location somewhere else on the farm or at a purchasing facility. The receiving machines attempt to return to the field in time to receive material from the harvester such that the harvester's operation is minimally interrupted, or not stopped at all. In some examples, the receiving machines will not arrive in time and the harvester ceases operation and waits. In other examples, the receiving machine will arrive too early and will have to wait. Often, the receiving machines are operated at maximum (or near maximum) speeds in attempt to synchronize the loading and unloading. This can result in additional fuel consumption, machine wear, and other deleterious effects (e.g., poor ride quality, etc.). Often the agricultural harvester will operate at given speeds to complete the operation as quickly as possible, only to have to wait for the receiving machines. The higher speed of the agricultural harvester can result in additional fuel consumption, machine wear, and other deleterious effects (e.g., poor ride quality, grain loss, etc.).

The present description thus relates to a system that can predict material transfer locations and arrival times, such that the logistics of the harvesting operation can be controlled, such as speed and path planning for the harvester(s) and/or the receiving vehicles, as well as various other parameters.

In one example, the present description relates to obtaining an information map such as a vegetative index map. A vegetative index map illustratively maps georeferenced vegetative index values (which may be indicative of vegetative growth or plant health) across different geographic locations in a field of interest. One example of a vegetive index includes a normalized difference vegetation index (NDVI). There are many other vegetative indices that are within the scope of the present disclosure. In some examples, a vegetive index map be derived from sensor readings of one or more bands of electromagnetic radiation reflected by the plants. Without limitations, these bands may be in the microwave, infrared, visible or ultraviolet portions of the electromagnetic spectrum. A vegetative index map can be used to identify the presence and location of vegetation. In some examples, these maps enable vegetation to be identified and georeferenced in the presence of bare soil, crop residue, or other plants, including crop or other weeds. The sensor readings can be taken at various times during the growing season (or otherwise prior to spraying), such as during satellite observation of the field of interest, a fly over operation (e.g., manned or unmanned aerial vehicles), sensor readings during a prior operation (e.g., prior to spraying or prior to a particular spraying operation) at the field of interest, as well as during a human scouting operation. The vegetative index map can be generated in a variety of other ways.

In one example, the present description relates to obtaining an information map, such as a topographic map. A topographic map illustratively maps topographic characteristic values across different geographic locations in a field of interest, such as elevations of the ground across different geographic locations in a field of interest. Since ground slope is indicative of a change in elevation, having two or more elevation values allows for calculation of slope across the areas having known elevation values. Greater granularity of slope can be accomplished by having more areas with known elevation values. As an agricultural harvester travels across the terrain in known directions, the pitch and roll of the agricultural harvester can be determined based on the slope of the ground (i.e., areas of changing elevation). Topographic characteristics, when referred to below, can include, but are not limited to, the elevation, slope (e.g., including the machine orientation relative to the slope), and ground profile (e.g., roughness). The topographic map can be derived from sensor readings taken during a previous operation on the field of interest or from an aerial survey of the field (such as a plane, drone, or satellite equipped with lidar or other distance measuring devices). In some examples, the topographic map can be obtained from third parties. The topographic map can be generated in a variety of other ways.

In one example, the present description relates to obtaining an information map, such as a soil property map. A soil property map illustratively maps soil property values (which may be indicative of soil type, soil moisture, soil cover, soil structure, as well as various other soil properties) across different geographic locations in a field of interest. The soil property maps thus provide geo-referenced soil properties across a field of interest. Soil type can refer to taxonomic units in soil science, wherein each soil type includes defined sets of shared properties. Soil types can include, for example, sandy soil, clay soil, silt soil, peat soil, chalk soil, loam soil, and various other soil types. Soil moisture can refer to the amount of water that is held or otherwise contained in the soil. Soil moisture can also be referred to as soil wetness. Soil cover can refer to the amount of items or materials covering the soil, including, vegetation material, such as crop residue or cover crop, debris, as well as various other items or materials. Commonly, in agricultural terms, soil cover includes a measure of remaining crop residue, such as a remaining mass of plant stalks, as well as a measure of cover crop. Soil structure can refer to the arrangement of solid parts of the soil and the pore space located between the solid parts of the soil. Soil structure can include the way in which individual particles, such as individual particles of sand, silt, and clay, are assembled. Soil structure can be described in terms of grade (degree of aggregation), class (average size of aggregates), and form (types of aggregates), as well as a variety of other descriptions. These are merely examples. Various other characteristics and properties of the soil can be mapped as soil property values on a soil property map.

These soil property maps can be generated on the basis of data collected during another operation corresponding to the field of interest, for example, previous agricultural operations in the same season, such as planting operations or spraying operations, as well as previous agricultural operations performed in past seasons, such as a previous harvesting operation. The agricultural machines performing those agricultural operations can have on-board sensors that detect characteristics indicative of soil properties, for example, characteristics indicative of soil type, soil moisture, soil cover, soil structure, as well as various other characteristics indicative of various other soil properties. Additionally, operating characteristics, machine settings, or machine performance characteristics of the agricultural machines during previous operations along with other data can be used to generate a soil property map. For instance, header height data indicative of a height of an agricultural harvester's header across different geographic locations in the field of interest during a previous harvesting operation along with weather data that indicates weather conditions such as precipitation data or wind data during an interim period (such as the period since the time of the previous harvesting operation and the generation of the soil property map) can be used to generate a soil moisture map. For example, by knowing the height of the header, the amount of remaining plant residue, such as crop stalks, can be known or estimated and, along with precipitation data, a level of soil moisture can be predicted. This is merely an example.

In other examples, surveys of the field of interest can be performed, either by various machines with sensors, such as imaging systems, or by humans. The data collected during these surveys can be used to generate a soil property map. For instance, aerial surveys of the field of interest can be performed in which imaging of the field is conducted, and, on the basis of the image data, a soil property map can be generated. In another example, a human can go into the field to collect various data or samples, with or without the assistance of devices such as sensors, and, on the basis of the data or samples, a soil property map of the field can be generated. For instance, a human can collect a core sample at various geographic locations across the field of interest. These core samples can be used to generate soil property maps of the field. In other examples, the soil property maps can be based on user or operator input, such as an input from a farm manager, which may provide various data collected or observed by the user or operator.

Additionally, the soil property map can be obtained from remote sources, such as third-party service providers or government agencies, for instance, the USDA Natural Resources Conservation Service (NRCS), the United States Geological Survey (USGS), as well as from various other remote sources.

In some examples, a soil property map may be derived from sensor readings of one or more bands of electromagnetic radiation reflected by the soil (or surface of the field). Without limitation, these bands may be in the microwave, infrared, visible or ultraviolet portions of the electromagnetic spectrum.

The soil property map can be generated in a variety of other ways.

In one example, the present description relates to obtaining an information map, such as a crop state map. Crop state may define whether the crop is down, standing, partially down, the orientation of downing (e.g., compass direction) as well as the magnitude of downing. A crop state map illustratively maps the crop state across different locations in a field of interest. The crop state map may be generated from aerial or other images of the field of interest, from images or other sensor readings taken during a prior operation in the field (e.g., a prior spraying operation) or in other ways prior to harvesting. The crop state map may be generated in a variety of other ways.

In one example, the present description relates to obtaining an information map, such as a biomass map. A biomass map illustratively maps biomass values across different geographic locations in a field of interest. The biomass map can be generated based on historical biomass values, based on sensor readings taken during an aerial survey of the field of interest or during another operation on the field of interest, such as during a spraying operation performed by a sprayer with a sensor that detects characteristic(s) of the plants indicative of biomass, from human scouting of the field, or derived from other values, such as vegetative index values. The biomass map can be generated in a variety of other ways.

In one example, the present description relates to obtaining an information map, such as a predictive yield map. A predictive yield map illustratively maps predictive yield values across different geographic locations in a field of interest. The predictive yield values may based on sensor readings taken during an aerial survey of the field of interest or during another operation on the field of interest, or derived from other values, such as vegetative index values. In one example, the predictive yield map may be generated during the agricultural harvesting operation using one or more information maps, in-situ data, and predictive modeling. The predictive yield map can be generated in a variety of other ways.

In one example, the present description relates to obtaining an information map, such as a historical yield map. A historical yield map illustratively maps historical yield values across different geographic locations of interest. The historical yield values may be derived from sensor readings from previous harvesting operations on the field of interest or another field, such as another field having had a similar crop or crop genotype. The historical yield values may be derived from post harvesting measurement, taken after the previous harvesting operation was completed. The historical yield map may be generated in a variety of other ways.

In one example, the present description relates to obtaining an information map, such as a seeding map. A seeding map illustratively maps values of seeding characteristics (e.g., seed location, seed spacing, seed population, seed genotype, etc.) across different geographic locations in a field of interest. The seeding map may be derived from control signals used by a planter when planting seeds or from sensors on the seeder that confirm that a seed was metered or planted. The planters may also include geographic position sensors that geolocate the seed characteristics on the field. The seeding map can be generated in a variety of other ways.

In other examples, one or more other types of information maps can be obtained. The various other types of information maps illustratively map values of various other characteristics across different geographic locations in a field of interest.

The present discussion proceeds, in some examples, with respect to systems that obtain one or more information maps of a worksite (e.g., field) and also use an in-situ sensor to detect a characteristic. The systems generate a model that models a relationship between the values on the one or more obtained maps and the output values from the in-situ sensor. The model is used to generate a predictive map that predicts, for example, values of the characteristic detected by the in-situ sensor to different geographic locations in the worksite. The predictive map, generated during an operation, can be presented to an operator or other user or can be used in automatically controlling a mobile machine (e.g., agricultural harvester, receiving machines, etc.) or both, during an agricultural harvesting operation.

FIG. 1 is a partial pictorial, partial schematic, illustration of a self-propelled agricultural harvester 100. In the illustrated example, agricultural harvester 100 is a combine harvester. Further, although combine harvesters are provided as examples throughout the present disclosure, it will be appreciated that the present description is also applicable to other types of harvesters, such as cotton harvesters, sugarcane harvesters, self-propelled forage harvesters, windrowers, or other agricultural work machines. Consequently, the present disclosure is intended to encompass the various types of harvesters and is, thus, not limited to combine harvesters. Consequently, the present disclosure is intended to encompass these various types of harvesters and is thus not limited to combine harvesters.

As shown in FIG. 1, agricultural harvester 100 illustratively includes an operator compartment 101, which may have a variety of different operator interface mechanisms (e.g., 418 shown in FIG. 3) for controlling agricultural harvester 100. Agricultural harvester 100 includes a front-end subsystem that has front-end equipment, such as a header 102, and a cutter generally indicated at 104. Header 102 in FIG. 1 is illustrated as a reel-type header, but in other examples, other types of headers are contemplated, such as draper headers, corn headers, etc. Agricultural harvester 100 also includes a feeder house 106, a feed accelerator 108, and a thresher generally indicated at 110. The feeder house 106 and the feed accelerator 108 form part of a material handling subsystem 125. Header 102 is pivotally coupled to a frame 103 of agricultural harvester 100 along pivot axis 105. One or more actuators 107 drive movement of header 102 about axis 105 in the direction generally indicated by arrow 109. Thus, a vertical position of header 102 (the header height) above ground 111 over which the header 102 travels is controllable by actuating actuator 107. While not shown in FIG. 1, agricultural harvester 100 may also include one or more actuators that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground. The tilt angle is decreased by controlling header 102 to point the distal edge of cutter 104 more away from the ground. The roll angle refers to the orientation of header 102 about the front-to-back longitudinal axis of agricultural harvester 100 or about an axis parallel to the front-to-back longitudinal axis of agricultural harvester 100.

Thresher 110 illustratively includes a separation subsystem with a threshing rotor 112, a set of concaves 114, and a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, and clean grain elevator 130. The clean grain elevator 130 moves clean grain into clean grain tank 132. Agricultural harvester 100 also includes a material transfer subsystem that includes an unloading auger/blower 134, chute 134, and spout 136. Unloading auger/blower 134 coveys grain from grain tank 132 through chute 134 and spout 136 such that material can be offloaded from agricultural harvester 100. The material transfer subsystem is deployable from a storage position (shown in FIG. 1) to a wide range of angular positions for operation. Agricultural harvester 100 also includes a residue subsystem 138 that can include chopper 140 and spreader 142. Agricultural harvester 100 also includes a propulsion subsystem that includes an engine (or other power plant) that drives ground engaging components 144, such as wheels or tracks. In some examples, an agricultural harvester 100 within the scope of the present disclosure may have more than one of any of the subsystems mentioned above. In some examples, agricultural harvester 100 may have left and right cleaning subsystems, separators, etc., which are not shown in FIG. 1.

In operation, and by way of overview, agricultural harvester 100 illustratively moves through a field in the direction indicated by arrow 147. As agricultural harvester 100 moves, header 102 (and the associated reel 164) engages the crop to be harvested and gathers the crop toward cutter 104. An operator of agricultural harvester 100 can be a local human operator, a remote human operator, or an automated system. An operator command is a command by an operator. The operator of agricultural harvester 100 may determine one or more of a height setting, a tilt angle setting, or a roll angle setting for header 102. For example, the operator inputs a setting or settings to a control system, that controls actuator 107. The control system may also receive a setting from the operator for establishing the tilt angle and roll angle of the header 102 and implement the inputted settings by controlling associated actuators, not shown, that operate to change the tilt angle and roll angle of the header 102. The actuator 107 maintains header 102 at a height above ground 111 based on a height setting and, where applicable, at desired tilt and roll angles. Each of the height, roll, and tilt settings may be implemented independently of the others. The control system responds to header error (e.g., the difference between the height setting and measured height of header 102 above ground 111 and, in some examples, tilt angle and roll angle errors) with a responsiveness that is determined based on a selected sensitivity level. If the sensitivity level is set at a greater level of sensitivity, the control system responds to smaller header position errors, and attempts to reduce the detected errors more quickly than when the sensitivity is at a lower level of sensitivity.

Returning to the description of the operation of agricultural harvester 100, after crops are cut by cutter 104, the severed crop material is moved through a conveyor in feeder house toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow. In other examples, the residue subsystem 138 can include weed seed eliminators (not shown) such as seed baggers or other seed collectors, or seed crushers or other seed destroyers.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in agricultural harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

FIG. 1 also shows that, in one example, agricultural harvester 100 includes ground speed sensor 146, one or more separator loss sensors 148, a clean grain camera 150, a forward looking image capture mechanism 151, which may be in the form of a stereo or mono camera, one or more crop property sensors 200, 202, a geographic positioning system 203, and one or more loss sensors 152 provided in the cleaning subsystem 118.

Ground speed sensor 146 senses the travel speed of agricultural harvester 100 over the ground. Ground speed sensor 146 may sense the travel speed of the agricultural harvester 100 by sensing the speed of rotation of the ground engaging components (such as wheels or tracks), a drive shaft, an axle, or other components. In some instances, the travel speed may be sensed using geographic positioning system 203, which may be a global positioning system (GPS), a dead reckoning system, a long range navigation (LORAN) system, or a wide variety of other systems or sensors that provide an indication of a geographic positioning of agricultural harvester 100 in a global or local coordinate system. Detecting a change in position over time may provide an indication of travel speed.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 1. The separator loss sensors 148 may be associated with the left and right separators and may provide separate grain loss signals or a combined or aggregate signal. In some instances, sensing grain loss in the separators may also be performed using a wide variety of different types of sensors as well.

Agricultural harvester 100 may also include other sensors and measurement mechanisms. For instance, agricultural harvester 100 may include one or more of the following sensors: a header height sensor that senses a height of header 102 above ground 111; stability sensors that sense oscillation or bouncing motion (and amplitude) of agricultural harvester 100; a residue setting sensor that is configured to sense whether agricultural harvester 100 is configured to chop the residue, produce a windrow, etc.; a cleaning shoe fan speed sensor to sense the speed of cleaning fan 120; a concave clearance sensor that senses clearance between the rotor 112 and concaves 114; a threshing rotor speed sensor that senses a rotor speed of rotor 112; a chaffer clearance sensor that senses the size of openings in chaffer 122; a sieve clearance sensor that senses the size of openings in sieve 124; a material other than grain (MOG) moisture sensor, such as a capacitive moisture sensor, that senses a moisture level of the MOG passing through agricultural harvester 100; one or more machine setting sensors configured to sense various configurable settings of agricultural harvester 100; a machine orientation sensor (e.g., inertial measurement unit) that senses the orientation of agricultural harvester 100; mass sensors (e.g., pressure sensors, strain gauges, etc.) that sense a mass of material in grain tank 132; feed rate sensors that sense the feed rate of grain as the grain travels through the feeder house 106, clean grain elevator 130, or elsewhere in the agricultural harvester 100. In some implementations, the feed rate sensors sense the feed rate of biomass through feeder house 106, thresher 110, through the separator 116, or elsewhere in agricultural harvester 100. Further, in some instances, the feed rate sensors sense the feed rate as a mass flow rate of grain through elevator 130 or through other portions of the agricultural harvester 100 or provide other output signals indicative of other sensed variables. Various other sensors are contemplated herein, some of which are discussed in further detail below.

Figure 2:
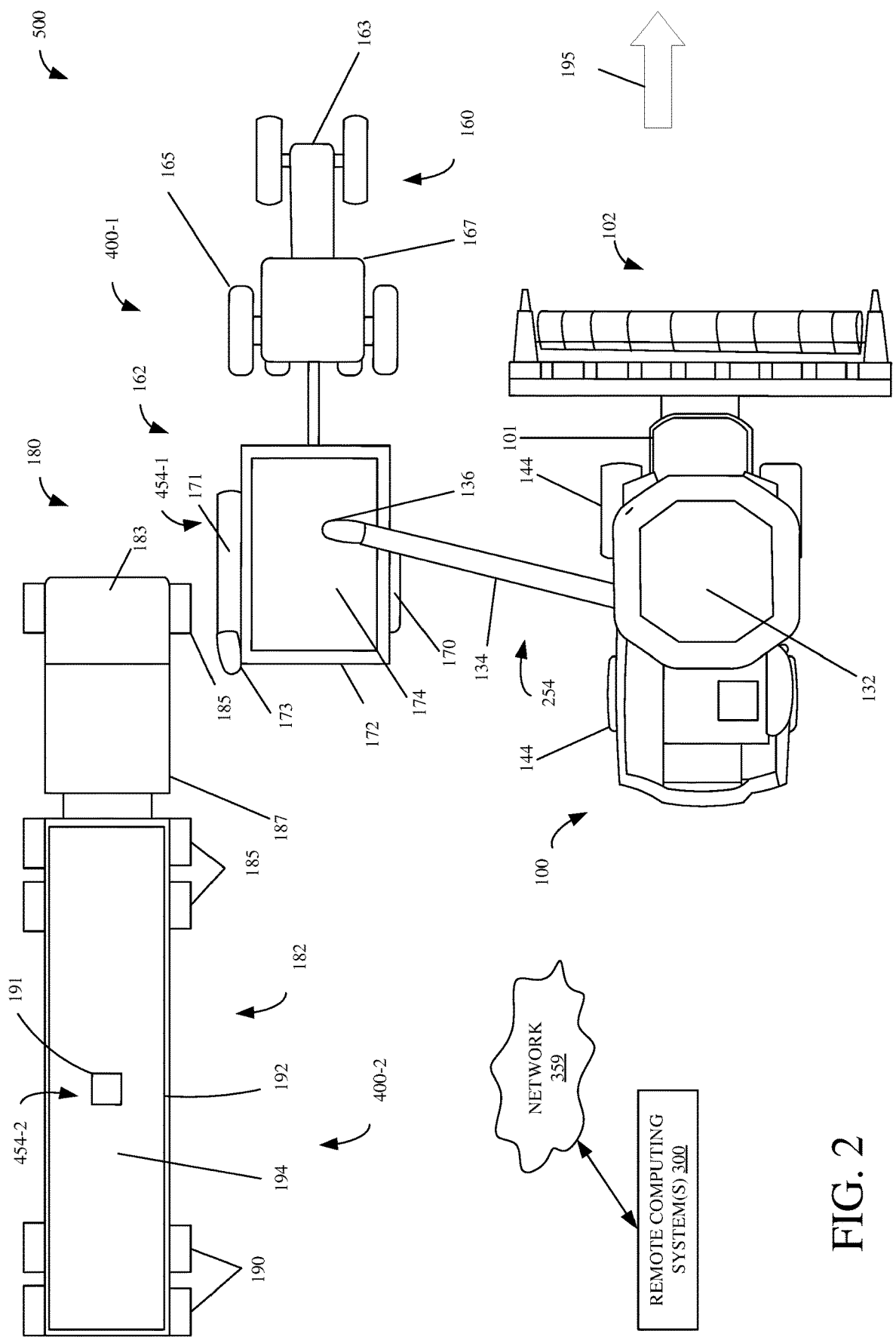
FIG. 2 is a partial plan view, partial pictorial illustration of one example of an agricultural harvesting system, including an agricultural harvester and receiving machine(s), according to some examples of the present disclosure.

FIG. 2 is a partial plan view, partial pictorial illustration of an agricultural harvesting system 500 and shows an agricultural harvester 100 and one or more receiving machines 400 operating at a worksite (e.g., field) during a harvesting operation. Agricultural harvesting system 500, as illustrated in FIG. 2, includes agricultural harvester 100, one or more receiving machines 400, one or more remote computing systems 300. Agricultural harvester 100, receiving machines 400, and remote computing systems 300 can communicate over network 359 via respective communication systems. Network 359 and the communication systems will be discussed in more detail in FIG. 3.

FIG. 2 shows that a receiving machine 400 can be include a towing vehicle and towed implement, such as a tractor 160 and towed grain cart 162 or a truck (e.g., semi-truck) 180 and trailer (e.g., semi-trailer) 182. Various other forms of receiving machines 400 are contemplated herein. In the illustrated example, agricultural harvester 100 is traveling in the direction indicated by arrow 195 and is harvesting crop, while receiving vehicle 400-1 is traveling alongside agricultural harvester 100 and is receiving harvested material (e.g., grain) from grain tank 132 of agricultural harvester 100 via material transfer subsystem 254 of agricultural harvester 100, which is shown in a deployed position. In other examples, receiving machine 400-1 may travel behind agricultural harvester 100 and receive harvested material. In other examples, receiving machine 400-2 can receive harvested material from agricultural harvester 100, including receiving harvested material from agricultural harvester 100 while traveling in tandem with agricultural harvester 100.

Tractor 106, as illustrated, includes a power plant 163 (e.g., internal combustion engine, battery and electric motors, etc.), ground engaging elements 165 (e.g., wheels or tracks), and an operator compartment 167. Grain cart 162 is coupled to tractor by way of a connection assembly (e.g., one or more of hitch, electrical coupling, hydraulic coupling, pneumatic coupling, etc.) and, as illustrated, includes ground engaging elements 170, such as wheels or tracks, grain bin 172 which includes a volume 174 for receiving material, such as harvested crop material from agricultural harvester 100. Grain cart 162 also includes a material transfer subsystem 454-1 which includes a chute 171, a spout 173, and an auger or blower (not shown) as well as various actuator(s) (not shown). Material transfer subsystem 454-1 is actuatable between a storage position (as shown) and a range of deployed positions. Material transfer subsystem 454 can be used to transfer material from grain bin 172 to another machine such as receiving machine 400-2, an elevator, a grinder, as well as various other machines or to a storage facility.

Truck 180, as illustrated, includes a power plant 183 (e.g., internal combustion engine, battery and electric motors, etc.), ground engaging elements 185 (e.g., wheels or tracks), and an operator compartment 187. Trailer 182 is coupled to track by way of a connection assembly (e.g., one or more of a hitch, electrical coupling, hydraulic coupling, pneumatic coupling, etc.) and, as illustrated, includes ground engaging elements 190, such as wheels or tracks, grain bin 192 which includes a volume 194 for receiving material, such as harvested crop material from agricultural harvester 100 or another receiving machine, such as receiving machine 400-1. Trailer 182 also includes a material transfer subsystem 454-2 which includes an actuatable door 191 disposed on the bottom side of trailer 182 as well as various actuator(s) (not shown). Actuatable door 191 is actuatable between an open position and a closed position, such that material in grain bin 192 can exit grain bin 192 via door 191. In one example, the interior walls of grain bin 192 taper towards door 191 such that material exits door 191 via gravity. Thus, material transfer subsystem 454-2 can be used to transfer material from grain bin 192 to another machine, such as an elevator, as well as various other machines or to a storage facility.

The operator compartments 101, 167, and 187 can include one or more operator interface mechanisms, which will be described below. Receiving machines 400 can include various other components as well, some of which will be described below.

Figure 3:
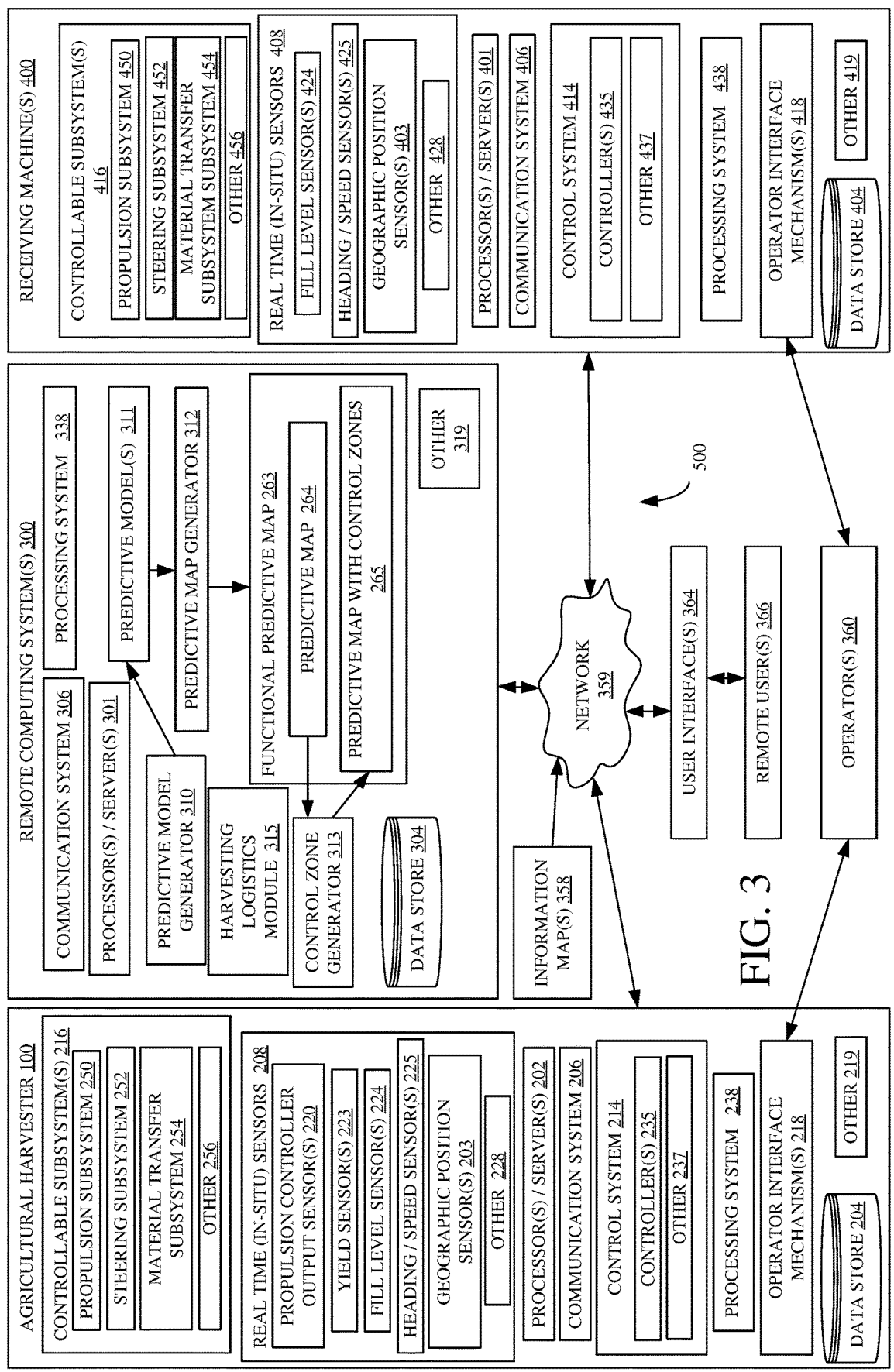
FIG. 3 is a block diagram showing some portions of an agricultural harvesting system, including a mobile machine, such as an agricultural harvester or a receiving machine, or both, in more detail, according to some examples of the present disclosure.

FIG. 3 is a block diagram of agricultural system 500 in more detail. FIG. 3 shows that agricultural system 500 includes agricultural harvester 100, one or more receiving machines 400, one or more remote computing systems 300, one or more remote user interfaces 364, network 359, and one or more information maps 358. Agricultural harvester 100, itself, illustratively includes one or more processors or servers 202, data store 204, communication system 206, one or more in-situ sensors 208 that sense one or more characteristics at a worksite concurrent with an operation, control system 214, one or more controllable subsystems 216, one or more operator interface mechanisms 218, processing system 238 that processes the sensor data (e.g., signals, images, etc.) generated by in-situ sensors 208 to generate processed sensor data, and can include various other items and functionality 219 as well. In-situ sensors 208 can include federate controller output sensors 220, yield sensors 223, fill level sensors 124, heading/speed sensors 225, geographic position sensors 203, and can include various other sensors 228 as well, including, but not limited to those described above in FIG. 1. The in-situ sensors 208 generate values corresponding to sensed characteristics. The information generated by in-situ sensors 208 can be communicated to receiving machines 400 and/or to remote computing systems 300. The information generated by in-situ sensors 208 can be georeferenced to areas of the worksite based on geographic location data provided by geographic position sensors 203. Control system 214, itself, can include one or more controllers 235 for controlling various other items of agricultural harvester 100, and can include other items 237 as well. Controllable subsystems 216 can include propulsion subsystem 250, steering subsystem 252, material transfer subsystem 254, and can include various other subsystems 256 as well, including, but not limited to those discussed above.

Receiving machines 400, themselves, illustratively include one or more processors or servers 402, data store 404, communication system 406, one or more in-situ sensors 408 that sense one or more characteristics at a worksite concurrent with an operation, control system 414, one or more controllable subsystems 416, one or more operator interface mechanisms 418, processing system 438 that processes the sensor data (e.g., signals, images, etc.) generated by in-situ sensors 408 to generate processed sensor data, and can include various other items and functionality 419 as well. In-situ sensors 408 can include fill level sensors 424, heading/speed sensors 425, geographic position sensors 403, and can include various other sensors 428 as well. The in-situ sensors 408 generate values corresponding to sensed characteristics. The information generated by in-situ sensors 408 can be communicated to other receiving vehicles 400, agricultural harvester 100, and/or to remote computing systems 300. The information generated by in-situ sensors 408 can be georeferenced to areas of the worksite based on geographic location data provided by geographic position sensor 403. Control system 414, itself, can include one or more controllers 435 for controlling various other items of a receiving machine 400, and can include other items 437 as well. Controllable subsystems 416 can include propulsion subsystem 450, steering subsystem 452, material transfer subsystem 454, and can include various other subsystems 456 as well.

Remote computing systems 300, as illustrated, include one or more processors or servers 301, data store 304, communication system 306, predictive model or relationship generator (collectively referred to herein as "predictive model generator 310"), predictive map generator 312, control zone generator 313, harvesting logistics module 315, processing system 338 which can process sensor data (e.g., signals, images, etc.) generated by in-situ sensors 208 or 408, or both, to generate processed sensor data, and can include various other items and functionality 319.

Fill level sensors 224 sense a characteristic indicative of a fill level of grain tank 132. Fill level sensors 224 can be an imaging system, such as a stereo or mono camera, that observes clean grain tank 132 and detects a fill level of material within the grain tank 132. The images generated by the imaging system can be processed, such as by processing system 238 or processing system 338, using suitable image processing, to generate a value indicative of the fill level of the grain tank 132. The imaging system can be mounted to the exterior side of the roof of the operator compartment 101, to the grain tank 132, or to other suitable locations on agricultural harvester 100. Fill level sensors 224 can include one or more electromagnetic radiation (ER) sensors that transmit and/or receive electromagnetic radiation (ER) to detect presence of material. For instance, one or more ER sensors can be placed within grain tank 132 at a given distance from a perimeter of the grain tank 132 or mounted to observe the interior of grain tank 132 to detect when the grain pile in the grain tank 132 has reached a given height. Fill level sensors 224 can include one or more mass sensors (such as load cells, strain gauges, pressure sensors, etc.) disposed within grain tank 132 or between grain tank 132 and another component (e.g., an axle or frame) of agricultural harvester 100. The mass sensors sense a mass of the material within grain tank 132 which can be used to derive a fill level of the grain tank 132. Fill level sensors 224 can also include or a one or more feed rate (or mass flow) sensors that measure an amount of material entering grain tank 132. For instance, a feed rate sensor that senses a feed rate of grain through the clean grain elevator 130 of the agricultural harvester 100. Fill level sensors 224 can also include one or more contact sensors disposed within the grain tank 132, for instance a contact pad that detects contact with grain, or a contact member that is displaced by contact with the grain. Various other types of fill level sensors are also contemplated herein.

Heading/speed sensors 225 detect a heading and speed characteristics (e.g., travel speed, acceleration, deceleration, etc.) at which agricultural harvester 100 is traversing the worksite during the operation. This can include sensors that sense the movement (e.g., rotation) of ground-engaging elements (e.g., wheels or tracks 144), or movement of components coupled to the ground engaging elements, or can utilize signals received from other sources, such as geographic position sensors 203, thus, while heading/speed sensors 225 as described herein are shown as separate from geographic position sensors 203, in some examples, machine heading/speed is derived from signals received from geographic position sensors 203 and subsequent processing. In other examples, heading/speed sensors 225 are separate sensors and do not utilize signals received from other sources.

Geographic position sensors 203 illustratively sense or detect the geographic position or location of agricultural harvester 100. Geographic position sensor 203 can include, but is not limited to, a global navigation satellite system (GNSS) receiver that receives signals from a GNSS satellite transmitter. Geographic position sensors 203 can also include a real-time kinematic (RTK) component that is configured to enhance the precision of position data derived from the GNSS signal. Geographic position sensors 203 can include a dead reckoning system, a cellular triangulation system, or any of a variety of other geographic position sensors.

Figure 7:
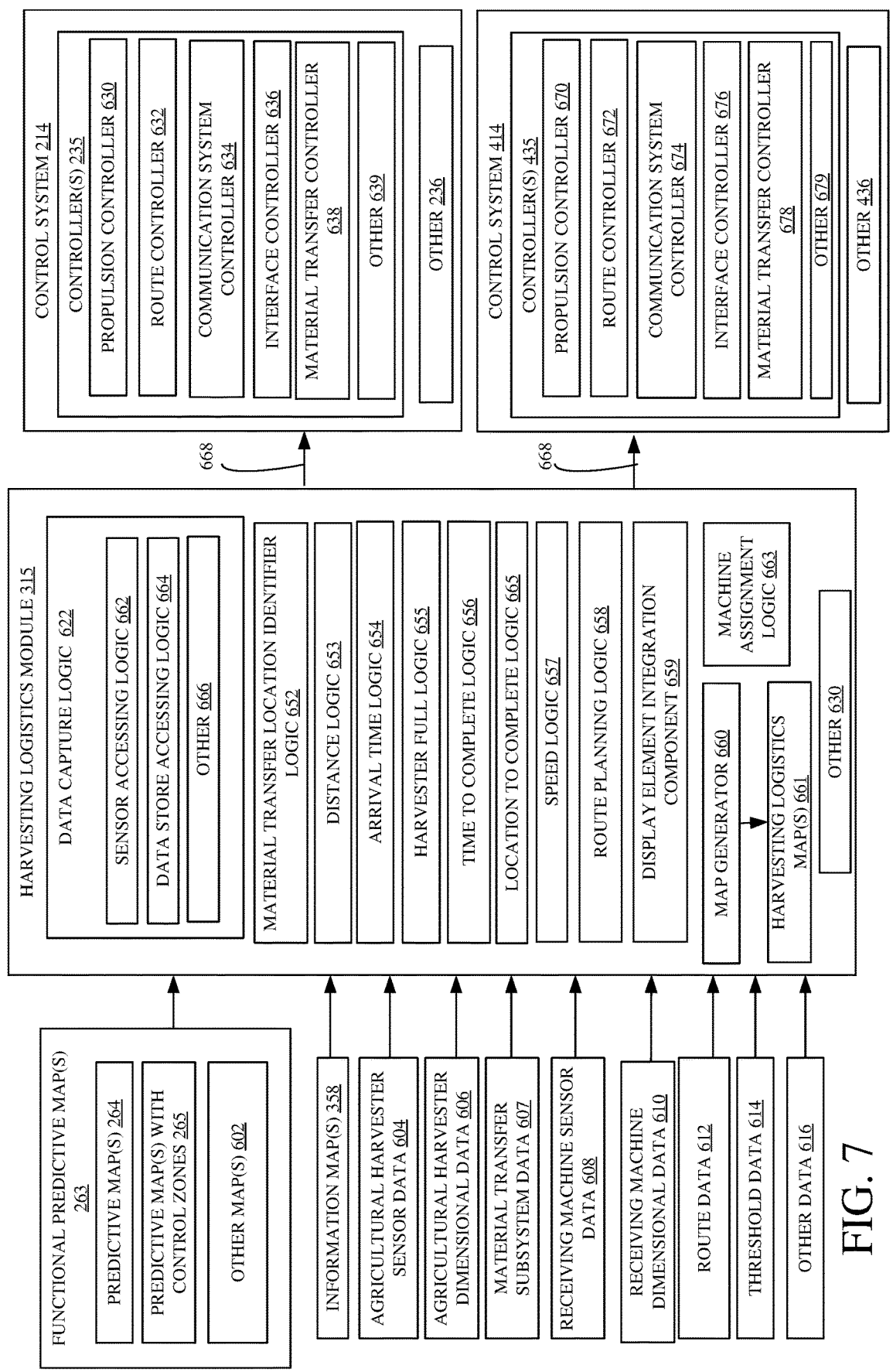
FIG. 7 is a block diagram showing one example of a harvesting logistics system in more detail.

Propulsion controller output sensors 220 illustratively sense or detect an output from a propulsion controller of agricultural harvester 100 (e.g., propulsion controller 630 shown in FIG. 7). The propulsion controller illustratively generates control outputs (e.g., control signals) that control propulsion subsystem 250 of agricultural harvester 100. Thus, propulsion controller output sensors 220 illustratively sense or detect a speed characteristic value commanded by the propulsion controller.

Yield sensors 223 illustratively sense or detect levels of yield of crop material (e.g., grain) harvested by agricultural harvester 100. Yield sensors 223 can include an imaging system (e.g., mono or stereo camera, an optical sensor, ultrasonic sensor, one or more mass sensors that sense a mass of crop material in clean grain tank 132, feed rate (or mass flow) sensors that detect a feed rate of grain to grain tank 132, etc. In some examples, yield sensors 223 utilize data received from other sources, such as fill level sensors 224, thus, while yield sensors 223 as described herein are shown as separate from fill level sensors 224, in some examples, yield is derived from sensor data received from fill level sensors 224.

In-situ sensors 208 can also include various other types of sensors 228.

Processing system 238 or processing system 338 processes the sensor data generated by in-situ sensors 208 to generate processed sensor data indicative of one or more characteristics. For example, processing system 238 or 338 generates processed sensor data indicative of characteristic values based on the sensor data (e.g., signals, images, etc.) generated by in-situ sensors 208, such as: speed characteristic values (e.g., travel speed values, acceleration values, and/or deceleration values) based on sensor data generated by propulsion controller output sensors 220; yield values based on sensor data generated by yield sensors 223; fill level values based on sensor data generated by fill level sensors 224; machine speed characteristic values (e.g., travel speed values, acceleration values, and/or deceleration values) based on sensor data generated by heading/speed sensors 225; machine heading values based on sensor data generated by heading/speed sensors 225; geographic position values based on sensor data generated by geographic position sensors 203; and various other characteristic values based on sensors data generated by various other in-situ sensors 228.

It will be understood that processing system 238 or 338 can be implemented by one or more processors or servers, such as processors or servers 201 or processors or servers 301, respectively. Additionally, processing system 238 and processing system 338 can utilize various sensor signal filtering, noise filtering, sensor signal categorization, aggregation, normalization, as well as various other processing functionality. Similarly, processing system 238 and processing system 338 can utilize various image processing such as, sequential image comparison, RGB, edge detection, black/white analysis, machine learning, neural networks, pixel testing, pixel clustering, shape detection, as well any number of other suitable image processing and data extraction functionality.

Fill level sensors 424 sense a characteristic indicative of a fill level of a grain bin of the respective receiving machine 400 (e.g., grain bin 172 or 192). Fill level sensors 424 can be an imaging system, such as a stereo or mono camera, that observes the grain bin of the respective receiving vehicle and detects a fill level of material within the grain bin. The images generated by the imaging system can be processed, such as by processing system 438 or processing system 338, using suitable image processing, to generate a value indicative of the fill level of the respective grain bin. The imaging system can be mounted to the exterior side of the roof of the operator compartment of the respective receiving machine (e.g., exterior side of the roof of operator compartment 167 or operator compartment 187), to the respective grain bin, or to other suitable locations on the respective receiving machine. Fill level sensors 424 can include one or more electromagnetic radiation (ER) sensors that transmit and/or receive electromagnetic radiation (ER) to detect presence of material. For instance, one or more ER sensors can be placed within the respective grain bin at a given distance from a perimeter of the grain bin or mounted to observe the interior of the grain bin to detect when the grain pile in the grain bin has reached a given height. Fill level sensors 424 can include one or more mass sensors (such as load cells, strain gauges, pressure sensors, etc.) disposed within the grain bin, between the grain bin and another component (e.g., an axle, a frame, etc.) of the receiving machine 400, and/or in the hitch assembly of the receiving vehicle 400. The mass sensors sense a mass of the material within the grain bin which can be used to derive a fill level of the grain bin. Fill level sensors 424 can also include one or more contact sensors disposed within the respective grain bin, for instance a contact pad that detects contact with grain, or a contact member that is displaced by contact with the grain. Various other types of fill level sensors are also contemplated herein In some examples, the fill level of the grain bin of the receiving machine is derived from sensors disposed on the agricultural harvester 100 or disposed on another receiving machine (e.g., in the case where another receiving machine is transferring material to the receiving machine 400). For instance, an imaging system, such as a stereo or mono camera can be mounted on the agricultural harvester 100 (e.g., on the chute 134) or another receiving machine (e.g., on the chute 171) and can be disposed to view the grain bin of the receiving machine during a material transfer operation. In another example, the agricultural harvester 100 or another receiving machine, or both, can include a mass flow sensor that senses a mass flow of material through the chute 134 or 171, respectively, which can be used to derive a fill level of the grain bin of the receiving machine 400. In another example, the agricultural harvester 100 or other receiving machine, or both, can include a sensor that senses a speed of the auger or blower of the material transfer subsystem 254 or material transfer subsystem 454, respectively, to derive flow rate of material to derive a fill level of the grain bin of the receiving machine 400. The sensor data generated by the sensors on the agricultural harvester 100 (or the processed sensor data) can be communicated to the remote computing systems 300 or to the receiving machine 400, or both. The sensor data generated by the sensors on the other receiving machine (or the processed sensor data) can be communicated to the remote computing systems 300 or to the receiving machine 400, or both.

Heading/speed sensors 425 detect a heading and speed characteristics (e.g., travel speed, acceleration, deceleration, etc.) at which the respective receiving machine 200 is traversing the worksite during the operation. This can include sensors that sense the movement (e.g., rotation) of ground-engaging elements (e.g., wheels or tracks 165, 170, 185, and/or 190), or the movement of components coupled to the ground engaging elements, or can utilize data received from other sources, such as geographic position sensors 403, thus, while heading/speed sensors 425 as described herein are shown as separate from geographic position sensor 403, in some examples, machine heading/speed is derived from sensor data received from geographic position sensors 403 and subsequent processing. In other examples, heading/speed sensors 425 are separate sensors and do not utilize signals received from other sources.

Geographic position sensor 403 illustratively senses or detects the geographic position or location of the respective receiving machine 400. Geographic position sensor 403 can include, but is not limited to, a global navigation satellite system (GNSS) receiver that receives signals from a GNSS satellite transmitter. Geographic position sensor 403 can also include a real-time kinematic (RTK) component that is configured to enhance the precision of position data derived from the GNSS signal. Geographic position sensor 403 can include a dead reckoning system, a cellular triangulation system, or any of a variety of other geographic position sensors.

In-situ sensors 408 can also include various other types of sensors 428.

Processing system 438 or processing system 338 processes the sensor data generated by in-situ sensors 408 to generate processed sensor data indicative of one or more characteristics. For example, processing system 438 or 338 generates processed sensor data indicative of characteristic values based on the sensor data (e.g., signals, images, etc.) generated by in-situ sensors 408, such as: fill level values based on sensor data generated by fill level sensors 424, machine speed characteristic values (e.g., travel speed values, acceleration values, and/or deceleration values) based on sensor data generated by heading/speed sensors 425, machine heading values based on sensor data generated by heading/speed sensors 425, geographic position values based on sensor data generated by geographic position sensors 403; and various other characteristic values based on sensors data generated by various other in-situ sensors 428.

It will be understood that processing system 438 can be implemented by one or more processers or servers, such as processors or servers 401. Additionally, processing system 438 can utilize various sensor signal filtering, noise filtering, sensor signal categorization, aggregation, normalization, as well as various other processing functionality. Similarly, processing system 438 can utilize various image processing such as, sequential image comparison, RGB, edge detection, black/white analysis, machine learning, neural networks, pixel testing, pixel clustering, shape detection, as well any number of other suitable image processing and data extraction functionality.

Control system 214 can include a variety of controllers 235, such as a communication system controller to control communication system 206, a propulsion controller to control propulsion subsystem 250 to control a travel speed, acceleration, and/or deceleration of agricultural harvester 100, a path planning controller to control steering subsystem 252 to control the heading of agricultural harvester 100, and a material transfer controller to control material transfer subsystem 254, to initiate or end a material transfer operation, to control the position of chute 134 and/or spout 136, and/or to control the actuation (speed) of the auger or blower 133. Controllers 235 can also include an operator interface controller to control operator interface mechanisms 218 to provide indications, such as displays, alerts, notifications, as well as various other outputs. Some examples of the different types of controllers 235 will be shown in FIG. 6.

Control system 414 can include a variety of controllers 435, such as a communication system controller to control communication system 206, a propulsion controller to control propulsion subsystem 450 to control a travel speed, acceleration, and/or deceleration of the respective receiving vehicle 400, a path planning controller to control steering subsystem 452 to control the heading of the respective receiving vehicle 400, and a material transfer controller to control material transfer subsystem 454, to initiate or end a material transfer operation, to control the actuation of door 191 or to control the position of chute 171 and/or spout 173, and/or to control the actuation (speed) of the auger or blower. Controllers 435 can also include an operator interface controller to control operator interface mechanisms 418 to provide indications, such as displays, alerts, notifications, as well as various other outputs. Some examples of the different types of controllers 435 will be shown in FIG. 6.

Communication system 206 is used to communicate between components of agricultural harvester 100 or with other items of agricultural system 500, such as remote computing systems 300 and/or receiving machines 400. Communication system 206 can include one or more of wired communication circuitry and wireless communication circuitry, as well as wired and wireless communication components. In some examples, communication system 206 can be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication system 206 can also include a system that facilitates downloads or transfers of information to and from a secure digital (SD) card or a universal serial bus (USB) card, or both. Communication system can utilize network 359. Network 359 can be any of a wide variety of different types of networks such as the Internet, a cellular network, a wide area network (WAN), a local area network (LAN), a controller area network (CAN), a near-field communication network, or any of a wide variety of other networks or communication systems.

Communication system 406 is used to communicate between components of the respective receiving machine 400 or with other items of agricultural system 500, such as remote computing systems 300, other receiving machines 400, and/or agricultural harvester 100. Communication system 406 can include one or more of wired communication circuitry and wireless communication circuitry, as well as wired and wireless communication components. In some examples, communication system 406 can be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication system 406 can also include a system that facilitates downloads or transfers of information to and from a secure digital (SD) card or a universal serial bus (USB) card, or both. Communication system 406 can utilize network 359.

Communication system 306 is used to communicate between components of the remote computing system 300 or with other items of agricultural system 500, such as remote receiving machines 400 and/or agricultural harvester 100. Communication system 306 can include one or more of wired communication circuitry and wireless communication circuitry, as well as wired and wireless communication components. In some examples, communication system 306 can be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication system 306 can also include a system that facilitates downloads or transfers of information to and from a secure digital (SD) card or a universal serial bus (USB) card, or both. In communicating with other items of agricultural system 500, communication system can utilize network 359.

FIG. 3 also shows remote users 366 interacting with agricultural harvester 100, receiving machines 400, and/or remote computing systems 300 through user interfaces mechanisms 364 over network 359. In some examples, user interface mechanisms 364 may include joysticks, levers, a steering wheel, linkages, pedals, buttons, wireless devices (e.g., mobile computing devices, etc.), dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the users 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

FIG. 3 also shows that one or more operators 360 may operate agricultural harvester 100 and receiving machines 400. The operators 360 interact with operator interface mechanisms 218 and 418. In some examples, operator interface mechanisms 218 and 418 may include joysticks, levers, a steering wheel, linkages, pedals, buttons, wireless devices (e.g., mobile computing devices, etc.), dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the operators 360 may interact with operator interface mechanisms 218 and 418 using touch gestures. These examples described above are provided as illustrative examples and are not intended to limit the scope of the present disclosure. Consequently, other types of operator interface mechanisms 218 and 418 may be used and are within the scope of the present disclosure.

Remote computing systems 300 can be a wide variety of different types of systems, or combinations thereof. For example, remote computing systems 300 can be in a remote server environment. Further, remote computing systems 300 can be remote computing systems, such as mobile devices, a remote network, a farm manager system, a vendor system, or a wide variety of other remote systems. In one example, agricultural harvester 100 or receiving machines 400, or both, can be controlled remotely by remote computing systems 300 or by remote users 366, or both. As will be described below, in some examples, one or more of the components shown in FIG. 3 as being disposed on agricultural harvester 100 or on receiving machines 400 can be located elsewhere, such as at remote computing systems 300. Similarly, in some examples, one or more of the components shown in FIG. 3 as being disposed on remote computing systems 300 can be located elsewhere, such as on agricultural harvester 100 or receiving machines 400, or both.

FIG. 3 also shows that agricultural harvesting system 500 can obtain one or more information maps 358. As described herein, the information maps 358 include, for example, one or more of a vegetative index map, a historical yield map, a predictive yield map, a biomass map, a crop state map, a topographic map, a soil property map, and a seeding map. However, information maps 358 may also encompass other types of data, such as other types of data that were obtained prior to a harvesting operation or a map from a prior operation. In other examples, information maps 358 can be generated during a current operation, such a map generated by predictive map generator 312 based on a predictive model 311 generated by predictive model generator 310.

Information maps 358 may be downloaded over network 359 and stored in a data store, such as data store 302, using a communication system, such as communication system 306, or in other ways.

Predictive model generator 310 generates a predictive model or relationship (collectively referred to hereinafter as "predictive model 311") that is indicative of a relationship between the values sensed by the in-situ sensors 208 or derived from sensor data generated by in-situ sensors 208 and values mapped to the worksite by the information maps 358. As an illustrative example, if the information map 358 maps a vegetative index value to different locations in the worksite, and the in-situ sensor 208 is sensing a value indicative of yield, then model generator 310 generates a predictive yield model that models the relationship between vegetative index values and yield values. As another illustrative example, if the information map 358 maps a biomass value to different locations in the worksite, and the in-situ sensor 208 is sensing a value indicative of a speed characteristic, then model generator 310 generates a predictive speed model that models the relationship between biomass values and speed characteristic values.

In some examples, the predictive map generator 312 uses the predictive models 311 generated by predictive model generator 310 to generate functional predictive maps 263 that predict the value of a characteristic sensed by the in-situ sensors 208 at different locations in the worksite based upon one or more of the information maps 358. Keeping with the previous example, where the predictive model 311 is a predictive yield model that models a relationship between yield values sensed by in-situ sensors 208 and vegetative index values from a vegetative index map, then predictive map generator 312 generates a functional predictive yield map that predicts yield values at different locations at the field based on the mapped vegetative index values at those locations and the predictive yield model. Keeping with the previous example, where the predictive model 311 is a predictive speed model that models a relationship between speed characteristic values sensed by in-situ sensors 208 and biomass values from a biomass map, then predictive map generator 312 generates a functional predictive speed map that predicts speed characteristic values at different locations at the field based on the mapped biomass values at those locations and the predictive speed model.

In some examples, the type of values in the functional predictive map 263 may be the same as the in-situ data type sensed by the in-situ sensors 208. In some instances, the type of values in the functional predictive map 263 may have different units from the data sensed by the in-situ sensors 208. In some examples, the type of values in the functional predictive map 263 may be different from the data type sensed by the in-situ sensors 208 but have a relationship to the type of data type sensed by the in-situ sensors 208. For example, in some examples, the data type sensed by the in-situ sensors 208 may be indicative of the type of values in the functional predictive map 263. In some examples, the type of data in the functional predictive map 263 may be different than the data type in the information maps 358. In some instances, the type of data in the functional predictive map 263 may have different units from the data in the information maps 358. In some examples, the type of data in the functional predictive map 263 may be different from the data type in the information map 358 but has a relationship to the data type in the information map 358. For example, in some examples, the data type in the information maps 358 may be indicative of the type of data in the functional predictive map 263. In some examples, the type of data in the functional predictive map 263 is different than one of, or both of, the in-situ data type sensed by the in-situ sensors 208 and the data type in the information maps 358. In some examples, the type of data in the functional predictive map 263 is the same as one of, or both of, of the in-situ data type sensed by the in-situ sensors 208 and the data type in information maps 358. In some examples, the type of data in the functional predictive map 263 is the same as one of the in-situ data type sensed by the in-situ sensors 208 or the data type in the information maps 358, and different than the other.

Continuing with the preceding example, in which information map 358 is a vegetative index map and in-situ sensor 208 senses a value indicative of a yield value, predictive map generator 312 can use the vegetative index values in information map 358, and the predictive yield model 311 generated by predictive model generator 310, to generate a functional predictive map 263 that predicts the yield value at different locations in the worksite. Predictive map generator 312 thus outputs predictive map 264. Continuing with the preceding example, in which information map 358 is a biomass map and in-situ sensor 208 senses a value indicative of a speed characteristic, predictive map generator 312 can use the biomass values in information map 358, and the predictive speed model 311 generated by predictive model generator 310, to generate a functional predictive map 363 that predicts the speed characteristic value at different locations in the worksite.

As shown in FIG. 3, predictive map 264 predicts the value of a sensed characteristic (sensed by in-situ sensors 208), or a characteristic related to the sensed characteristic, at various locations across the worksite based upon one or more information values in one or more information maps 358 at those locations and using the predictive model(s) 311. For example, if predictive model generator 310 has generated a predictive model 311 indicative of a relationship between crop state values and speed characteristic values, then, given the crop state value (from a crop state map) at different locations across the worksite, predictive map generator 312 generates a predictive map 264 that predicts speed characteristic values at different locations across the worksite. The crop state value, obtained from the crop state map, at those locations and the relationship between crop state values and speed characteristic values, obtained from the predictive model 311, are used to generate the predictive map 264. This is merely one example.

Some variations in the data types that are mapped in the information maps 358, the data types sensed by in-situ sensors 208, and the data types predicted on the predictive map 264 will now be described.

In some examples, the data type in one or more information maps 358 is different from the data type sensed by in-situ sensors 208, yet the data type in the predictive map 264 is the same as the data type sensed by the in-situ sensors 208. For instance, the information map 358 may be a topographic map, and the variable sensed by the in-situ sensors 308 may be speed characteristic values. The predictive map 264 may then be a predictive speed map that maps predicted speed values to different geographic locations in the in the worksite.

Also, in some examples, the data type in the information map 358 is different from the data type sensed by in-situ sensors 208, and the data type in the predictive map 264 is different from both the data type in the prior information map 358 and the data type sensed by the in-situ sensors 108.

In some examples, the information map 358 is from a prior pass through the field during a prior operation and the data type is different from the data type sensed by in-situ sensors 208, yet the data type in the predictive map 264 is the same as the data type sensed by the in-situ sensors 208. For instance, the information map 358 may be a seeding map generated based on information from a previous planting operation on the worksite, and the variable sensed by the in-situ sensors 208 may be speed characteristic values. The predictive map 264 may then be a predictive speed map that maps predicted speed characteristic values to different geographic locations in the worksite.

In some examples, the information map 358 is from a prior pass through the field during a prior operation and the data type is the same as the data type sensed by in-situ sensors 208, and the data type in the predictive map 264 is also the same as the data type sensed by the in-situ sensors 208. For instance, the information map 358 may be a historical yield map generated during a previous year, and the variable sensed by the in-situ sensors 208 may yield values. The predictive map 264 may then be a predictive yield map that maps predicted yield values to different geographic locations in the field. In such an example, the relative yield value differences in the georeferenced information map 358 from the prior year can be used by predictive model generator 310 to generate a predictive model that models a relationship between the relative yield value differences on the information map 358 and the yield values sensed by in-situ sensors 208 during the current operation. The predictive model is then used by predictive map generator 312 to generate a predictive yield map.

In another example, the prior information map 258 may be a map generated during a prior operation in the same year and the data type is different from the data type sensed by the in-situ sensors 208, and the data type in the predictive map 264 is also the same as the data type sensed by the in-situ sensors 208. For instance, the information map 358 may be a crop state map generated on the basis of sensor data generated during a spraying operation earlier in the same year, and the variable sensed by the in-situ sensors 208 during the current harvesting operation may be speed characteristic values. The predictive map 264 may then be a predictive speed map that maps predictive speed characteristic values to different geographic locations in the worksite.

In such an example, the crop state values at time of the prior spraying operation are geo-referenced, recorded, and provided to remote computing systems 300 as an information map 358 of crop state values. In-situ sensors 208 during a current harvesting operation can detect speed characteristic values at geographic locations in the worksite and predictive model generator 310 may then build a predictive model that models a relationship between speed characteristic values at time of the current harvesting operation and crop state values at the time of the prior spraying operation. This is because the crop state values at the time of the prior spraying operation in the same year are likely to be the same as at the time of the current harvesting operation or otherwise may be more accurate than the crop state values for the worksite provided in other ways.

In some examples, predictive map 264 can be provided to the control zone generator 313. Control zone generator 313 groups adjacent portions of an area into one or more control zones based on data values of predictive map 264 that are associated with those adjacent portions. A control zone may include two or more contiguous portions of a worksite, such as a field, for which a control parameter corresponding to the control zone for controlling a controllable subsystem is constant. For example, a response time to alter a setting of controllable subsystems may be inadequate to satisfactorily respond to changes in values contained in a map, such as predictive map 264. In that case, control zone generator 313 parses the map and identifies control zones that are of a defined size to accommodate the response time of the controllable subsystems. In another example, control zones may be sized to reduce wear from excessive actuator movement resulting from continuous adjustment. In some examples, there may be a different set of control zones for each controllable subsystem or for groups of controllable subsystems. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265. In some examples, multiple crops may be simultaneously present in a field if an intercrop production system is implemented. In that case, predictive map generator 312 and control zone generator 313 are able to identify the location and characteristics of the two or more crops and then generate predictive map 264 and predictive map with control zones 265 accordingly.

It will also be appreciated that control zone generator 313 can cluster values to generate control zones and the control zones can be added to predictive control zone map 265, or a separate map, showing only the control zones that are generated. In some examples, the control zones may be used for controlling or calibrating agricultural harvester 100 or receiving machines 400, or both. In other examples, the control zones may be presented to operator(s) 360 and used to control or calibrate agricultural harvester 100 or receiving machines 400, or both, and, in other examples, the control zones may be presented to an operator 360 or another user, such as a remote user 366, or stored for later use.

Predictive map 264 or predictive control zone map 265 or both are provided to control system 214, which generates control signals based upon the predictive map 264 or predictive control zone map 265 or both to control agricultural harvester 100. Predictive map 264 or predictive control zone map 265 or both are provided to control system 414, which generates control signals based upon the predictive map 264 or predictive control zone map 265 or both to control the respective receiving machine 400.

While the illustrated example of FIG. 3 shows that various components of agricultural harvesting system 500 are located at specific locations, it will be understood that in other examples one or more of the components illustrated as being located at one location in FIG. 3 can be located at other locations. For example, one or more of predictive model generator 310, predictive model 311, predictive map generator 312, functional predictive maps 263 (e.g., 264 and 265), and control zone generator 313 can be located on agricultural harvester 100 or receiving machines 400, or both, but can communicate with other items of agricultural system 500 over network 359. Thus, the predictive models 311 and functional predictive maps 263 may be generated locally at agricultural harvester 100 or receiving machines 400 and communicated to other items in agricultural system 500. In other examples, agricultural harvester 100 or receiving machines 400 may access the predictive models 311 and functional predictive maps 263 at the remote locations without downloading the predictive models 311 and functional predictive maps 263. In other examples, one or more of control system 214 and control system 414, or components thereof, can be located at remote computing systems 300. In another example, remote computing systems 300 can include a control system or a control value generator that communicates control commands to one or more of agricultural harvester 100 and receiving machines 400 which are then used by the local control system of the agricultural harvester 100 and/or the receiving machines 400. These are merely some examples of the ways in which the agricultural system 500 can be distributed. Thus, it will be understood that the items in agricultural system 500 can be distributed in various ways, including ways that differ from the example shown in FIG. 3.

Figure 4:
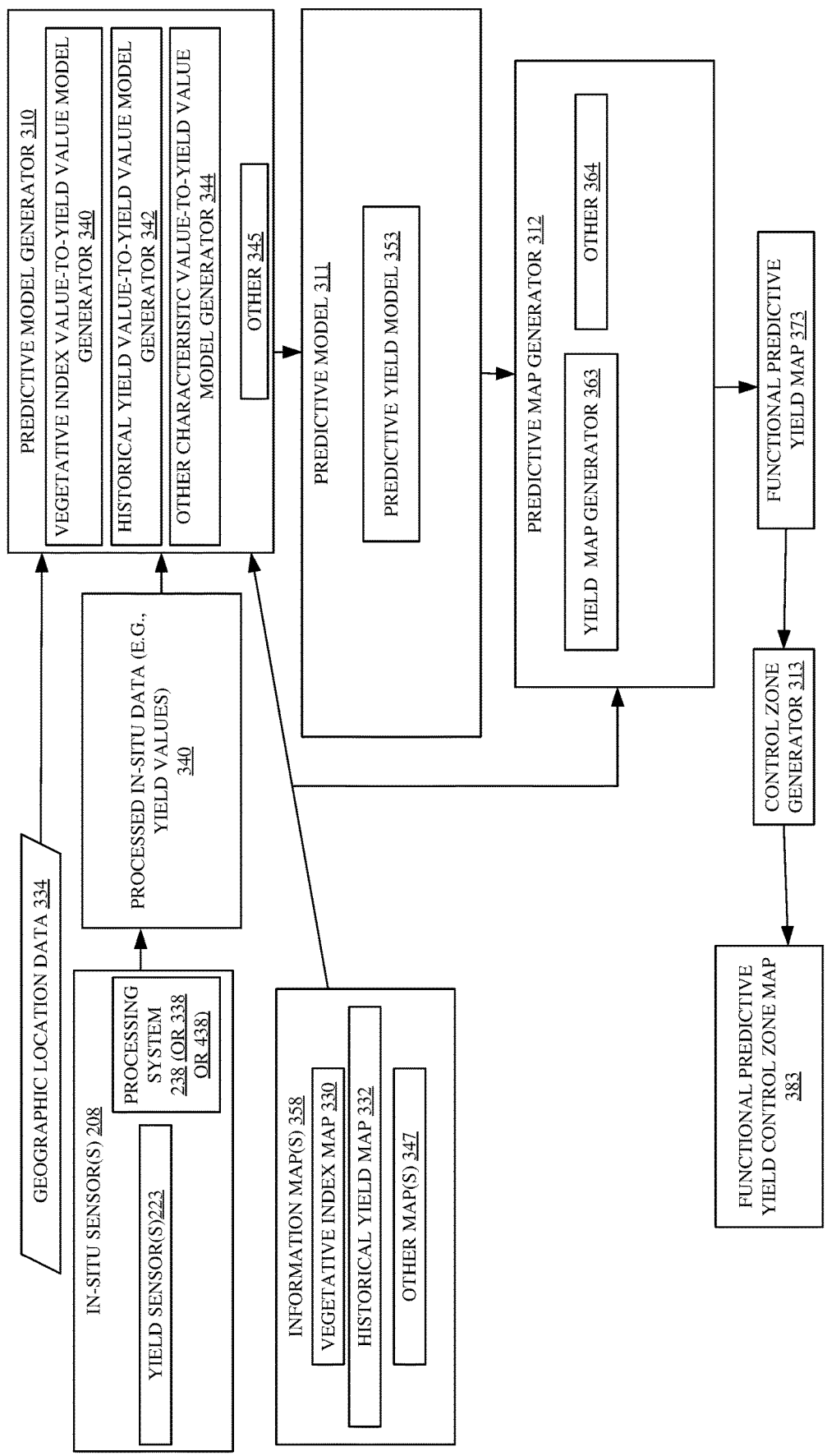
FIG. 4 is a block diagram showing one example of a predictive model generator and predictive map generator.

FIG. 4 is a block diagram of a portion of the agricultural harvesting system architecture 500 shown in FIG. 3. Particularly, FIG. 4 shows, among other things, examples of the predictive model generator 310 and the predictive map generator 312 in more detail. FIG. 4 also illustrates information flow among the various components shown. The predictive model generator 310 receives one or more information map(s) 358. In the example illustrated in FIG. 4, information maps 358 include one or more of a vegetative index map 330, a historical yield map 332, or any of a wide variety of other maps 347. Predictive model generator 310 also receives geographic location data 334, such as an indication of a geographic location, from geographic position sensor 203. In-situ sensors 208 illustratively include yield sensors 223 as well as a processing system 238. Processing system 238 processes sensor data generated from yield sensors 223 to generate processed sensor data 340 indicative of yield values. In some examples, other processing systems, such as processing system 338 or processing system 438 can process sensor data generated from in-situ sensors 208. Additionally, while the example shown in FIG. 4 illustrates the processing system 238 (or 338 or 438) as part of in-situ sensors 208, in other examples, processing system 238 (or 338 or 438) is separate from in-situ sensors 208 but in communication with in-situ sensors 208, such as the example shown in FIG. 3.

It will be understood that geographic location data 334 illustratively represents geographic locations on a field to which the values indicated by sensors 208 correspond. For example, where the in-situ sensor 208 detects a characteristic value, geographic location data 334 indicates the location of the field where that detected characteristic value corresponds. It will be understood that the geographic location of the agricultural harvester 100 at the time the characteristic value is detected by the in-situ sensor 208 may not be the location on the field to which the characteristic value corresponds. For instance, in the example of yield values detected by a yield sensor 223, the geographic location on the field to which the yield value corresponds may be behind the agricultural harvester 100 at the time the yield is detected. This is because an amount of time passes between when the crop (to which the yield corresponds) is encountered by the agricultural harvester 100 and when the crop is detected by the yield sensor 223. This latency can be taken into account when georeferencing the yield values detected by the yield sensor 223.

Thus, the geographic location data 334, indicative of the geographic location on the field to which the characteristic value detected by the in-situ sensor 208 corresponds, can be derived from sensor data from geographic position sensor 203 along with heading data, travel speed data, machine latency data, as well as positional data of the sensor relative to the geographic position sensor 203 (or relative to another part of the agricultural harvester 100, such as the front of the header 102). This is merely one example. In any case, it will be understood that geographic location data 334 represents the geographic location on the field to which the characteristic values (e.g., yield values) correspond.

As shown in FIG. 4, the example predictive model generator 310 includes one or more of a vegetative index value-to-yield value model generator 340, a historical yield value-to-yield value model generator 342, and an other characteristic value-to-yield value model generator 344. In other examples, the predictive model generator 310 may include additional, fewer, or different components than those shown in the example of FIG. 4. Consequently, in some examples, the predictive model generator 310 may include other items 345 as well, which may include other types of predictive model generators to generate other types of predictive models.

Vegetative index value-to-yield value model generator 340 identifies a relationship between yield value(s) detected in processed sensor data 340, at geographic location(s) to which the detected yield value(s) correspond, and vegetative index (VI) value(s) from the VI map 330 corresponding to the same location(s) in the worksite where the yield value(s) correspond. Based on this relationship established by vegetative index value-to-yield value model generator 1470, vegetative index value-to-yield value model generator 1470 generates a predictive yield model. The predictive yield model is used by yield map generator 363 to predict yield values at different locations in the worksite based upon the georeferenced VI value contained in the vegetative index map 330 at the different locations in the worksite. Thus, for a given location in the worksite, a yield value can be predicted at the given location based on the predictive yield model and the VI value, from the vegetative index map 330, at that given location.

Historical yield value-to-yield value model generator 342 identifies a relationship between yield value(s) detected in processed sensor data 340, at geographic location(s) to which the detected yield value(s) correspond, and historical yield value(s) from the historical yield map 332 corresponding to the same location(s) in the worksite where the yield value(s) correspond. Based on this relationship established by historical yield value-to-yield value model generator 342, historical yield value-to-yield value model generator 342 generates a predictive yield model. The predictive yield model is used by yield map generator 363 to predict yield values at different locations in the worksite based upon the georeferenced historical yield value contained in the historical yield map 332 at the different locations in the worksite. Thus, for a given location in the worksite, a yield value can be predicted at the given location based on the predictive yield model and the historical yield value, from the historical yield map 332, at that given location.

Other characteristic value-to-yield value model generator 344 identifies a relationship between yield value(s) detected in processed sensor data 340, at geographic location(s) to which the detected yield value(s) correspond, and other characteristic value(s) from an other map 347 corresponding to the same location(s) in the worksite where the yield value(s) correspond. Based on this relationship established by other characteristic value-to-yield value model generator 344, other characteristic value-to-yield value model generator 344 generates a predictive yield model. The predictive yield model is used by yield map generator 363 to predict yield values at different locations in the worksite based upon the georeferenced other characteristic value contained in the other map 347 at the different locations in the worksite. Thus, for a given location in the worksite, a yield value can be predicted at the given location based on the predictive yield model and the other characteristic value, from the other map 347, at that given location.

In light of the above, the predictive model generator 310 is operable to produce a plurality of predictive yield models, such as one or more of the predictive yield models generated by model generators 340, 342, 344, and 345. In another example, two or more of the predictive yield models described above may be combined into a single predictive yield model, such as a predictive yield model that predicts yield values based upon two or more of the vegetative index value, the historical yield value, and the other characteristic value at those different locations in the field. Any of these predictive yield models, or combinations thereof, are represented collectively by predictive yield model 353 in FIG. 4.

The predictive yield model 353 is provided to predictive map generator 312. In the example of FIG. 4, predictive map generator 312 includes a predictive yield map generator 363. In other examples, predictive map generator 312 may include additional or different map generators. Thus, in some examples, predictive map generator 312 may include other items 364 which may include other types of map generators to generate other types of maps.

Predictive yield map generator 363 receives one or more of the vegetative index map 330, the historical yield map 332, and other maps 347 along with the predictive yield model which predicts yield values based upon one or more of vegetative index values, historical yield values, and other characteristic values and generates a functional predictive yield map 373 that predicts yield values at different locations in the worksite.

The functional predictive yield map 373 is a predictive map 264. The functional predictive yield map 373 predicts yield values at different locations in a worksite. The functional predictive yield map 373 may be provided to control zone generator 313, control system 214, and/or control system 414. Control zone generator 313 generates control zones and incorporates those control zones into the functional predictive yield map 373 to produce a predictive control zone map 265, that is, a functional predictive yield control zone map 383. One or both of functional predictive yield map 373 and functional predictive yield control zone map 383 may be provided to control system 214, which generates control signals to control one or more of the controllable subsystems 216 based upon the functional predictive yield map 373, the functional predictive yield control zone map 383, or both. One or both of functional predictive yield map 373 and functional predictive yield control zone map 383 may be provided to control system 414, which generates control signals to control one or more of the controllable subsystems 416 based upon the functional predictive yield map 373, the functional predictive yield control zone map 383, or both. One or both of functional predictive yield map 373 and functional predictive yield control zone map 383 may be presented to an operator 360, such as on an operator interface mechanism 218 or 418, or to a remote user 366, such as on a remote user interface 364, or both.

Figure 5:
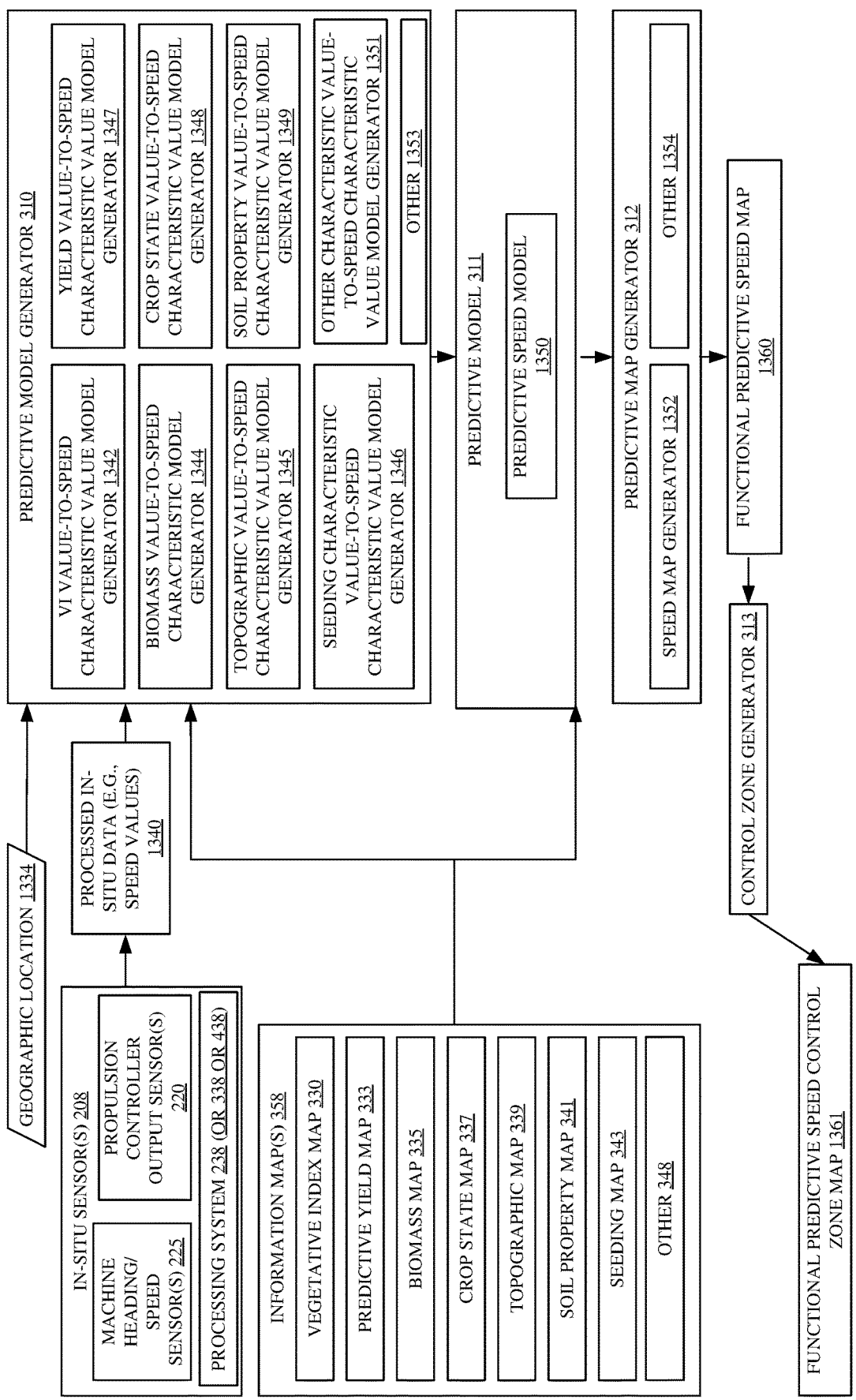
FIG. 5 is a block diagram showing one example of a predictive model generator and predictive map generator.

FIG. 5 is a block diagram of a portion of the agricultural system architecture 400 shown in FIG. 3. Particularly, FIG. 5 shows, among other things, examples of the predictive model generator 310 and the predictive map generator 312 in more detail. FIG. 5 also illustrates information flow among the various components shown. The predictive model generator 310 receives one or more information map(s) 358. In the example illustrated in FIG. 5, information maps 358 include one or more of a vegetative index map 330, a predictive yield map 333, a biomass map 335, a crop state map 337, a topographic map 339, a soil property map 341, a seeding map 343 or any of a wide variety of other maps 348. Predictive model generator 310 also receives a geographic location 1334, or an indication of a geographic location, from geographic position sensor 203. In-situ sensors 208 illustratively include machine heading/speed sensors 225 or a propulsion controller output sensor 220 that sense an output from a propulsion controller of agricultural harvester 100, or both, as well as a processing system 238. Processing system 238 processes sensor data generated from header/speed sensor 125 or from propulsion controller output sensor 220, or both, to generate processed sensor data 1340 indicative of machine speed characteristic values (e.g., travel speed values, acceleration values, deceleration values, etc.). In some examples, other processing systems, such as processing system 338 or processing system 438 can process sensor data generated from header/speed sensor 125 or from propulsion controller output sensor 220, or both. Additionally, while the example shown in FIG. 5 illustrates the processing system 238 (or 338 or 438) as part of in-situ sensors 208, in other examples, processing system 238 (or 338 or 438) is separate from in-situ sensors 208 but in communication with in-situ sensors 208, such as the example shown in FIG. 3.

It will be understood that geographic location 1334 illustratively represents geographic locations on a field to which the values indicated by sensors 208 correspond. For example, where the in-situ sensor 208 detects a speed characteristic value, geographic location 1334 indicates the location of the field where that detected speed characteristic value corresponds. As an illustrative example, the sensor data generated by sensors 208 can be timestamped and geographic position sensor data generated by geographic position sensor 203 can be timestamped. In this way, the geographic position detected at the same time as the speed characteristic can be correlated. This is merely one example.

As shown in FIG. 5, the example predictive model generator 310 includes one or more of a Vegetative Index (VI) value-to-speed characteristic value model generator 1342, a biomass value-to-speed characteristic value model generator 1344, a topographic value-to-speed characteristic value model generator 1345, a seeding characteristic value-to-speed characteristic value model generator 1346, a yield value-to-speed characteristic value model generator 1347, a crop state value-to-speed characteristic value model generator 1348, a soil property value-to-speed characteristic model generator 1349, and an other characteristic value-to-speed characteristic value model generator 1351. In other examples, the predictive model generator 310 may include additional, fewer, or different components than those shown in the example of FIG. 5. Consequently, in some examples, the predictive model generator 310 may include other items 1351 as well, which may include other types of predictive model generators to generate other types of predictive models.

VI value-to-speed characteristic value model generator 1342 identifies a relationship between machine speed characteristic value(s) detected in processed in-situ sensor data 1340, at geographic location(s) to which the detected speed characteristic value(s) correspond, and vegetative index (VI) value(s) from the VI map 330 corresponding to the same location(s) in the worksite where the machine speed characteristic value(s) correspond. Based on this relationship established by VI value-to-speed characteristic value model generator 1342, VI value-to-speed characteristic value model generator 1342 generates a predictive speed model. The predictive speed model is used by speed map generator 1352 to predict machine speed characteristic value(s) at different locations in the worksite based upon the georeferenced VI value contained in the VI map 432 at the different locations in the worksite. Thus, for a given location in the worksite, values of machine speed characteristics can be predicted at the given location based on the predictive speed model and the VI value, from the VI map 432, at that given location.

Biomass value-to-speed characteristic value model generator 1344 identifies a relationship between machine speed characteristic value(s) detected in processed in-situ sensor data 1340, at geographic location(s) to which the detected speed characteristic value(s) correspond, and biomass value(s) from the biomass map 335 corresponding to the same location(s) in the worksite where the machine speed characteristic value(s) correspond. Based on this relationship established by biomass value-to-speed characteristic value model generator 1344, biomass value-to-speed characteristic value model generator 1344 generates a predictive speed model. The predictive speed model is used by speed map generator 1352 to predict machine speed characteristic value(s) at different locations in the worksite based upon the georeferenced biomass value contained in the biomass map 1335 at the different locations in the worksite. Thus, for a given location in the worksite, values of machine speed characteristics can be predicted at the given location based on the predictive speed model and the biomass value, from the biomass map 335, at that given location.

Topographic value-to-speed characteristic value model generator 1345 identifies a relationship between machine speed characteristic value(s) detected in processed in-situ sensor data 1340, at geographic location(s) to which the detected speed characteristic value(s) correspond, and topographic value(s) from the topographic map 339 corresponding to the same location(s) in the worksite where the machine speed characteristic value(s) correspond. Based on this relationship established by topographic value-to-speed characteristic value model generator 1345, topographic value-to-speed characteristic value model generator 1345 generates a predictive speed model. The predictive speed model is used by speed map generator 1352 to predict machine speed characteristic value(s) at different locations in the worksite based upon the georeferenced topographic value contained in the topographic map 339 at the different locations in the worksite. Thus, for a given location in the worksite, values of machine speed characteristics can be predicted at the given location based on the predictive speed model and the topographic value, from the topographic map 339, at that given location.

Seeding characteristic value-to-speed characteristic value model generator 1346 identifies a relationship between machine speed characteristic value(s) detected in processed in-situ sensor data 1340, at geographic location(s) to which the detected speed characteristic value(s) correspond, and seeding characteristic value(s) from the seeding map 443 corresponding to the same location(s) in the worksite where the machine speed characteristic value(s) correspond. Based on this relationship established by seeding characteristic value-to-speed characteristic value model generator 1346, seeding characteristic value-to-speed characteristic value model generator 1346 generates a predictive speed model. The predictive speed model is used by speed map generator 1352 to predict machine speed characteristic value(s) at different locations in the worksite based upon the georeferenced seeding characteristic value contained in the seeding map at the different locations in the worksite. Thus, for a given location in the worksite, values of machine speed characteristics can be predicted at the given location based on the predictive speed model and the seeding characteristic value, from the seeding map 343, at that given location.

Yield value-to-speed characteristic value model generator 1347 identifies a relationship between machine speed characteristic value(s) detected in processed in-situ sensor data 1340, at geographic location(s) to which the detected speed characteristic value(s) correspond, and yield value(s) from the predictive yield map 333 corresponding to the same location(s) in the worksite where the machine speed characteristic value(s) correspond. Based on this relationship established by yield value-to-speed characteristic value model generator 1347, yield value-to-speed characteristic value model generator 1347 generates a predictive speed model. The predictive speed model is used by speed map generator 452 to predict machine speed characteristic value(s) at different locations in the worksite based upon the georeferenced yield value contained in the predictive yield map 333 at the different locations in the worksite. Thus, for a given location in the worksite, values of machine speed characteristics can be predicted at the given location based on the predictive speed model and the yield value, from the predictive yield map 333, at that given location.

Crop state value-to-speed characteristic value model generator 1348 identifies a relationship between machine speed characteristic value(s) detected in processed in-situ sensor data 1340, at geographic location(s) to which the detected speed characteristic value(s) correspond, and crop state value(s) from the crop state map 337 corresponding to the same location(s) in the worksite where the machine speed characteristic value(s) correspond. Based on this relationship established by crop state value-to-speed characteristic value model generator 1348, crop state value-to-speed characteristic value model generator 1348 generates a predictive speed model. The predictive speed model is used by speed map generator 1352 to predict machine speed characteristic value(s) at different locations in the worksite based upon the georeferenced crop state value contained in the crop state map 437 at the different locations in the worksite. Thus, for a given location in the worksite, values of machine speed characteristics can be predicted at the given location based on the predictive speed model and the crop state value, from the crop state map 337, at that given location.

Soil property value-to-speed characteristic value model generator 1349 identifies a relationship between machine speed characteristic value(s) detected in processed in-situ sensor data 1340, at geographic location(s) to which the detected speed characteristic value(s) correspond, and soil property value(s) from the soil property map 341 corresponding to the same location(s) in the worksite where the machine speed characteristic value(s) correspond. Based on this relationship established by soil property value-to-speed characteristic value model generator 1349, soil property value-to-speed characteristic value model generator 1349 generates a predictive speed model. The predictive speed model is used by speed map generator 1352 to predict machine speed characteristic value(s) at different locations in the worksite based upon the georeferenced soil property value contained in the soil property map 341 at the different locations in the worksite. Thus, for a given location in the worksite, values of machine speed characteristics can be predicted at the given location based on the predictive speed model and the soil property value, from the soil property map 341, at that given location.

Other characteristic value-to-speed characteristic value model generator 1351 identifies a relationship between machine speed characteristic value(s) detected in processed in-situ sensor data 1340, at geographic location(s) to which the detected speed characteristic value(s) correspond, and other characteristic value(s) from an other map 348 corresponding to the same location(s) in the worksite where the machine speed characteristic value(s) correspond. Based on this relationship established by other characteristic value-to-speed characteristic value model generator 1351, other characteristic value-to-speed characteristic value model generator 1351 generates a predictive speed model. The predictive speed model is used by speed map generator 1352 to predict machine speed characteristic value(s) at different locations in the worksite based upon the georeferenced other characteristic value contained in the other map 348 at the different locations in the worksite. Thus, for a given location in the worksite, values of machine speed characteristics can be predicted at the given location based on the predictive speed model and the other characteristic value, from the other map 348, at that given location.

In light of the above, the predictive model generator 310 is operable to produce a plurality of predictive speed models, such as one or more of the predictive speed models generated by model generators 1342, 1344, 1345, 1346, 1347, 1348, 1349, 1351, and 1353. In another example, two or more of the predictive models described above may be combined into a single predictive speed model, such as a predictive speed model that predicts machine speed characteristic values based upon two or more of the VI values, the biomass values, the topographic values, the seeding characteristic values, the yield values, the crop state values, the soil property values, and the other map characteristic values at those different locations in the field. Any of these speed models, or combinations thereof, are represented collectively by predictive speed model 1350 in FIG. 5.

The predictive speed model 1350 is provided to predictive map generator 312. In the example of FIG. 5, predictive map generator 312 includes a predictive speed map generator 1352. In other examples, predictive map generator 312 may include additional or different map generators. Thus, in some examples, predictive map generator 312 may include other items 1354 which may include other types of map generators to generate other types of maps.

Predictive speed map generator 1352 receives one or more of the VI map 330, the biomass map 335, the topographic map 339, the seeding map 343, the yield map 333, the crop state map 337, the soil property map 341, and other maps 348 along with the predictive speed model 1350 which predicts machine speed characteristic values based upon one or more VI values, biomass values, topographic values, seeding characteristic values, yield values, crop state values, soil property values, and other characteristic values and generates a functional predictive speed map 1360 that predicts machine speed characteristic values at different locations in the worksite.

The functional predictive speed map 1360 is a predictive map 264. The functional predictive speed map 1360 predicts machine speed characteristic values at different locations in a worksite. The functional predictive speed map 1360 may be provided to control zone generator 313, control system 214, and/or control system 414. Control zone generator 313 generates control zones and incorporates those control zones into the functional predictive speed map 1360 to produce a predictive control zone map 265, that is, a functional predictive speed control zone map 1361. One or both of functional predictive speed map 1360 and functional predictive speed control zone map 1361 may be provided to control system 214, which generates control signals to control one or more of the controllable subsystems 216 based upon the functional predictive speed map 1360, the functional predictive speed control zone map 1361, or both. One or both of functional predictive speed map 1360 and functional predictive speed control zone map 1361 may be provided to control system 414, which generates control signals to control one or more of the controllable subsystems 416 based upon the functional predictive speed map 1360, the functional predictive speed control zone map 1361, or both. One or both of functional predictive speed map 1360 and functional predictive speed control zone map 1361 may be presented to an operator 360, such as on an operator interface mechanism 218 or 418, or to a remote user 366, such as on a remote user interface 364, or both.

As can be seen from FIGS. 4-5, predictive map generator 310 is operable to produce a plurality of predictive models 311, such as predictive yield model 353 or predictive speed model 1350, or both. Additionally, predictive map generator 312 is operable to produce a plurality of functional predictive maps 263, such as one or more functional predictive yield map 373, functional predictive yield control zone map 383, functional predictive speed map 1360, and functional predictive speed control zone map 1361. It will be understood that one or more of functional predictive yield map 373, functional predictive yield control zone map 383, functional predictive speed map 1360, and functional predictive speed control zone map 1361, can be provided to control system 214 or control system 414, or both.

Figure 6A:
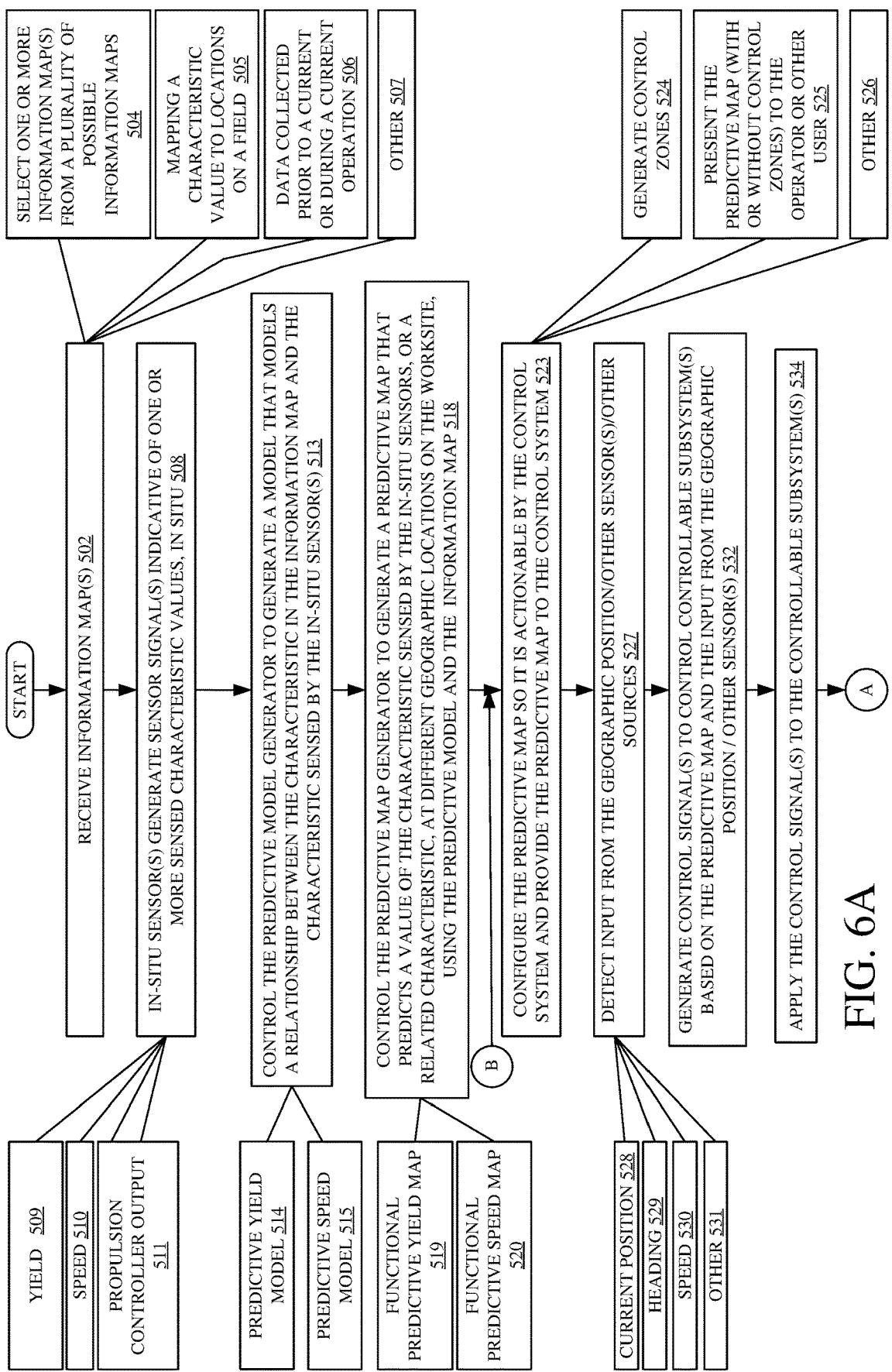
FIGS. 6A-6B (collectively referred to herein as FIG. 6) is a flow diagram illustrating one example of operation of an agricultural harvesting system in generating a map.
Figure 6B:
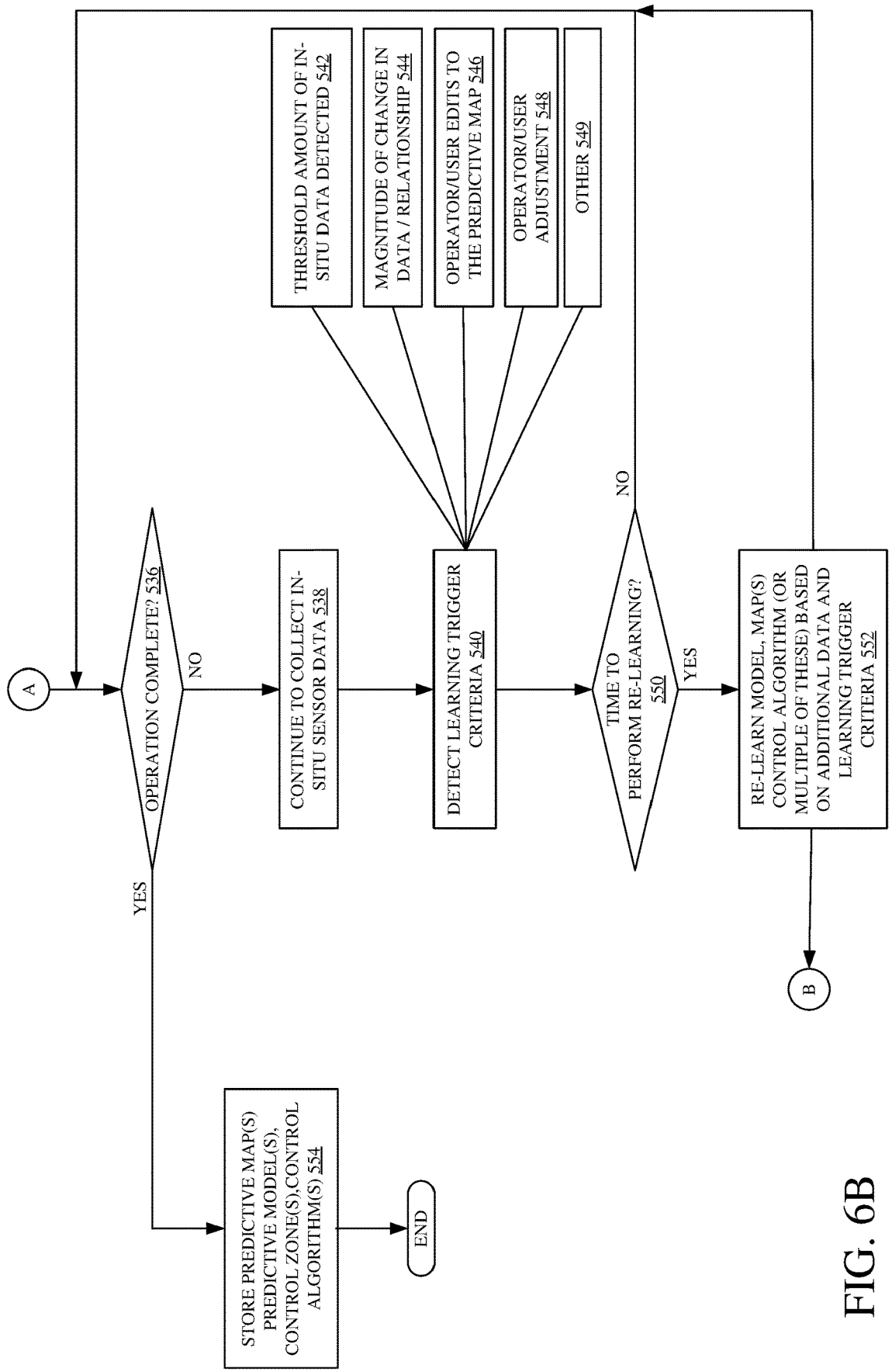

FIGS. 6A-6B (collectively referred to herein as FIG. 6) show a flow diagram illustrating one example of the operation of agricultural harvesting system architecture 500 in generating a predictive model and a predictive map.

At block 502, agricultural system 500 receives one or more information maps 358. Examples of information maps 358 or receiving information maps 358 are discussed with respect to blocks 504, 505, 507, and 508. As discussed above, information maps 358 map values of a variable, corresponding to a characteristic, to different locations in the worksite, as indicated at block 505. As indicated at block 504, receiving the information maps 358 may involve selecting one or more of a plurality of possible information maps 358 that are available. For instance, one information map 358 may be a VI map, such as VI map 330. Another information map 358 may be a topographic map, such as topographic map 331. Another information map 358 may be a historical yield map, such as historical yield map 332. Another information map 358 may be a predictive yield map, such as predictive yield map 333. Another information map 358 may be a biomass map, such as biomass map 335. Another information map 358 may be a crop state map, such as crop state map 337. Another information map 358 may be a topographic map, such as topographic map 339. Another information map 358 may be a soil property map, such as soil property map 341. Another information map 358 may be a seeding map, such as seeding map 343. Information maps 358 may include various other types of characteristic maps, such as other maps 347 or other maps 348, or both. The process by which one or more information maps 358 are selected can be manual, semi-automated, or automated. The information maps 358 can be based on data collected prior to a current operation, as indicated by block 506. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. For example, the sensed yield during a previous harvesting operation at the worksite may be used as data to generate a historical yield map. In other examples, and as described above, the information maps 358 may be predictive maps having predictive values, such as a predictive yield map having predictive yield values, such as predictive yield map 333. The predictive information map 358 can be generated during a current operation by predictive map generator 312 based on a model generated by predictive model generator 310, as indicated by block 506. For instance, in one example, predictive yield map 333 can be functional predictive yield map 373 or functional predictive yield control zone map 383, or generated in a similar way as functional predictive yield map 373 or functional predictive yield control zone map 383. The predictive information map 358 can be predicted in other ways (before or during the current operation), such as based on other measured values (e.g., predictive yield or predictive biomass based on measured vegetative index values). The data for the information maps 358 can be obtained by predictive model generator 310 and predictive map generator 312 using communication system 306 and stored in data store 304. The data for the information maps 358 can be obtained by harvesting system 500 using a communication system in other ways as well, and this is indicated by block 507 in the flow diagram of FIG. 6.

As agricultural harvester 100 is operating, in-situ sensors 208 generate sensor data indicative of one or more in-situ data values indicative of one or more characteristics, as indicated by block 508. For example, yield sensors 223 generate sensor data indicative of one or more in-situ yield values as indicated by block 509. Heading/speed sensors 225 generate sensor data indicative of one or more in-situ speed characteristic values as indicated by block 510. Propulsion controller output sensors 220 generate sensor data indicative of one or more in-sit speed characteristic values as indicated by block 511. In some examples, data from in-situ sensors 208 is georeferenced using position data from geographic position sensor 203 as well as, in some examples, one or more of heading data, travel speed data, machine latency data, and positional information of the in-situ sensors 208.

At block 513, predictive model generator 310 controls one or more of model generators to generate one or more models that model the relationship between mapped values and in-situ characteristic values sensed by in-situ sensors 208. For instance, predictive model generator controls one or more of the model generators 344, 342, 344, and 345 to generate a predictive yield model that models the relationship between the mapped values, such as one or more of the VI values, the historical yield values and the other characteristic values contained in the respective information map and the in-situ yield values sensed by yield sensors 223. Predictive model generator 310 thus generates a predictive yield model 353 as indicated by block 514. Additionally, or alternatively, predictive model generator 310 controls one or more of the model generators 1342, 1344, 1345, 1346, 1347, 1348, 1349, 1351, and 1353 to generate a predictive speed model that models the relationship between the mapped values, such as one or more the VI values, the predictive yield values, the biomass values, the crop state values, the topographic characteristic values, the soil property values, the seeding characteristic values, and the other characteristic values contained in the respective information map and the in-situ speed characteristic values sensed by heading/speed sensors 225 or propulsion controller output sensors 220, or both. Predictive model generator 310 thus generates a predictive speed model 1350 as indicated by block 515.

The relationship(s) or model(s) generated by predictive model generator 310 are provided to predictive map generator 312.

Predictive map generator 312, at block 518, predictive map generator 312 controls one or more predictive map generators to generate one or more functional predictive maps. For instance, predictive map generator 312 controls predictive yield map generator 363 to generate a functional predictive yield map 373 that predicts yield values (or sensor value(s) indictive of yield values) at different geographic locations in a worksite at which agricultural harvester 100 is operating using the predictive yield model 353 and one or more of the VI map 330, the historical yield map 332, and one or more other maps 347. Generating a functional predictive yield map 373 is indicated by block 519.

Additionally, or alternatively, at block 518, predictive map generator 312 controls predictive speed map generator 1352 to generate a functional predictive speed map 1360 that predicts speed characteristic values (or sensor value(s) indictive of speed characteristic values) at different geographic locations in a worksite at which agricultural harvester 100 is operating using the predictive speed model 1350 and one or more of the VI map 330, the predictive yield map 333, the biomass map 335, the crop state map 337, the topographic map 339, the soil property map 341, the seeding map 343, and one or more other maps 348. Generating a functional predictive speed map 1360 is indicated by block 520.

It should be noted that, in some examples, the functional predictive yield map 373 may include two or more different map layers. Each map layer may represent a different data type, for instance, a functional predictive yield map 373 that provides two or more of a map layer that provides predictive yield values based on VI values from VI map 330, a map layer that provides predictive yield values based on historical yield values from historical yield map 332, and a map layer that provides predictive yield values based on other characteristic values from an other map 347. In some examples, the functional predictive yield map 373 may include a map layer that provides predictive yield values based on two or more of VI values from VI map 330, historical yield values from historical yield map 332, and other characteristic values from an other map 347.

It should be noted that, in some examples, the functional predictive speed map 1360 may include two or more different map layers. Each map layer may represent a different data type, for instance, a functional predictive speed map 1360 that provides two or more of a map layer that provides predictive speed characteristic values based on VI values from VI map 330, a map layer that provides predictive speed characteristic values based on predictive yield values from predictive yield map 333, a map layer that provides predictive speed characteristic values based on biomass values from biomass map 335, a map layer that provides predictive speed characteristic values based on crop state values from crop state map 337, a map layer that provides predictive speed characteristic values based on topographic characteristic values from topographic map 339, a map layer that provides predictive speed characteristic values based on soil property values from soil property map 341, a map layer that provides predictive speed characteristic values based on seeding characteristic values from seeding map 343, and a map layer that provides predictive speed characteristic values based on other characteristic values from an other map 348. In some examples, the functional predictive speed map 1360 may include a map layer that provides predictive speed characteristic values based on two or more of VI values from VI map 330, predictive yield values from predictive yield map 333, biomass values from biomass map 335, crop state values from crop state map 337, topographic characteristic values from topographic map 339, soil property values from soil property map 341, seeding characteristic values from seeding map 343, and other characteristic values from an other map 348.

At block 523, predictive map generator 312 configures the functional predictive map(s) (e.g., one or more of 373 and 1360) so that the functional predictive map(s) are actionable (or consumable) by control system 214 or 414, or both. Predictive map generator 312 can provide one or more of the functional maps 373 and 1360 to the control system 214, to the control system 414, and/or to control zone generator 313. Some examples of the different ways in which the functional predictive map(s) 373 and 1360 can be configured or output are described with respect to blocks 523, 524, 525, and 526. For instance, predictive map generator 312 configures one or more of the functional predictive maps 373 and 1360 so that the one or more functional predictive maps 373 and 1360 include values that can be read by control system 214 or 414, or both, and used as the basis for generating control signals for one or more of the different controllable subsystems 216 of agricultural harvester 100 or controllable subsystems 416 of a respective receiving machine 400, as indicated by block 523.

Control zone generator 313, at block 524, can divide the functional predictive yield map 373 into control zones based on the values on the functional predictive yield map 373 to generate functional predictive yield control zone map 383. Additionally, or alternatively, control zone generator 313, at block 524, can divide the functional predictive speed map 1360 into control zones based on the values on the functional predictive speed map 1360 to generate functional predictive speed control zone map 1361.

Contiguously-geolocated values that are within a threshold value of one another can be grouped into a control zone.

The threshold value can be a default threshold value, or the threshold value can be set based on an operator input, based on an input from an automated system, or based on other criteria. A size of the zones may be based on a responsiveness of the control system, the controllable subsystems, based on wear considerations, or on other criteria.

At block 525, predictive map generator 312 configures one or more of the functional predictive maps 373 and 1360 for presentation to an operator or other user. Alternatively, or additionally, at block 525, control zone generator 313 can configure one or more of the functional predictive control zone maps 383 and 1361 for presentation to an operator or other user. When presented to an operator or other user, the presentation of the one or more functional predictive map(s) 373 and 1360 or of the one or more functional predictive control zone map(s) 383 and 1361, or both, may contain one or more of the predictive values on the functional predictive map(s) correlated to geographic location, the control zones of functional predictive control zone map(s) correlated to geographic location, and settings values or control parameters that are used based on the predicted values on functional predictive map(s) or control zones on functional predictive control zone map(s). The presentation can, in another example, include more abstracted information or more detailed information. The presentation can also include a confidence level that indicates an accuracy with which the predictive values on the one or more functional predictive map(s) 373 and 1360 or the control zones on the one or more predictive control zone map(s) 383 and 1361, or both, conform to measured values that may be measured by sensors on agricultural harvester 100 as agricultural harvester 100 operates at the worksite. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of agricultural harvester 100 or a receiving machine 400, or both, may be unable to see the information corresponding to the one or more functional predictive maps 373 and 1360 or make any changes to machine operation. A supervisor, such as a supervisor at a remote location, however, may be able to see the one or more functional predictive maps 373 and 1360 on the display but be prevented from making any changes. A manager, who may be at a separate remote location, may be able to see all of the elements on the one or more functional predictive map(s) 373 and 1360 and also be able to change the functional predictive map(s). In some instances, the one or more functional predictive maps 373 and 1360 accessible and changeable by a manager located remotely may be used in machine control. This is one example of an authorization hierarchy that may be implemented. The one or more functional predictive maps 373 and 1360 or the one or more functional predictive control zone maps 383 and 1361, or both, can be configured in other ways as well, as indicated by block 526.

At block 527, when agricultural harvester 100 is being controlled, input from geographic position sensor 203 and other in-situ sensors 208 are received by the control system 214. Particularly, at block 528, control system 214 detects an input from the geographic position sensor 203 identifying a geographic location of agricultural harvester 100. Block 529 represents receipt by the control system 214 of sensor inputs indicative of trajectory or heading of agricultural harvester 100, and block 530 represents receipt by the control system 214 of a speed of agricultural harvester 100. Block 531 represents receipt by the control system 214 of other information from various in-situ sensors 208.

At block 527, when a receiving machine 400 is being controlled, input from geographic position sensor 403 and other in-situ sensors 408 are received by the control system 414. Particularly, at block 528, control system 414 detects an input from the geographic position sensor 403 identifying a geographic location of receiving machine 400. Block 529 represents receipt by the control system 414 of sensor inputs indicative of trajectory or heading of receiving machine 400, and block 530 represents receipt by the control system 414 of a speed of receiving machine 200. Block 531 represents receipt by the control system 414 of other information from various in-situ sensors 408.

At block 532, where agricultural harvester 100 is being controlled, control system 214 generates control signals to control the controllable subsystems 216 based on the one or more functional predictive maps 373 and 1360 or the one or more functional predictive control zone maps 383 and 1361, or both, and the input from the geographic position sensor 208 and any other in-situ sensors 208. At block 534, control system 214 applies the control signals to the controllable subsystems 216. It will be appreciated that the particular control signals that are generated, and the particular controllable subsystems 216 that are controlled, may vary based upon one or more different things. For example, the control signals that are generated and the controllable subsystems 216 that are controlled may be based on the type of the one or more functional predictive maps 373 and 1360 or the one or more functional predictive control zone maps 383 and 1361, or both, that is being used. Similarly, the control signals that are generated and the controllable subsystems 216 that are controlled and the timing of the control signals can be based on various latencies of agricultural harvester 100 and the responsiveness of the controllable subsystems 216.

At block 532, where a receiving machine 400 is being controlled, control system 414 generates control signals to control the controllable subsystems 416 based on the one or more functional predictive maps 373 and 1360 or the one or more functional predictive control zone maps 383 and 1361, or both, and the input from the geographic position sensor 403 and any other in-situ sensors 408. At block 534, control system 414 applies the control signals to the controllable subsystems 416. It will be appreciated that the particular control signals that are generated, and the particular controllable subsystems 416 that are controlled, may vary based upon one or more different things. For example, the control signals that are generated and the controllable subsystems 416 that are controlled may be based on the type of the one or more functional predictive maps 373 and 1360 or the one or more functional predictive control zone maps 383 and 1361, or both, that is being used. Similarly, the control signals that are generated and the controllable subsystems 416 that are controlled and the timing of the control signals can be based on various latencies of the receiving machine 400 and the responsiveness of the controllable sub systems 416.

At block 536, a determination is made as to whether the operation has been completed. If the operation is not completed, the processing advances to block 538 where in-situ sensor data from geographic position sensor 203 and in-situ sensors 208 (and perhaps other sensors) and from geographic position sensor 403 and in-situ sensors 408 (and perhaps other sensors) continue to be read.

In some examples, at block 540, agricultural harvesting system 500 can also detect learning trigger criteria to perform machine learning on one or more of the one or more functional predictive maps 373 and 1360, the one or more functional predictive control zone maps 383 and 1361, the one or more predictive models 353 and 1350, the one or more zones generated by control zone generator 313, the one or more control algorithms implemented by the controllers in the control system 214 or the controllers in the control system 414, or both, and other triggered learning.

The learning trigger criteria can include any of a wide variety of different criteria. Some examples of detecting trigger criteria are discussed with respect to blocks 542, 544, 546, 548, and 549. For instance, in some examples, triggered learning can involve recreation of a relationship used to generate a predictive model when a threshold amount of in-situ sensor data are obtained from in-situ sensors 208. In such examples, receipt of an amount of in-situ sensor data from the in-situ sensors 208 that exceeds a threshold trigger or causes the predictive model generator 310 to generate a new predictive model that is used by predictive map generator 312. Thus, as agricultural harvester 100 continues an operation, receipt of the threshold amount of in-situ sensor data from the in-situ sensors 208 triggers the creation of a new relationship represented by one or more new predictive models 353 and 1350 generated by predictive model generator 310. Further, one or more new functional predictive maps 373 and 1360, one or more new functional predictive control zone maps 383 and 1361, or both, can be generated using the respective one or more new predictive modes 353 and 1350. Block 542 represents detecting a threshold amount of in-situ sensor data used to trigger creation of one or more new predictive models.

In other examples, the learning trigger criteria may be based on how much the in-situ sensor data from the in-situ sensors 208 are changing, such as over time or compared to previous values. For example, if variations within the in-situ sensor data (or the relationship between the in-situ sensor data and the information in the one or more information maps 358) are within a selected range or is less than a defined amount, or below a threshold value, then one or more new predictive models are not generated by the predictive model generator 310. As a result, the predictive map generator 312 does not generate one or more new functional predictive maps, one or more new functional predictive control zone maps, or both. However, if variations within the in-situ sensor data are outside of the selected range, are greater than the defined amount, or are above the threshold value, for example, then the predictive model generator 310 generates one or more new predictive models 353 and 1350 using all or a portion of the newly received in-situ sensor data that the predictive map generator 312 uses to generate one or more new functional predictive maps 373 and 1360 which can be provided to control zone generator 313 for the creation of one or more new functional predictive control zone maps 383 and 1361. At block 544, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of one or more new predictive models 353 and 1350, one or more new functional predictive maps 373 and 1360, and one or more new functional predictive control zone maps 383 and 1361. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 214, control system 414, or other items. In another example, transitioning of agricultural harvester 100 to a different topography, a different control zone, a different region of the worksite, a different area with different grouped characteristics (such as a different crop genotype area) may be used as learning trigger criteria as well.

In some instances, an operator 360 or user 366 can also edit the functional predictive map(s) or functional predictive control zone map(s), or both. The edits can change a value on the functional predictive map(s), change a size, shape, position, or existence of a control zone on functional predictive control zone map(s), or both. Block 546 shows that edited information can be used as learning trigger criteria.

In some instances, it may also be that an operator 360 or user 366 observes that automated control of a controllable subsystem, is not what the operator or user desires. In such instances, the operator 360 or user 366 may provide a manual adjustment to the controllable subsystem reflecting that the operator 360 or user 366 desires the controllable subsystem to operate in a different way than is being commanded by control system. Thus, manual alteration of a setting by the operator or user can cause one or more of predictive model generator 310 to relearn one or more predictive models, predictive map generator 312 to generate one or more new functional predictive maps, control zone generator 313 to generate one or more new control zones on one or more functional predictive maps, and a control system to relearn a control algorithm or to perform machine learning on one or more of the controllers in the control system based upon the adjustment by the operator or user, as shown in block 548. Block 549 represents the use of other triggered learning criteria.

In other examples, relearning may be performed periodically or intermittently based, for example, upon a selected time interval such as a discrete time interval or a variable time interval, as indicated by block 550.

If relearning is triggered, whether based upon learning trigger criteria or based upon passage of a time interval, as indicated by block 550, then one or more of the predictive model generator 310, predictive map generator 312, control zone generator 313, control system 214 and control system 414 performs machine learning to generate new predictive model(s), new functional predictive map(s), new control zone(s), and new control algorithm(s), respectively, based upon the learning trigger criteria. The new predictive model(s), the new functional predictive map(s), the new control zone(s), and the new control algorithm(s) are generated using any additional data that has been collected since the last learning operation was performed. Performing relearning is indicated by block 552.

If the operation has been completed, operation moves from block 552 to block 554 where one or more of the functional predictive map(s), functional predictive control zone map(s), the predictive model(s), the control zone(s), and the control algorithm(s) are stored. The functional predictive map(s), the functional predictive control zone map(s), the predictive model(s), the control zone(s), and the control algorithm(s) may be stored locally on a data store of a machine (e.g., data store 204 of agricultural harvester 100 or data store 404 of a receiving machine 400) or stored remotely (e.g., stored at data store 304 of remote computing systems 300), for later use.

If the operation has not been completed, operation returns to block 518 such that the new functional predictive map(s), the new functional predictive control zone map(s), the new control zone(s), and/or the new control algorithm(s) can be used to control the agricultural harvester 100 or the receiving machine(s) 400, or both.

FIG. 7 is a block diagram of a portion of agricultural harvesting system 500 shown in FIG. 3, in more detail. Particularly, FIG. 7 shows examples of the harvesting logistics module in more detail. FIG. 7 also illustrates information flow among the various components shown.

As illustrated in FIG. 7, harvesting logistics module 315 receives one or more functional predictive maps 263, one or more information maps 358, agricultural harvester sensor data 604, agricultural harvester dimensional data 606, material transfer subsystem data 607, receiving machine sensor data 608, receiving machine dimensional data 610, route data 612, threshold data 614, and various other data 616, such as, but not limited to, other operator or user inputs. Functional predictive maps 263 can include one or more predictive maps 264, such as one or more of functional predictive yield map 373 and functional predictive speed map 1360. Functional predictive maps 263 can include one or more predictive maps with control zones 265, such as one or more of functional predictive yield control zone map 383 and functional predictive speed control zone map 1361. Functional predictive maps 263 can also include various other maps (with or without control zones). In some examples, harvesting logistics module 315 may not receive functional predictive maps 263 or may receive other maps in addition to functional predictive maps 263. For example, instead of, or in addition to, functional predictive yield map 373, harvesting logistics module 315 may receive different type(s) of yield map(s) that map yield values to different geographic locations in the worksite. The different yield map(s) could be based on historical yield values, derived from other values, such as vegetative index values, derived from human scouting, values provided by seed producers, or could be a predictive map generated in a different way. The different yield map(s) can be provided as part of information maps 358. In any case, it will be understood that the examples herein are not limited yield values provided by functional predictive yield map 373 or functional predictive yield control zone map 383. Similarly, in some examples, harvesting logistics module 315 may not receive functional predictive maps or may receive other maps in addition to functional predictive maps 263. For example, instead of, or in addition to, functional predictive speed map 1360, harvesting logistics module 315 may receive different type(s) of speed map(s) that map speed values to different geographic locations in the worksite. The different speed map(s) could be based on historical speed values, derived from other values, such as vegetative index values, be prescribed speed values such as in a prescribed speed map, or could be a predictive map generated in a different way. The different speed map(s) can be provided as part of information maps 358. In any case, it will be understood that the examples herein are not limited speed values provided by functional predictive speed map 1360 or functional predictive speed control zone map 1361.

Further, it will be understood that in addition to the maps previously described and shown herein, information maps 358 can include one or more of a variety of other types of maps that can be utilized by harvesting logistics module 315. For example, but not by limitation, information maps 358 can include a harvest coverage map that indicates crop and crop row locations as well as areas of the field that have been harvested and areas of the field that have not been harvested. The harvest coverage map can be dynamically updated as the agricultural harvester continues to operate at the field.

Agricultural harvester sensor data 604 includes data generated by or derived from in-situ sensors 208 of agricultural harvester. Agricultural harvester dimensional data 606 includes dimensional information of the agricultural harvester 100, such as the length and width of the agricultural harvester 100, the width (or number of row units) of header 102, the dimensions (or fill capacity) of grain tank 132, and dimensional information with regard to the material transfer sub system 254.

Receiving machine sensor data 608 includes data generated by or derived from in-situ sensors 408 of receiving machine(s) 400. Receiving machine dimensional data 610 includes dimensional information of the receiving machine(s), such as the length and width of the receiving machine(s) 200, the dimensions (or fill capacity) of the grain bins 172 and/or 192, and dimensional information with regard to the material transfer subsystem 454.

Material transfer subsystem data 607 includes operation information with regard to the material transfer subsystem(s) 254 and/or 454, such as a rate (or range of rates) at which material transfer subsystem(s) 254 and/or 454, can convey material. In some examples, the rate at which the material transfer subsystem(s) 254 and/or 454 can also be derived from sensors on agricultural harvester 100 or receiving machines 400 such as from a sensor that senses a speed of rotation of the respective auger or blower, a flow sensor that senses a flow of harvested material through the material transfer subsystem, or from fill level sensors 224 and/or 424 which can indicate the rate at which the respective machine is being filled.

Route data 612 includes data indicative of a route (such as a prescribed or commanded route) being traveled by agricultural harvester 100 at the worksite as well as data indicative of a route (such as a prescribed or command route) being traveled by a receiving machine 400. In some examples, route data 612 can include or be derived from heading data generated by heading/speed sensors 225 or heading/speed sensors 425. In some examples, route data 612 can include or be derived from a map that includes a prescribed route, such as a harvest plan map that includes a prescribed harvester route.

Threshold data 614 include threshold values with regard to operation of the harvesting system 500. For example, threshold data 614 can fill level thresholds, for example, a threshold fill level for grain tank 132 of agricultural harvester 100. For instance, in some examples, it may be that the grain tank 132 is considered full when it reaches a threshold percentage (or level) of full (e.g., 90% full). Threshold data 614 can include various other thresholds values, such as threshold speed characteristic values (e.g., threshold travel speed values, threshold acceleration values, and/or threshold deceleration values) for agricultural harvester 100 or receiving machine 400, or both.

Other data 616 can include any of a wide variety of other data, including various other data provided by operator or user input.

As illustrated in FIG. 7, harvesting logistics module 315 includes data capture logic 622, material transfer location identifier logic 652, distance logic 653, arrival time logic 654, harvester full logic 655, time to complete logic 656, speed logic 657, route planning logic 658, display element integration component 659, map generator 660, machine assignment logic 663, and can include other items 630 as well. Data capture logic 622, itself, includes sensor accessing logic 662, data store accessing logic 624, and can include other items 630 as well. Data capture logic 622 captures or obtains data that can be used by other items of harvesting logistics module 315. Sensor accessing logic 662 can be used by harvesting logistics module 315 to obtain or otherwise access sensor data (or values indicative of the sensed variables/characteristics) provided from in-situ sensors 208 and 408. Additionally, data store accessing logic 664 can be used by harvesting logistics module 315 to obtain or access data stored on data stores 204, 304, and/or 404. Upon obtaining the various data, harvesting logistics module 315 generates logistics outputs 668 which can be used in the control of agricultural harvester 100 and/or receiving machine(s) 400.

Harvester full logic 655 illustratively identifies geographic locations at the worksite at which agricultural harvester 100 will be full. Harvester full logic 655 determines a geographic location at which the agricultural harvester 100 will be full based on agricultural harvester sensor data 604, such as fill level data generated by fill level sensors 224, agricultural harvester dimensional data 606 (e.g., grain tank capacity, header width, number of row units, etc.), route data 616, functional predictive yield map 373 or functional predictive yield control zone map 383 (or both), as well as threshold data 614 (e.g., threshold fill level). For instance, based on the current fill level of agricultural harvester, the capacity of the grain tank, the route of agricultural harvester 100, and the predictive yield values along the route, harvester full logic 655 can determine a geographic location at the worksite (e.g., along the route) at which harvester 100 will be full (e.g., full to the threshold fill level). Harvester full logic 655 can aggregate the predictive yield values along the route to generate an aggregate yield value to calculate the accumulated fill level along the route of the agricultural harvester. Additionally, harvester full logic 655 correlate to the dimensions of width of the header or the number of row units of the header, such that the predictive yield values along the route within the dimensions of the agricultural harvester are accounted for.

Material transfer location identifier logic 652 illustratively identifies geographic locations at the worksite at which a material transfer operation is to be initiated and take place, such as between agricultural harvester 100 and a receiving machine 400. It should be noted that the material transfer location can stretch across the worksite. For example, the material transfer location may include a location that stretches between a starting point and an end point (the end point may be identified by location to complete logic 665 as described below). This is particularly the case when the material transfer operation is to be done in tandem, that is, while both machines performing the operation are moving. In other examples, the material transfer location may be a fixed location at the worksite that does not stretch between a starting point and an end point, rather the end point and starting point may be collocated, such as when the material transfer operation is to be conducted while both machines are still. In some examples, one machine may remain still while the other machine moves (such as according to a fill strategy), in such a case, the material transfer location may stretch between a starting point and an end point, but the distance between these two points is less than when performing a transfer operation in tandem. In some examples, the material transfer location starting point is at the same geographic location at which the harvester 100 will be full, as indicated by harvester full logic. In other examples, the material transfer location starting point is at a geographic location within a threshold distance of the geographic location at which the harvester 100 will be full. In other examples, the material transfer location starting point can be located relative to the geographic location of a receiving machine 400. For instance, a receiving machine 400 may be parked in a stationary location (e.g., in a headland, at the end of a pass, in a previously harvested pass, etc.) and thus, the material transfer location starting point is located relative to the parked location of the material receiving machine. In yet other examples, an operator or user may provide inputs that dictate material transfer locations, and thus, the material transfer location identifier may identify the material transfer locations based on the operator or user input. For example, it may that an operator or user provides an input that establishes that material transfer should occur at the end of a pass or to finish transferring material prior to the end of a pass. Harvester full logic 655 may identify that harvester will become full midway through the next pass. In such an example, material transfer location identifier logic 652 may identify an end of the current pass as the material transfer location.

Additionally, it should be noted that multiple material transfer locations may be presented, where each different one has a corresponding confidence value. For example, when identifying a material transfer location for an upcoming material transfer operation, material transfer location identifier logic 652 may identify multiple material transfer locations corresponding to the same upcoming material transfer operation, where each material transfer location may stretch across a different area of the field (including different start points or different end points, or both). Additionally, it should be noted that the material transfer locations (including start point and end points) may be dynamically updated throughout the operation, for example as further data is collected, or as the functional predictive maps 263 are revised, as well as based on other criteria, such as based on subsequent operator or user inputs, changes to the fixed location of a receiving machine, changes to the entrance point for a receiving machine onto the field, as well as various other criteria.

Distance logic 653 illustratively identifies a distance between agricultural harvester and a material transfer location identified by material transfer location identifier logic 652. For instance, based on the geographic location of the material transfer location (or the starting point of the material transfer location) and a current geographic location of the agricultural harvester 100, as indicated by geographic position sensors 204, distance logic 653 can identify a distance between the agricultural harvester 100 and the material transfer location (or the starting point of the material transfer location). Distance logic 653 also illustratively identifies a distance between receiving machine(s) 400 and a material transfer location (or a starting point of a material transfer location) identified by material transfer location identifier logic. For instance, based on the geographic location of the material transfer location (or the starting point of the material transfer location) and current geographic location(s) of the receiving machine(s), as indicated by geographic position sensors 404, distance logic 653 can identify distance(s) between the receiving machine(s) 400 and the material transfer location (or the starting point of the material transfer location). In some examples, distance logic 653, in identifying the distance of the agricultural harvester 100 from the material transfer location (or the starting point of the material transfer location), also considers heading or route data for the agricultural harvester, and thus the distance is not necessarily the shortest distance (i.e., the shortest straight line distance) between the agricultural harvester 100 and the material transfer location (or the starting point of the material transfer location), but rather the distance the agricultural harvester 100 will travel based on its heading or its route from its current geographic location. Similarly, distance logic 653, in identifying the distance of the receiving machine(s) 400 from the material transfer location (or the starting point of the material transfer point location), also considers heading or route data for the receiving machine(s) 400, and thus the distance is not necessarily the shortest distance (i.e., the shortest straight line distance) between the receiving machine(s) and the material transfer location (or the starting point of the material transfer location), but rather the distance the receiving machine(s) 400 will travel based on each of their headings or routes from their current geographic locations.

Time to complete logic 656 illustratively identifies a time at which a receiving machine 400 will complete a material transfer operation. For instance, a receiving machine 400 may currently be performing a material transfer operation at a location remote from the field at which the harvesting operation is being performed, such as at a purchasing location (e.g., mill) or a storage location (e.g., grain bin, silo, grain bunk, etc.). In another example, a receiving machine may currently be performing a material transfer operation at the field, for instance, a towed grain cart may be transferring material to a towed semi-trailer on the same field, or a receiving machine may be receiving material from another harvester on the same field or another field. Time to complete logic 656 illustratively determines a time at which the material transfer operation will be completed (such that the receiving machine 400 can travel back to the field) based on current fill level data of the receiving machine, as indicated by fill level sensors 424, as well as operational parameters of the material transfer subsystem 454 as indicated by in-situ sensors 408 that detect operational parameters of the material transfer subsystem 454.

Location to complete logic 665 illustratively identifies a location at which a receiving machine 400 will complete a material transfer operation. In some examples, a receiving machine 400 may be performing a material transfer operation that is in-tandem, that is, the receiving machine 400 does not remain stationary or at a fixed location during the material transfer operation. For example, a receiving machine 400 may be transferring material to or receiving material from another machine while moving. Thus, location to complete logic 665 can identify a geographic location at which the operation will be completed based on the time at which the operation will be completed, as provided by time to complete logic, heading and speed data of the receiving machine 400, as well as various other data. Distance logic 653 can identify a distance between a location to complete identified by location to complete logic 665 and a material transfer location.

Arrival time logic 654 illustratively identifies a time at which agricultural harvester will reach a material transfer location (or starting point of the material transfer location) identified by material transfer location identifier logic 652. For instance, based on the distance between the agricultural harvester 100 and the material transfer location (or the starting point of the material transfer location), as indicated by distance logic 653, current speed characteristic data, as indicated by heading/speed sensors 225, as well as predictive speed characteristic values as provided by functional predictive speed map 1360 or functional predictive speed control zone map (or both), arrival time logic 654 can determine a time at which agricultural harvester 100 will arrive at a material transfer location (or starting point of the material transfer location). Arrival time logic 654 illustratively identifies a time at which receiving machine(s) 400 can or will arrive at a material transfer location (or starting point of the material transfer location). For instance, based on a distance between a receiving machine 400 and the material transfer location (or starting point of the material transfer location), as indicated by distance logic 653 (or a distance between a location to complete and the material transfer location (or starting point of the material transfer location) as indicated by distance logic 653), current speed characteristic data, as indicated by heading/speed sensors 225, as well as speed characteristic capabilities or speed characteristic limits (e.g., prescribed speed characteristics, thresholds, etc.), arrival time logic 654 illustratively identifies a time at which a receiving machine can or will arrive at a material transfer location (or starting point of the material transfer location). In some examples, arrival time logic 654 also accounts for time to complete as identified by time to complete logic 656 in determining a time at which a receiving machine 400 can or will arrive at a material transfer location (or starting point of the material transfer location). In some examples, in addition to or alternatively to the current speed characteristic data, arrival time logic 654 may consider historical speed characteristic data. For instance, where the receiving machine 400 has traveled back and forth across the worksite, the speed values of the receiving machine during those previous travels may be used to predict the speed of the machine in the future. Or if the machine 400 or another receiving machine 400 has traveled back and forth across the worksite during operations in previous years, those previous travels may be used to predict the speed of the machine in the future. In other examples, harvesting logistics module 315 may obtain maps that contain prescribed or prescriptive speed characteristic values of the receiving machine that can be used to determine a time at which the receiving machine 400 can or will arrive at a material transfer location. In one example, a functional predictive speed map (similar to functional predictive speed map 1360) can be generated for a receiving machine 400. For instance, heading/speed sensors 425 can generate sensor data indicative of values of speed characteristics of receiving machine 400 at the worksite. Predictive model generator 310 can generate a predictive receiving machine speed model that models a relationship between the detected values of the speed characteristic of the machine and values of one or more characteristics from one or more information maps 358. Predictive map generator 312 may then generate a functional predictive receiving machine speed map that maps predictive receiving machine speed characteristic values to different geographic locations in the worksite based on the predictive receiving machine speed model and the values of the one or more characteristics from the one or more information maps. These are merely some examples. In any case, it will be understood that arrival time logic 654 does not need to wait until the receiving machine 400 begins traveling to identify an arrival time.

Speed logic 657 illustratively determines speed characteristics for agricultural harvester 100 or receiving machine(s) 400 (or both). For instance, where arrival time logic 654 indicates that the agricultural harvester 100 will arrive at the material transfer location (or starting point of the material transfer location) before a receiving machine 400, speed logic 657 may generate an output to reduce the speed of agricultural harvester 100 such that agricultural harvester will arrive at the material transfer location (or starting point of the material transfer location) closer in time (or at the same time) as a receiving machine 400. Reducing the speed of the agricultural harvester 100 in this way can reduce downtime, reduce wear, save fuel, improve ride quality, as well as improve performance of the agricultural harvester 100, such as by reducing grain loss. In the same example, where arrival time logic 654 indicates that the agricultural harvester 100 will arrive at the material transfer location (or starting point of the material transfer location) before a receiving machine 400, speed logic 657 may generate an output to increase the speed of the receiving machine 400 such that receiving machine 400 will arrive at the material transfer location (or starting point of the material transfer location) closer in time, such as ahead of or at the same time, as agricultural harvester 100. In this way, the operation of the agricultural harvester 100 is not interrupted. In some examples, speed logic 657 may provide an output to adjust the speed of both the agricultural harvester 100 and the receiving machine 400, such that they arrive at the material transfer location (or starting point of the material transfer location) closer in time (or at the same time). For instance, there may be speed characteristic limits on the agricultural harvester 100 and the receiving machine 400 such that both can only be incrementally changed. In another example, other parameters of the operation may dictate adjustment of both the agricultural harvester 100 and a receiving machine 400, such as a preferred time to complete the harvesting operation.

In other examples, where arrival time logic 654 indicates that the receiving machine will arrive at the material transfer location (or starting point of the material transfer location) before the agricultural harvester 100, speed logic 657 may generate an output to reduce the speed of the receiving machine 400 such that the receiving machine 400 will arrive at the material transfer location (or starting point of the material transfer location) closer in time (or at the same time) as agricultural harvester 100. Reducing the speed of the receiving machine 400 in this way can reduce downtime, improve ride quality, save fuel, reduce wear, as well as various other benefits. In the same example, where arrival time logic 654 indicates that the receiving machine 400 will arrive at the material transfer location (or starting point of the material transfer location) before agricultural harvester 100, speed logic 657 may generate an output to increase the speed of agricultural harvester 100 such that agricultural harvester 100 will arrive at the material transfer location (or starting point of the material transfer location) closer in time (or at the same time) as the receiving machine 400. Increasing the speed of agricultural harvester 100 in this way can reduce down time, improve time to complete, as well as various other benefits. In some examples, speed logic 657 may provide an output to adjust the speed of both the agricultural harvester 100 and the receiving machine 400, such that they arrive at the material transfer location (or starting point of the material transfer location) closer in time (or at the same time). For instance, there may be speed characteristic limits on the agricultural harvester 100 and the receiving machine 400 such that both can only be incrementally changed. In another example, other parameters of the operation may dictate adjustment of both the agricultural harvester 100 and a receiving machine 400, such as preferred harvesting performance metrics (e.g., grain loss, fuel consumption, time to complete, etc.).

The outputs of speed logic 657 can be provided, as harvesting logistics outputs 668, to control system 214 or control system 414, or both.

Route planning logic 658 illustratively determines routes for a receiving machine to a material transfer location (or starting point of the material transfer location). For instance, where arrival time logic 654 indicates that the receiving machine 400 will arrive at material transfer location (or starting point of the material transfer location) before the agricultural harvester 100, route planning logic 658 may generate a different route for the receiving machine 400 such that receiving machine 400 will arrive at the material transfer location (or starting point of the material transfer location) closer in time (or at the same time) as the agricultural harvester 100. Adjusting the route of the receiving machine in this way may provide various benefits, such as by avoiding areas of the field which may result in deleterious effects, such as poorer ride quality, higher power requirements, more compaction, etc. In another example, where arrival time logic 654 indicates that the agricultural harvester 100 will arrive at the material transfer location (or starting point of the material transfer location) before the receiving machine 400, route planning logic 658 may generate a different route for the receiving machine 400 such that receiving machine 400 will arrive at the material transfer location (or starting point of the material transfer location) closer in time (or at the same time) as the agricultural harvester. Adjusting the route of the receiving machine in this way may reduce down time, improve time to complete, as well as various other benefits. Route planning logic 658, in generating routes, may also consider harvest state data of the field as well as the heading of the agricultural harvester. The harvest state data can be derived from a map, such as a harvest coverage map of information maps 358. The harvest state data indicates locations of crops and crop rows as well as harvested areas of the field and unharvested areas of the field. In this way, route planning logic 658 can generate routes that avoid machine contact with unharvested crops. Further, the heading data of the agricultural harvester 100, which can be derived from route data 612 or from another source, can be utilized by route planning logic 658 to determine how the receiving machine should approach and enter the field (e.g., from which direction) as well as if the receiving machine 400 will need to turn around in the field in order to have the same heading as the agricultural harvester 100. For instance, it may be that there is only a single field entrance, on the south side of the field. The harvester 100 may be heading south at the time the receiving machine 400 is to meet the harvester 100 for unloading. In such a case, the receiving machine 400 will enter the field on the south side, heading north, and will need to turn around on the field to begin heading south to match the heading of the harvester. In other examples, there may be a plurality of field entrances, and the field entrance that is chosen can be based on the heading of the harvester 100. For example, where the harvester 100 is or will be heading south at the time the receiving machine 400 is to meet the harvester 100 for unloading, the north field entrance may be chosen such that the receiving machine will be heading south as it enters the field. These are just some examples.

The outputs of route planning logic 658 can be provided, as harvesting logistics outputs 668, to control system 414.

Machine assignment logic 663 illustratively assigns a receiving machine to travel to a material transfer location identified by material transfer location identifier logic 663. For instance, it may be that multiple receiving machines 400 are available for the harvesting operation. Arrival time logic 654 may indicate that a first receiving machine 400 will or can arrive at the material transfer location (or starting point of the material transfer location) closer in time to the agricultural harvester 100 than a second receiving machine 400. In such a scenario, machine assignment logic 663 illustratively generates an output to assign the first receiving machine 400 to travel to the material transfer location. In some examples, it may be that a first receiving machine can be desirably adjusted to desirably arrive at the material transfer location (or starting point of the material transfer location) whereas a second receiving machine 400 cannot. Thus, machine assignment logic 663 generates an output to assign the first receiving machine 400 to travel to the material transfer location.

The outputs of machine assignment logic 658 can be provided, as harvesting logistics outputs 668, to control system 414.

Map generator 660 illustratively generates one or more harvesting logistics maps 661. Harvesting logistics maps 661 illustratively map the operational area (which may include one or more of one or more worksites [fields], roads, storage locations, and purchasing locations) in which the harvesting operation is being performed. Harvesting logistics maps 661 may include a variety of display elements (discussed below) and can be used in the control of an agricultural harvester 100 or receiving machine 400, or both. In some examples, map generator 660 may generate separate harvesting logistics maps 661 (having different display elements) for each different machine.

Display element integration component 659 illustratively generates one or more display elements, such as material transfer location display elements, machine assignment display elements, route display elements, receiving machine display elements, agricultural harvester display elements, as well as various other display elements. Display element integration component 659 can integrate the one or more display elements into one or more maps, such as one or more of functional predictive maps 263 or a separate harvesting logistics map 661 generated by map generator 661.

It will be noted that at the one or more functional predictive maps 263 are updated or otherwise made new (for example as described above in FIG. 6), the logistics outputs 668 generated by harvesting logistics module 315 can also be updated or otherwise made new according to the updated (or new) functional predictive maps 263. For example, harvesting logistics module 315 may, based on the updated or new functional predictive maps 263, generate updated (or new) material transfer locations, distances, harvest full locations, time to complete, arrival times, speed outputs, route outputs, display elements, harvesting logistics maps, etc.

The logistic outputs 668 can be provided to control system 214 to control agricultural harvester 100. As illustrated in FIG. 7, controllers 235 of control system 214 include propulsion controller 630, route controller 632, communication system controller 634, interface controller 636, material transfer controller 638, and can include various other controllers 639.

Propulsion controller 630 generates control signals to control propulsion subsystem 250, such as to control the acceleration, deceleration, or travel speed of agricultural harvester 100. For example, propulsion controller 630 may control propulsion subsystem 250 based on outputs from speed logic 657.

Route controller 632 generates control signals to control steering subsystem 252, such as to control the heading of agricultural harvester 100 according to a route.

Communication system controller 634 controls communication system 206 to send or obtain information, or both.

Interface controller 636 generates control signals to control operator interface mechanism(s) 218 such as to provide displays, alerts, notifications, recommendations, or various other indications. For example, interface controller 636 may generate control signals to generate displays of maps, such as the display of one or more functional predictive maps 263 (with or without integrated display elements generated by component 659) or harvesting logistics maps 661. In another example, interface controller 636 may generate control signals to generate displays or other indications (e.g., visual or audible alerts, notifications, recommendations, etc.) such as to adjust the speed of agricultural harvester 100.

Material transfer controller 638 generates control signals to control material transfer subsystem 254 such as to initiate or end a material transfer operation, to control the flow rate of material through the chute 134 and spout 136 such as by controlling the operational speed of the auger or blower 133, as well as to control the position (e.g., rotational position) of material transfer subsystem 254.

The logistic outputs 668 can be provided to control system 414 to control a receiving machine 400. As illustrated in FIG. 6, controllers 435 of control system 414 include propulsion controller 670, route controller 672, communication system controller 674, interface controller 676, material transfer controller 678, and can include various other controllers 639.

Propulsion controller 670 generates control signals to control propulsion subsystem 250, such as to control the acceleration, deceleration, or travel speed of receiving machine 400. For example, propulsion controller 670 may control propulsion subsystem 450 based on outputs form speed logic 657.

Route controller 672 generates control signals to control steering subsystem 452, such as to control the heading of receiving machine 400 according to a route, such as a route generated by route planning logic 658 (which may be indicated in a map).

Communication system controller 674 controls communication system 406 to send or obtain information, or both.

Interface controller 676 generates control signals to control operator interface mechanism(s) 418 such as to provide displays, alerts, notifications, recommendations, or various other indications. For example, interface controller 676 may generate control signals to generate displays of maps, such as the display of one or more functional predictive maps 263 (with or without integrated display elements generated by component 659) or harvesting logistics maps 661. In another example, interface controller 676 may generate control signals to generate displays or other indications (e.g., visual or audible alerts, notifications, recommendations, etc.) such to adjust the speed of a receiving machine 400 or to adjust the heading (or route) of receiving machine 400.

Material transfer controller 678 generates control signals to control material transfer subsystem 454 such as to initiate or end a material transfer operation, to control the flow rate of material through the chute 171 and spout 173 such as by controlling the operational speed of the auger or blower, to control the position (e.g., rotational position) of material transfer subsystem 454, or to actuate (e.g., open or close) door 191.

Figure 8:
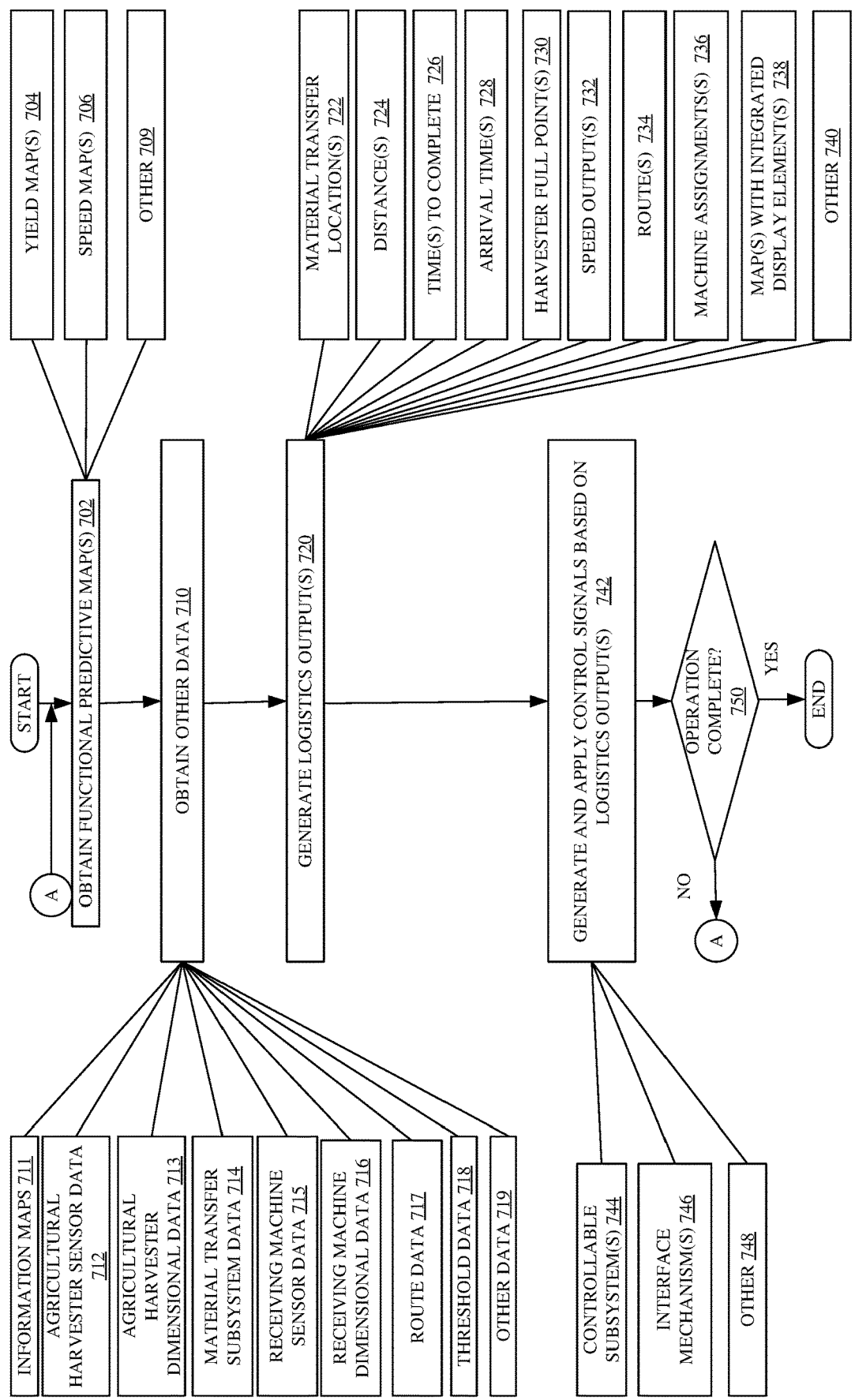
FIG. 8 is a flow diagram illustrating one example of operation of an agricultural harvesting system in controlling a harvesting operation.

FIG. 8 is a flow diagram showing one example operation of agricultural harvesting system 500 in controlling an agricultural harvester 100 or a receiving machine 400, or both, in performing a harvesting operation.

At block 702 one or more functional predictive maps 263 are obtained by harvesting logistics module 315, such as one or more predictive maps 264 or one or more predictive maps with control zones 265, or both. As indicated by block 704, the one or more functional predictive maps 263 may include functional predictive yield map 373 or functional predictive yield control zone map 383, or both. As indicated by block 706, the one or more functional predictive maps 263 may include functional predictive speed map 1360 or functional predictive speed control zone map 1361, or both. Functional predictive maps 263 may include various other maps, as indicated by block 709.

At block 710 various other data are obtained by harvesting logistics module 315. For example, harvesting logistics module 315 can obtain one or more of the data items illustrated in FIG. 7. As indicated by block 711, harvesting logistics module 315 can obtain one or more information maps 358. As indicated by block 712, harvesting logistics module 315 can obtain agricultural harvester sensor data 604. As indicated by block 713, harvesting logistics module 315 can obtain agricultural harvester dimensional data 606. As indicated by block 714, harvesting logistics module 315 can obtain material transfer subsystem data 607. As indicated by block 715, harvesting logistics module 315 can obtain receiving machine sensor data 608. As indicated by block 716, harvesting logistics module 315 can obtain receiving machine dimensional data 610. As indicated by block 717, harvesting logistics module 315 can obtain route data 612. As indicated by block 718, harvesting logistics module 315 can obtain threshold data 614. As indicated by block 719, harvesting logistics module 315 can obtain various other data 616.

At block 720 harvesting logistics module 315 generates one or more logistics outputs 668. As indicated by block 722, material transfer location identifier logic 652 can generate, as a logistics output 668, one or more material transfer locations, which can include starting points and end points. As indicated by block 724, distance logic 653 can generate, as a logistics output 668, one or more distances. As indicated by block 726, time to complete logic 656 can generate, as a logistics output 668, one or more times to complete. As indicated by block 728, arrival time logic 654 can generate, as a logistics output 668, one or arrival times. As indicated by block 730, harvester full logic 655 can generate, as a logistics output 668, one or more harvester full locations. As indicated by block 732, speed logic 657 can generate, as a logistics output 668, one or more speed outputs. As indicated by block 734, route planning logic 658 can generate, as a logistics output 668, one or more routes. As indicated by block 736, machine assignment logic 663 can generate, as a logistics output 668, one or more machine assignments. As indicated by block 738, harvesting logistics module 315 can generate, as a logistics output 668, one or more maps with integrated display elements, the display elements generated and integrated into the maps by display element integration component 659. For example, at block 738, the one or more maps may include one or more functional predictive maps 263 with display elements integrated or one or more harvesting logistics maps 661 with display elements integrated, or both. Harvesting logistics module 315 can generate a variety of other logistics outputs, as indicated by block 740.

At block 742, control system 214 and/or control system 414 generate control signals based on the one or more logistics outputs 668. For example, as indicated by block 744, control system 214 can generate control signals to control one or more controllable subsystems 216 based on the one or more logistics outputs 668. Additionally, or alternatively, as indicated by block 744, control system 414 can generate control signals to control one or more controllable subsystems based on the one or more logistics outputs 668. As indicated by block 746, control system 214 can generate control signals to control one or more interface mechanisms (e.g., 218 or 364) to generate displays, alerts, notifications, recommendations, as well as various other indications based on the one or more logistics outputs 668. Alternatively, or additionally, as indicated by block 746, control system 414 can generate control signals to control one or more interface mechanisms (e.g., 418 or 364) to generate displays, alerts, notifications, recommendations, as well as various other indications based on the one or more logistics outputs 668. As indicated by block 748, control system 214 and/or control system 414 can generate various other control signals based on the logistics outputs 668.

At block 750 it is determined if the harvesting operation is complete. If the harvesting operation has not been completed, operation returns to block 702. If the harvesting operation has been completed, then the operation ends.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or the same worksite at a future time.

The revision of the model in response to new data may employ machine learning methods. Without limitation, machine learning methods may include memory networks, Bayes systems, decisions trees, Eigenvectors, Eigenvalues and Machine Learning, Evolutionary and Genetic Algorithms, Cluster Analysis, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value varies from a predictive value of the characteristic, such as by a threshold amount. This deviation may only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation cross the threshold are used to generate a linear equation. The linear equation is used to adjust the predictive characteristic value in unharvested areas of the worksite in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as one or more of a vegetative index map, a historical yield map, and another type of map.

In-situ sensors generate sensor data indicative of in-situ characteristic values, such as in-situ yield values.

A predictive model generator generates one or more predictive models based on the one or more obtained maps and the in-situ sensor data, such as a predictive yield model.

A predictive map generator generates one or more functional predictive maps based on a model generated by the predictive model generator and the one or more obtained maps. For example, the predictive map generator may generate a functional predictive yield map that maps predictive yield values to one or more locations on the worksite based on a predictive yield model and the one or more obtained maps.

Control zones, which include machine settings values, can be incorporated into the functional predictive yield map to generate a functional predictive yield control zone map.

As another example, without limitation, consider an instance of the paradigm described herein which is parameterized as follows.

One or more maps of the field are obtained, such as one or more of a vegetative index map, a predictive yield map, a biomass map, a crop state map, a topographic map, a soil property map, a seeding map, and another type of map.

In-situ sensors generate sensor data indicative of in-situ characteristic values, such as in-situ speed characteristic values.

A predictive model generator generates one or more predictive models based on the one or more obtained maps and the in-situ sensor data, such as a predictive speed model.

A predictive map generator generates one or more functional predictive maps based on a model generated by the predictive model generator and the one or more obtained maps. For example, the predictive map generator may generate a functional predictive speed map that maps predictive speed characteristic values to one or more locations on the worksite based on a predictive speed model and the one or more obtained maps.

Control zones, which include machine settings values, can be incorporated into the functional predictive speed map to generate a functional predictive speed control zone map.

As the mobile machine continues to operate at the worksite, additional in-situ sensor data are collected. A learning trigger criteria can be detected. Example learning triggers include: threshold amount of additional in-situ sensor data being collected; a magnitude of change in a relationship (e.g., the in-situ characteristic values varies to a selected [e.g., threshold] degree from a predictive value of the characteristic); edit(s) to the predictive map(s) or to a control algorithm, or both, made by an operator or user; and a selected (e.g., threshold) amount of time elapses. Learning trigger criteria can include other types of events. The predictive model(s) are then revised based on the additional in-situ sensor data and the values from the obtained maps. The functional predictive maps or the functional predictive control zone maps, or both, are then revised based on the revised model(s) and the values in the obtained maps.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, modules, generators, and interactions. It will be appreciated that any or all of such systems, components, logic, modules, generators, and interactions may be implemented by hardware items, such as one or more processors, one or more processors executing computer executable instructions stored in memory, memory, or other processing components, some of which are described below, that perform the functions associated with those systems, components, logic, modules, generators, or interactions. In addition, any or all of the systems, components, logic, modules, generators, and interactions may be implemented by software that is loaded into a memory and is subsequently executed by one or more processors or servers or other computing component(s), as described below. Any or all of the systems, components, logic, modules, generators, and interactions may also be implemented by different combinations of hardware, software, firmware, etc., some examples of which are described below. These are some examples of different structures that may be used to implement any or all of the systems, components, logic, modules, generators, and interactions described above. Other structures may be used as well.

Figure 9:
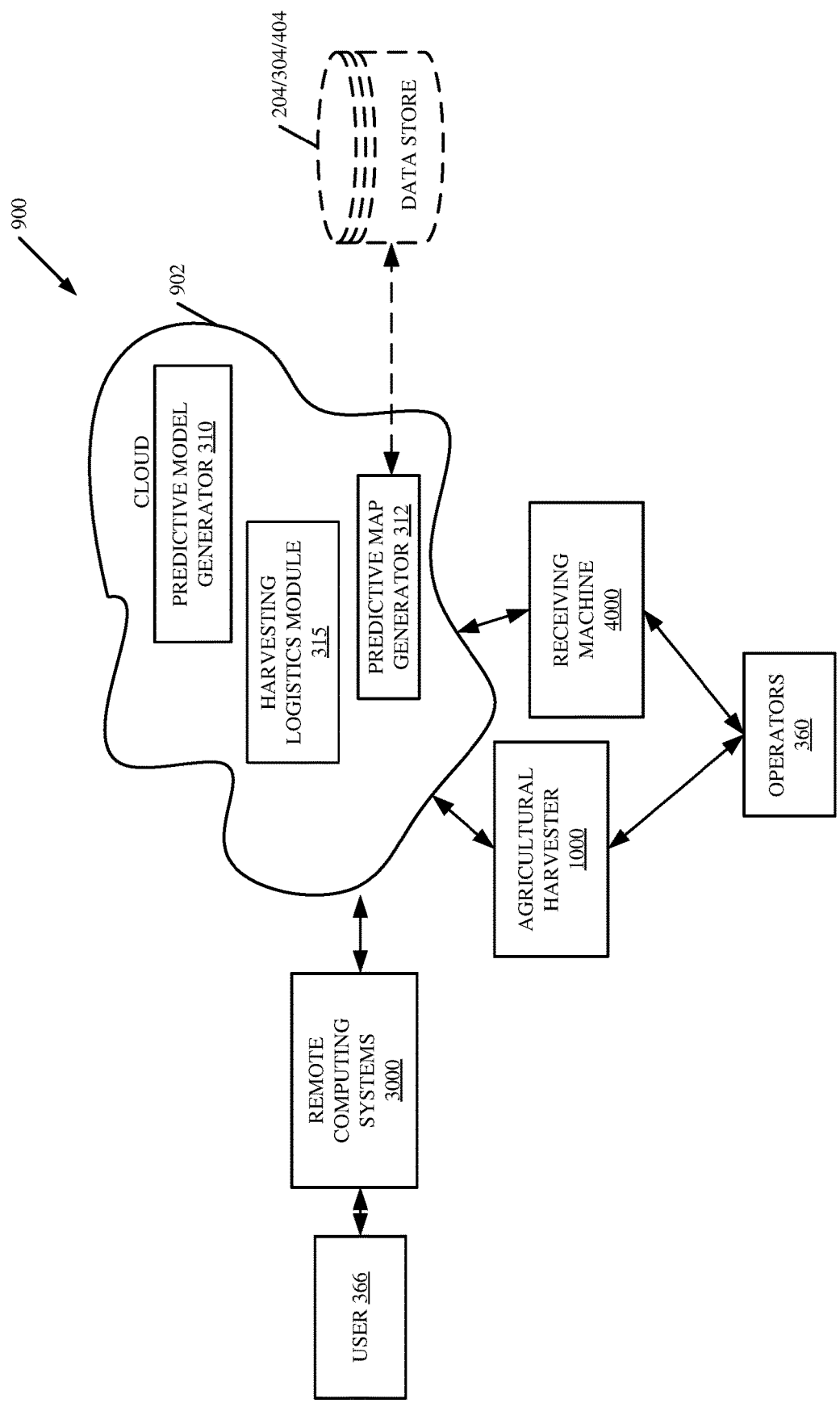
FIG. 9 is a block diagram showing one example of a mobile machine in communication with a remote server environment.

FIG. 9 is a block diagram of agricultural harvester 1000, which may be similar to agricultural harvester 100 shown in FIG. 3, receiving machine 4000, which may be similar to receiving machine 400 shown in FIG. 3, and remote computing systems 3000, which may be similar to remote computing systems 300 shown in FIG. 3. The agricultural harvester 1000, receiving machine 4000, and remote computing system 3000 communicates with elements in a remote server architecture 900. In some examples, remote server architecture 900 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 3 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 9, some items are similar to those shown in FIG. 3 and those items are similarly numbered. FIG. 9 specifically shows that predictive model generator 310, predictive map generator 312, and harvesting logistics module 315 may be located at a server location 902 that is remote from the agricultural harvester 1000, the receiving machine 2000, and the remote computing systems 3000. Therefore, in the example shown in FIG. 9, agricultural harvester 1000, receiving machine 4000, and remote computing systems 3000 accesses systems through remote server location 902. In other examples, various other items may also be located at server location 902, such as predictive model 311, functional predictive maps 263 (including predictive maps 264 and predictive control zone maps 265), control zone generator 313, and processing system 338.

FIG. 9 also depicts another example of a remote server architecture. FIG. 9 shows that some elements of FIG. 3 may be disposed at a remote server location 902 while others may be located elsewhere. By way of example, one or more of data store(s) 204, 304, and 404 may be disposed at a location separate from location 902 and accessed via the remote server at location 902. Regardless of where the elements are located, the elements can be accessed directly by agricultural harvester 1000, receiving machine 4000, and remote computing systems 3000 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the agricultural harvester 1000 or receiving machine 4000, or both, comes close to the machine containing the information collection system, such as a fuel truck prior to fueling, the information collection system collects the information from the agricultural harvester 1000 or the receiving machine 4000, or both, using any type of ad-hoc wireless connection. The collected information may then be forwarded to another network when the machine containing the received information reaches a location where wireless telecommunication service coverage or other wireless coverage— is available. For instance, a fuel truck may enter an area having wireless communication coverage when traveling to a location to fuel other machines or when at a main fuel storage location. All of these architectures are contemplated herein. Further, the information may be stored on the agricultural harvester 1000 or the receiving machine 4000, or both, until the agricultural harvester 1000 or the receiving machine 4000, or both, enters an area having wireless communication coverage. The agricultural harvester 1000, itself, may send the information to another network. The receiving machine 4000, itself, may send the information to another network.

It will also be noted that the elements of FIG. 3, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 902 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 10:
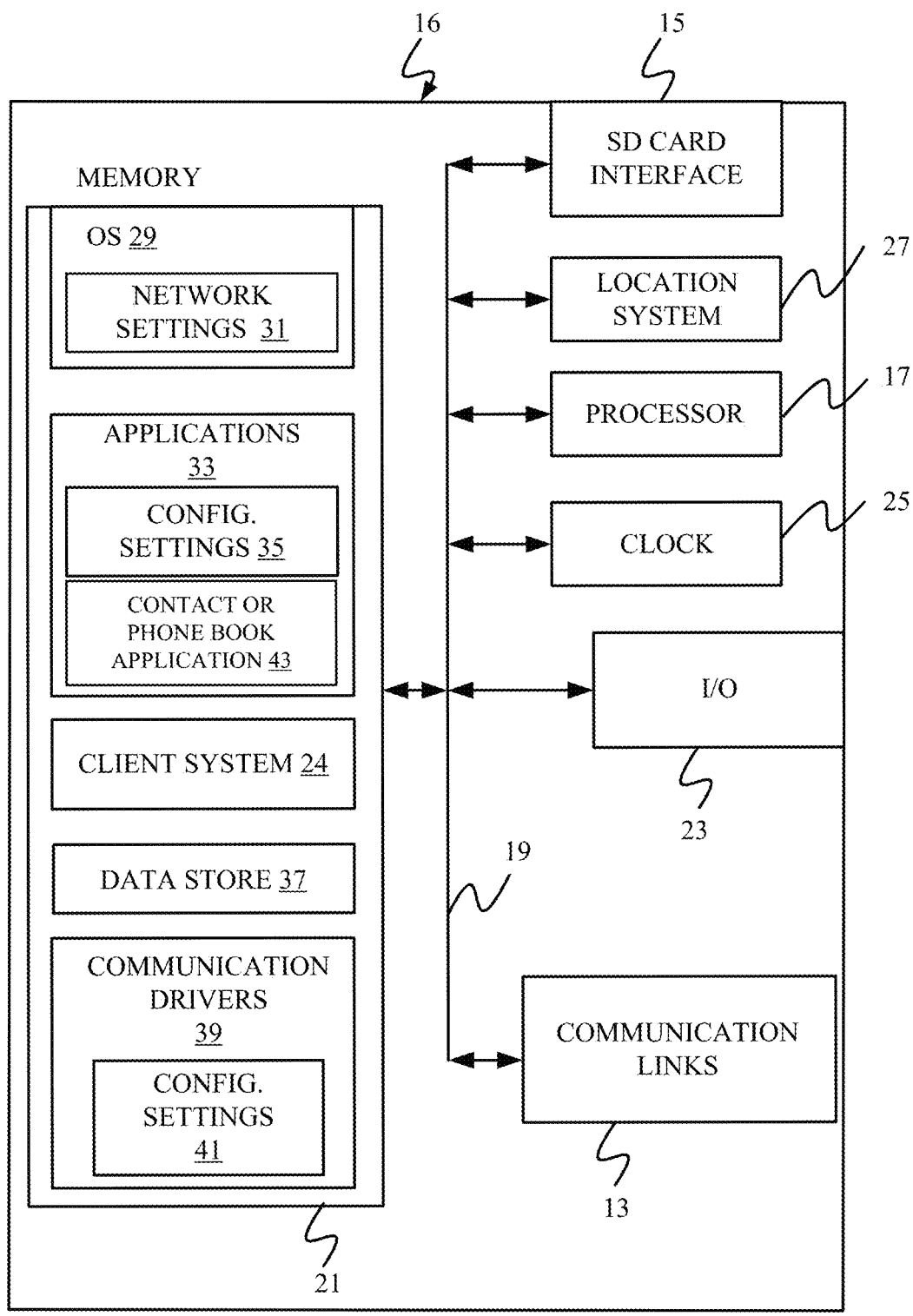
FIGS. 10-12 show examples of mobile devices that can be used in an agricultural system.
Figure 11:
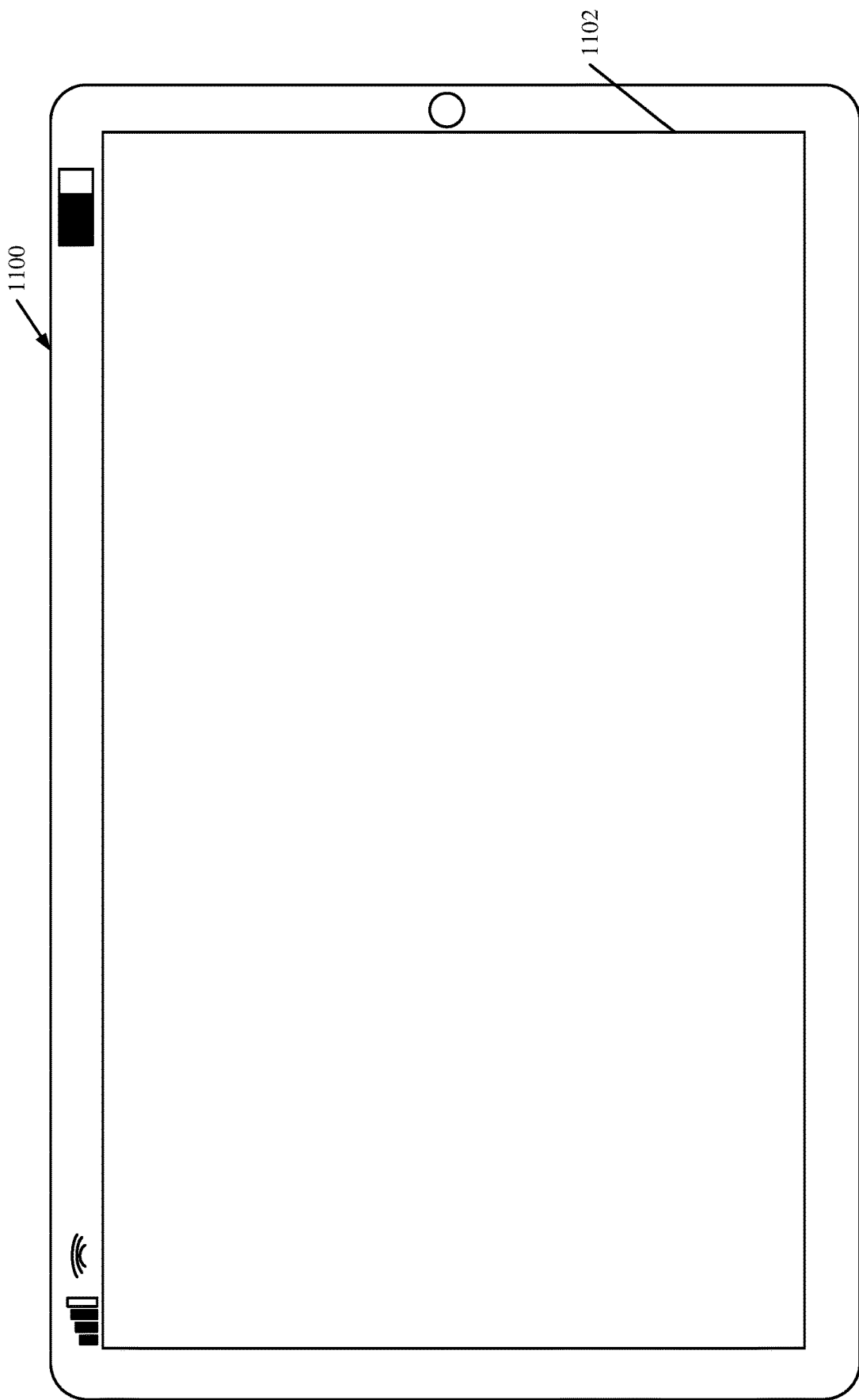
Figure 12:
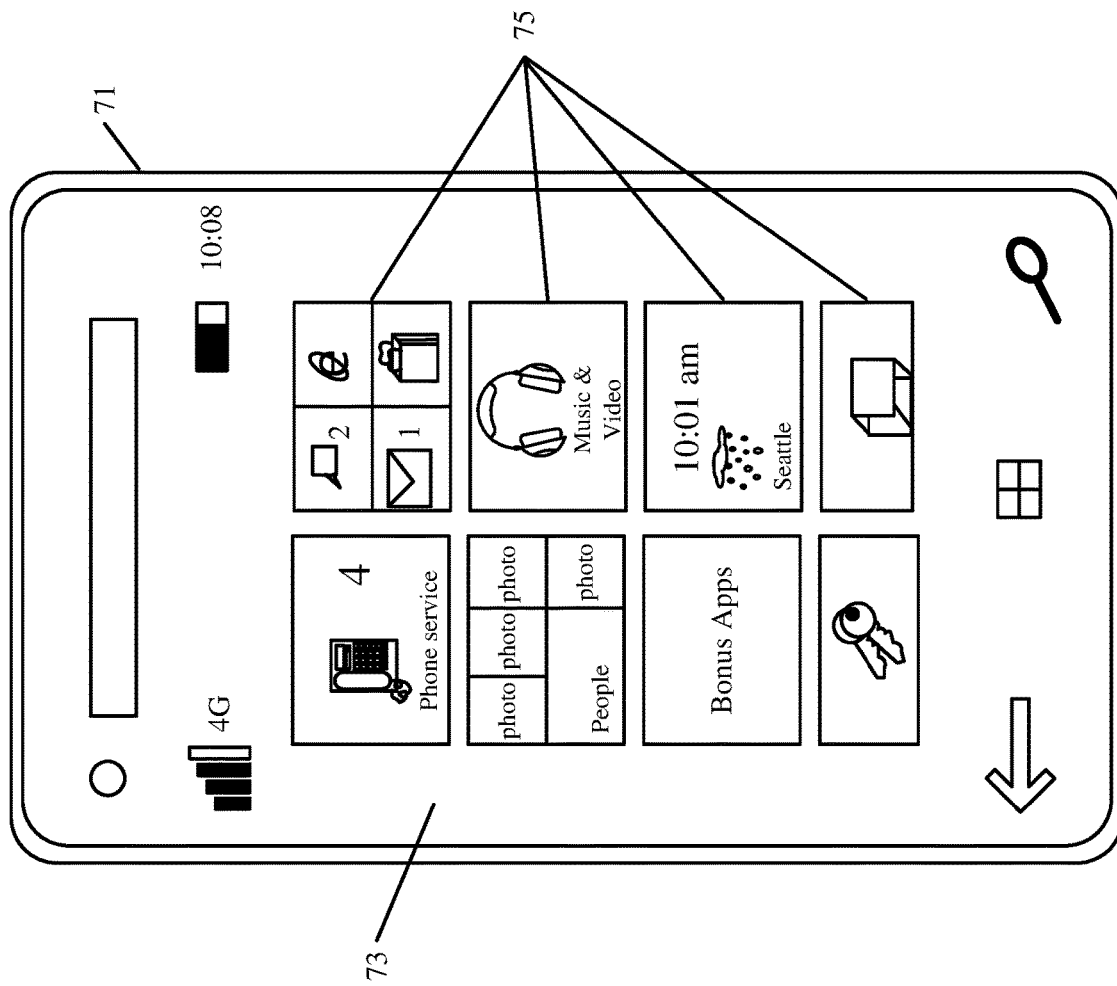

FIG. 10 is a simplified block diagram of one illustrative example of a handheld or mobile computing device that can be used as a user's or client's handheld device 16, in which the present system (or parts of it) can be deployed. For instance, a mobile device can be deployed in the operator compartment of agricultural harvester 100 or receiving machine 400, or both, for use in generating, processing, or displaying the maps discussed above. FIGS. 11-12 are examples of handheld or mobile devices.

FIG. 10 provides a general block diagram of the components of a client device 16 that can run some components shown in FIG. 3, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 11 shows one example in which device 16 is a tablet computer 1100. In FIG. 11, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 12 is similar to FIG. 11 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
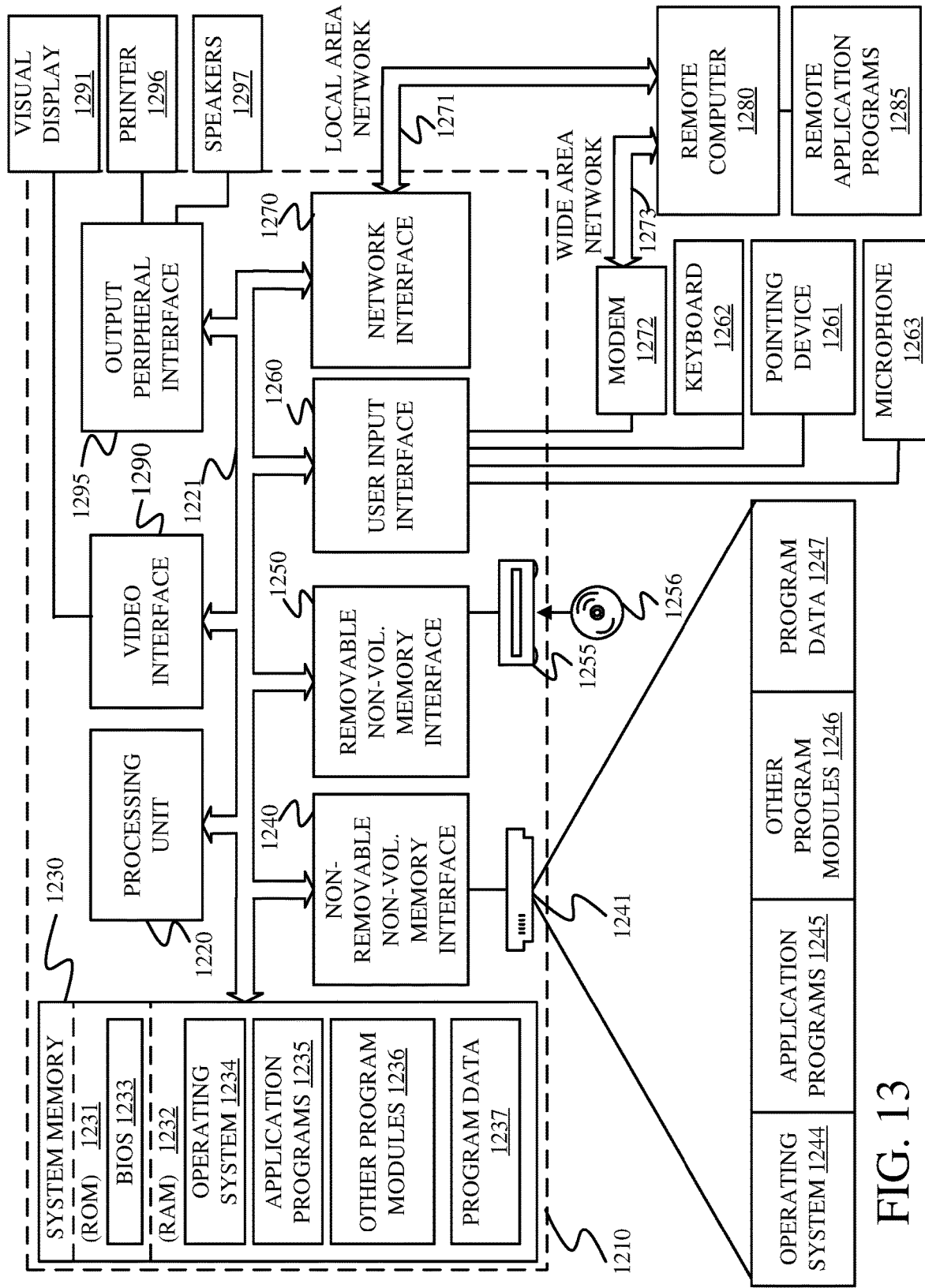
FIG. 13 is a block diagram showing one example of a computing environment that can be used in an agricultural system.

FIG. 13 is one example of a computing environment in which elements of previous figures described herein can be deployed. With reference to FIG. 13, an example system for implementing some embodiments includes a computing device in the form of a computer 1210 programmed to operate as discussed above. Components of computer 1210 may include, but are not limited to, a processing unit 1220 (which can comprise processors or servers from previous FIGS.), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 13.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 13 illustrates operating system 1234, application programs 1235, other program modules 1236, and program data 1237.

The computer 1210 may also include other removable/non-removable volatile/nonvolatile computer storage media. By way of example only, FIG. 13 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 1210. In FIG. 13, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network— CAN, local area network— LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 13 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural harvesting system comprising:
    a harvesting logistics module that obtains a yield map that maps yield values to different geographic locations in a worksite and a speed map that maps speed values, indicative of a speed of an agricultural harvester, to the different geographic locations in the worksite, the harvesting logistics module comprising;
        harvester full logic that identifies a geographic location in the worksite at which the agricultural harvester will be full, at least to a threshold level, based on the yield map;
        material transfer location identifier logic that identifies, as a material transfer location, a geographic location in the worksite at which a material transfer operation is to start based on the geographic location at which the agricultural harvester will be full, at least to the threshold level; and arrival time logic that identifies a time at which the agricultural harvester will arrive at the material transfer location, based on the speed map; and a control system that generates a control signal based on the time at which the agricultural harvester will arrive at the material transfer location.

2. The agricultural harvesting system of claim 1 and further comprising:

a predictive model generator that:

obtains one or more information maps that each include values of a respective characteristic corresponding to different geographic locations in a worksite;

obtains a yield value corresponding to a geographic location in the worksite based on sensor data generated by an in-situ sensor disposed on the agricultural harvester; and generates a predictive yield model indicative of a relationship between values of the one or more respective characteristics and yield values based on the yield value detected by the in-situ sensor corresponding to the geographic location and one or more values of the one or more respective characteristics in the one or more information maps at the geographic location.

3. The agricultural harvester of claim 2 and further comprising:

a predictive map generator that generates, as the yield map, a functional predictive yield map of the worksite that maps predictive values of yield to the different geographic locations in the worksite, based on the values of the one or more respective characteristics in the one or more information maps and based on the predictive yield model.

4. The agricultural harvesting system of claim 1 and further comprising:

a predictive model generator that:

obtains one or more information maps that each include values of a respective characteristic corresponding to different geographic locations in a worksite;

obtains a speed value corresponding to a geographic location in the worksite based on sensor data generated by an in-situ sensor disposed on the agricultural harvester; and generates a predictive speed model indicative of a relationship between values of the one or more respective characteristics and speed values based on the speed value detected by the in-situ sensor corresponding to the geographic location and one or more values of the one or more respective characteristics in the one or more information maps at the geographic location.

5. The agricultural harvesting system of claim 4 and further comprising:

a predictive map generator that generates, as the speed map, a functional predictive speed map of the worksite that maps predictive speed values to the different geographic locations in the worksite, based on the values of the one or more respective characteristics in the one or more information maps and based on the predictive speed model.

6. The agricultural harvesting system of claim 1, wherein the harvesting logistics module further comprises:

distance logic that identifies a distance between the agricultural harvester and the material transfer location and a distance between a receiving machine and the material transfer location.

7. The agricultural harvesting system of claim 6, wherein the arrival time logic identifies the time at which the agricultural harvester will reach the material transfer location based further on the distance between the agricultural harvester and the material transfer location and that further identifies a time at which the receiving machine will arrive at the material transfer location based on the distance between the receiving machine and the material transfer location.

8. The agricultural harvesting system of claim 7, wherein the harvesting logistics module provides a speed output to the control system to control a speed of the agricultural harvester based on the time at which the agricultural harvester will arrive at the material transfer location and the time at which the receiving machine will arrive at the material transfer location.

9. The agricultural harvesting system of claim 7, wherein the harvesting logistics module provides a speed output to the control system to control a speed of the receiving machine based on the time at which the receiving machine will arrive at the material transfer location and the time at which the agricultural harvester will arrive at the material transfer location.

10. The agricultural harvesting system of claim 7, wherein the arrival time logic obtains an indication of a travel speed of the receiving machine and a heading of the receiving machine, and wherein the arrival time logic identifies the time at which the receiving machine will arrive at the material transfer location based further on the travel speed of the receiving machine and the heading of the receiving machine.

11. The agricultural harvesting system of claim 7, wherein the harvesting logistics module further comprises:

time to complete logic that identifies a time at which the receiving machine will finish a task, and wherein the arrival time logic identifies the time at which the receiving machine will arrive at the material transfer location based further on the time at which the receiving machine will finish the task.

12. A computer implemented method of controlling an agricultural harvesting operation comprising:

receiving a yield map that maps yield values to different geographic locations in a worksite;

receiving a speed map that maps speed values, indicative of a speed characteristic of an agricultural harvester, to the different geographic locations in the worksite;

identifying a geographic location in the worksite at which a grain tank of the agricultural harvester will be full, at least to a threshold level, based on the yield map;

identifying, as a material transfer location, a geographic location in the worksite at which a material transfer operation is to start based on the geographic location at which the agricultural harvester will be full;

identifying a time at which the agricultural harvester will arrive at the material transfer location, based on the speed map; and generating a control signal based on the time at which the agricultural harvester will arrive at the material transfer location.

13. The computer implemented method of claim 12, wherein receiving the yield map comprises:
- receiving one or more information maps that each include values of a respective characteristic corresponding to different geographic locations in a worksite;
- obtaining a yield value corresponding to a geographic location in the worksite based on sensor data generated by an in-situ yield sensor; and
- generating a predictive yield model indicative of a relationship between values of the one or more respective characteristics and yield values based on the yield value detected by the in-situ yield sensor corresponding to the geographic location and one or more values of the one or more respective characteristics in the one or more information maps at the geographic location; and
- controlling a predictive map generator to generating, as the yield map, a predictive yield model indicative of a relationship between values of the one or more respective characteristics and yield values based on the yield value detected by the in-situ yield sensor corresponding to the geographic location and one or more values of the one or more respective characteristics in the one or more information maps at the geographic location.

14. The computer implemented method of claim 12, wherein receiving the speed map comprises:
- receiving one or more information maps that each include values of a respective characteristic corresponding to different geographic locations in a worksite;
- obtaining a speed characteristic value corresponding to a geographic location in the worksite based on sensor data generated by an in-situ speed sensor;
- generating a predictive speed model indicative of a relationship between values of the one or more respective characteristics and speed characteristic values based on the speed characteristic value detected by the in-situ speed sensor corresponding to the geographic location and one or more values of the one or more respective characteristics in the one or more information maps at the geographic location; and
- controlling a predictive map generator to generate, as the speed map, a functional predictive speed map of the worksite that maps predictive speed characteristic values, to the different geographic locations in the worksite, based on the values of the one or more respective characteristics in the one or more information maps and based on the predictive speed model.

15. The computer implemented method of claim 12 and further comprising:
- identifying a distance between the agricultural harvester and the material transfer location based on the geographic location of the material transfer location and a geographic location of the agricultural harvester; and
- identifying a distance between a receiving machine and the material transfer location based on the geographic location of the material transfer location and a geographic location of the receiving machine.

16. The computer implemented method of claim 15, wherein identifying the time at which the agricultural harvester will arrive at the material transfer location further comprises identifying the time at which the agricultural harvester will arrive at the material transfer location based on the distance between the agricultural harvester and the material transfer location, the method further comprising:
- identifying a time at which the receiving machine will arrive at the material transfer location based on the distance between the receiving machine and the material transfer location.

17. The computer implemented method of claim 16, wherein generating the control signal comprises generating the control signal to control a propulsion subsystem of the agricultural harvester based on the time at which the agricultural harvester will arrive at the material transfer location and the time at which the receiving machine will arrive at the material transfer location.

18. The computer implemented method of claim 16, wherein generating the control signal comprises generating the control signal to control a propulsion subsystem of the receiving machine based on the time at which the receiving machine will arrive at the material transfer location and the time at which the agricultural harvester will arrive at the material transfer location.

19. The computer implemented method of claim 16, wherein identifying the time at which the receiving machine will arrive at the material transfer location further comprises identifying a time at which the receiving machine completes a task.

20. An agricultural harvesting system comprising:
a harvesting logistics module that:
- obtains a yield map of a worksite that maps values of yield to different geographic locations in the worksite;
- obtains a speed map of the worksite that maps values of agricultural harvester travel speed to the different geographic locations in the worksite;
- identifies a geographic location at the worksite at which the agricultural harvester will be full, at least to a threshold level, based on the yield map;
- identifies, as a material transfer location, a geographic location at the worksite at which a material transfer operation is to take place based on the geographic location at which the agricultural harvester will be full;
- identifies a distance between the agricultural harvester and the material transfer location based on the geographic location at the worksite at which the material transfer operation is to take place and a geographic location of the agricultural harvester;
- identifies a time at which the agricultural harvester will arrive at the geographic location at which the material transfer operation is to take place based on the distance between the agricultural harvester and the material transfer location and based on the speed map;
- identifies a time at which a receiving machine will arrive at the geographic location at which the material transfer operation is to take place based on a geographic location of the receiving machine; and
- generates one or more logistics outputs to control one or more of the agricultural harvester and the receiving machine based on the time at which the agricultural harvester will arrive at the geographic location at which the material transfer operation is to take place and based on the time at which the receiving machine will arrive at the geographic location at which the material transfer operation is to take place.

* * * * *